(12) United States Patent
Adachi et al.

(10) Patent No.: US 11,895,388 B2
(45) Date of Patent: Feb. 6, 2024

(54) SHUTTER UNIT AND IMAGE PICKUP APPARATUS

(71) Applicant: CANON KABUSHIKI KAISHA, Tokyo (JP)

(72) Inventors: Keisuke Adachi, Tokyo (JP); Yuji Ueda, Tokyo (JP); Jun Kawanami, Kanagawa (JP); Yoshiyuki Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 17/862,484

(22) Filed: Jul. 12, 2022

(65) Prior Publication Data

US 2023/0016129 A1    Jan. 19, 2023

(30) Foreign Application Priority Data

Jul. 16, 2021 (JP) .................. 2021-117550

(51) Int. Cl.
*H04N 23/55* (2023.01)
*G03B 9/40* (2021.01)

(52) U.S. Cl.
CPC ............... *H04N 23/55* (2023.01); *G03B 9/40* (2013.01)

(58) Field of Classification Search
CPC ............ H04N 23/55; G03B 9/40; G03B 9/42
See application file for complete search history.

(56) References Cited

U.S. PATENT DOCUMENTS

| 10,451,957 B2 * | 10/2019 | Sakai | G03B 9/40 |
| 2014/0226964 A1 * | 8/2014 | Shintani | G03B 9/32 396/453 |
| 2018/0314135 A1 * | 11/2018 | Kamata | G03B 9/40 |
| 2019/0191070 A1 * | 6/2019 | Irie | G03B 9/36 |
| 2020/0326608 A1 * | 10/2020 | Niwamae | G03B 9/14 |
| 2021/0306544 A1 * | 9/2021 | Imai | H04N 23/54 |

FOREIGN PATENT DOCUMENTS

JP        3914112 B2    5/2007

* cited by examiner

*Primary Examiner* — Shahbaz Nazrul
(74) *Attorney, Agent, or Firm* — Cowan, Liebowitz & Latman, P.C.

(57) ABSTRACT

A shutter unit includes a base plate having an opening, a first blade member movable between a closed state and a retracted state, a first driving member biased by a first biasing member, a second driving member biased by a second biasing member, a first charging member configured to cause the first driving member to move in the second direction against a biasing force, a second charging member configured to cause the second driving member to move in the first direction against a biasing force, and a motor configured to supply a driving force to the first and second charging members. In a case where the first charging member causes the first driving member to move, the motor rotates in a direction opposite to a rotation direction in a case where the second charging member causes the second driving member to move.

12 Claims, 36 Drawing Sheets

SHUTTER UNIT AND IMAGE PICKUP APPARATUS

BACKGROUND OF THE INVENTION

Field of the Invention

The present invention relates to a shutter unit and an image pickup apparatus.

Description of the Related Art

Conventionally, as focal plane shutters of image pickup apparatuses, shutter units have been known each of which can change operations between a normally open method in which an opening is opened when power is turned off and a normally closed method in which the opening is closed when the power is turned off. Such a shutter unit is configured by forming a driving member for driving a blade into two bodies of a member linked to the blade and a member charged by a charging member.

Japanese Patent No. 3914112 discloses a shutter unit that can change operations between the normally open method and the normally closed method by including a motor configured to drive a blade by reciprocating rotation of a rotor in addition to the use of the above-described two-body configuration.

However, since the shutter unit disclosed in Japanese Patent No. 3914112 uses a dedicated motor for the changing between the normally open method and the normally closed method, the cost increases.

SUMMARY OF THE INVENTION

The present invention provides a shutter unit and an image pickup apparatus each of which can change a method between a normally open method and a normally closed method without including a dedicated actuator.

A shutter unit according to one aspect of the present disclosure includes a base plate, a first blade member, a first driving member, a second driving member, a first charging member, a second charging member, and a motor. An opening is formed on the base plate. The first blade member is configured to be movable between a closed state in which the first blade member closes the opening and a retracted state in which the first blade member retracts from the opening. The first driving member is configured to be biased in a first direction by a first biasing member. The second driving member is configured to be biased by a second biasing member in a second direction opposite to the first direction. The first charging member is configured to cause the first driving member to move in the second direction against a biasing force on the first driving member of the first biasing member. The second charging member is configured to cause the second driving member to move in the first direction against a biasing force on the second driving member of the second biasing member. The motor is configured to supply a driving force to the first charging member and the second charging member. In a case where the first charging member causes the first driving member to move, the motor rotates in a direction opposite to a rotation direction in a case where the second charging member causes the second driving member to move.

An image pickup apparatus including the shutter unit and an image sensor also constitute another aspect of the present disclosure.

Further features of the present invention will become apparent from the following description of exemplary embodiments with reference to the attached drawings.

DESCRIPTION OF THE EMBODIMENTS

Referring now to the accompanying drawings, a detailed description is given of an embodiment according to the present disclosure.

Figure 1A:
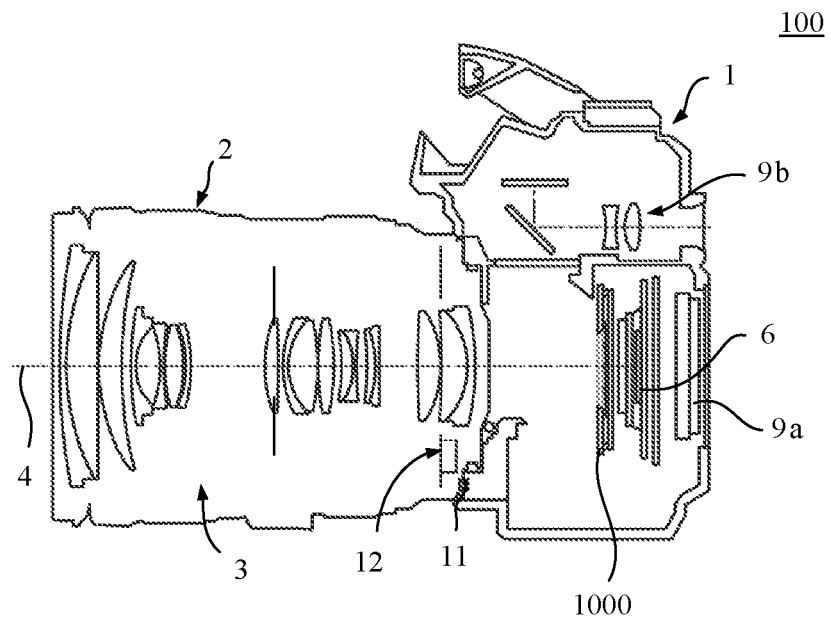
FIGS. 1A and 1B are a central sectional view of an image pickup system and a block diagram illustrating an electrical configuration according to an embodiment.
Figure 1B:
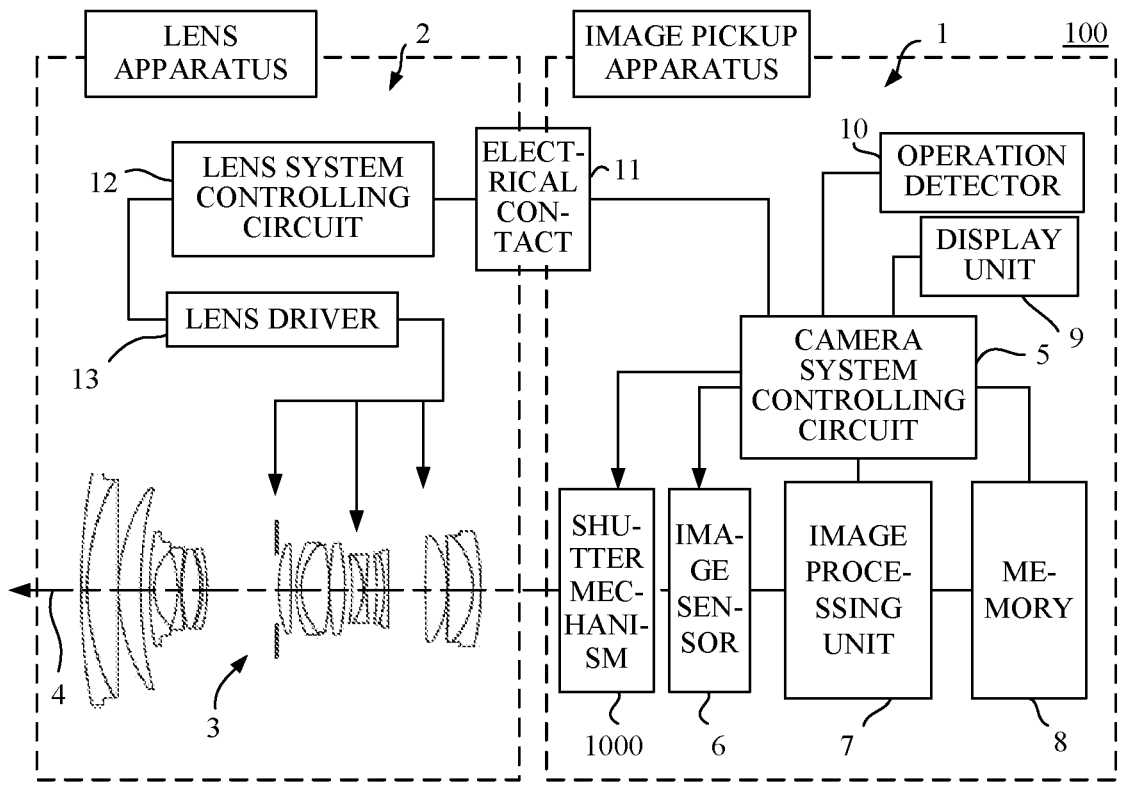

First, a description is given of an image pickup system (camera system) 100 according to this embodiment with reference to FIGS. 1A to 11B. FIG. 1A is a central sectional view of the image pickup system (lens-interchangeable image pickup system) 100, and FIG. 1B is a block diagram illustrating an electrical configuration of the image pickup system 100. Elements with the same reference numerals in FIGS. 1A and 1B correspond to each other.

In FIGS. 1A and 1B, a reference numeral 1 denotes an image pickup apparatus (camera main body), a reference numeral 2 denotes a lens apparatus (interchangeable lens) to be attached to the image pickup apparatus 1, a reference numeral 3 denotes an image pickup optical system including a plurality of lenses, a reference numeral 4 denotes an optical axis of the image pickup optical system 3, a reference numeral 6 denotes an image sensor, and a reference numeral 9a denotes a rear surface display apparatus. A reference numeral 9b denotes an electronic viewfinder (EVF), a reference numeral 11 denotes an electrical contact between the image pickup apparatus 1 and the lens apparatus 2, a reference numeral 12 denotes a lens system controlling circuit included in the lens unit 2, and a reference numeral 1000 denotes a focal plane shutter (shutter unit).

The image pickup system 100 including the image pickup apparatus 1 and the lens apparatus 2 includes an imager, an image processor, a recording/reproducing unit, and a controller. The imager includes the image pickup optical system 3, the image sensor 6, and the focal plane shutter 1000. The image processor includes the image processing unit 7. The recording/reproducing unit includes the memory 8 and the display unit 9 (including the rear surface display apparatus 9a and the EVF 9b). The controller includes a camera system controlling circuit (controlling unit) 5, an operation detector 10, the lens system controlling circuit 12, and a lens driver 13. The lens driver 13 can drive a focus lens, an image stabilization lens, a diaphragm, and the like.

The imager is an optical processing system that images light from an object on an imaging plane of the image sensor 6 via the image pickup optical system 3. The focal plane shutter 1000 controls an exposure amount of the image sensor 6 by causing a shutter front curtain 700 and a shutter rear curtain 800 described later to travel. The image sensor 6 photoelectrically converts the optical image formed via the image pickup optical system 3.

The image processing unit 7 includes, inside, an A/D converter, a white balance adjustment circuit, a gamma correction circuit, an interpolation calculation circuit, and the like, and can generate an image for recording. The image processing unit 7 includes a color interpolation processor that generates a color image by performing color interpolation (demosaicing) processing on signals of a Bayer array. The image processing unit 7 compresses an image, a moving image, sound, and the like by using a predetermined method. The memory 8 includes a memory unit. The camera system controlling circuit 5 performs outputting to the memory unit of the memory 8 and causes the display unit 9 to display an image to be seen by a user.

The camera system controlling circuit 5 generates and outputs a timing signal and the like during imaging. The camera system controlling circuit 5 controls the imager, the image processor, and the recording/reproducing unit in response to external operations. For example, in a case where the operation detector 10 detects that an unillustrated shutter release button is pressed, the camera system controlling circuit 5 controls driving of the image sensor 6, operation of the image processing unit 7, compression processing, and the like. The camera system controlling circuit 5 further controls an information display apparatus that is caused to display information by the display unit 9. The rear surface display apparatus 9*a* is a touch panel and is connected to the operation detector 10.

The image processing unit 7 is connected to the camera system controlling circuit 5, and the camera system controlling circuit 5 acquires proper focal position and aperture value based on signals from the image sensor 6. That is, the camera system controlling circuit 5 determines exposure conditions (an F-number, a shutter speed, etc.) by performing photometric/ranging operations based on the signals from the image sensor 6. The camera system controlling circuit 5 transmits an instruction to the lens system controlling circuit 12 via the electric contact 11, and the lens system controlling circuit 12 properly controls the lens driver 13. As described above, still images and moving images can be captured by controlling the operation of each unit of the image pickup apparatus 1 according to a user's operation detected by the operation detector 10.

Figure 2:
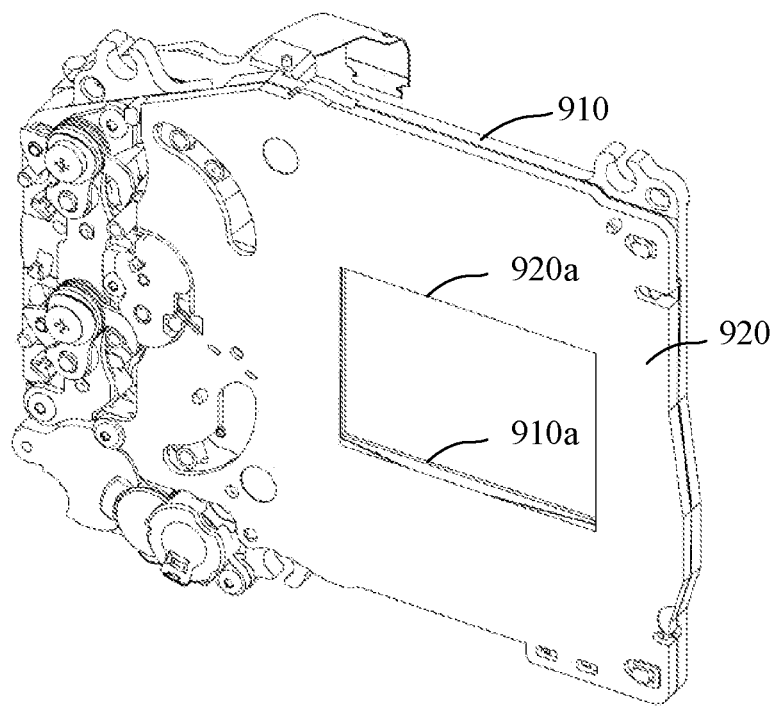
FIG. 2 is a perspective view of a focal plane shutter according to the embodiment.
Figure 3A:
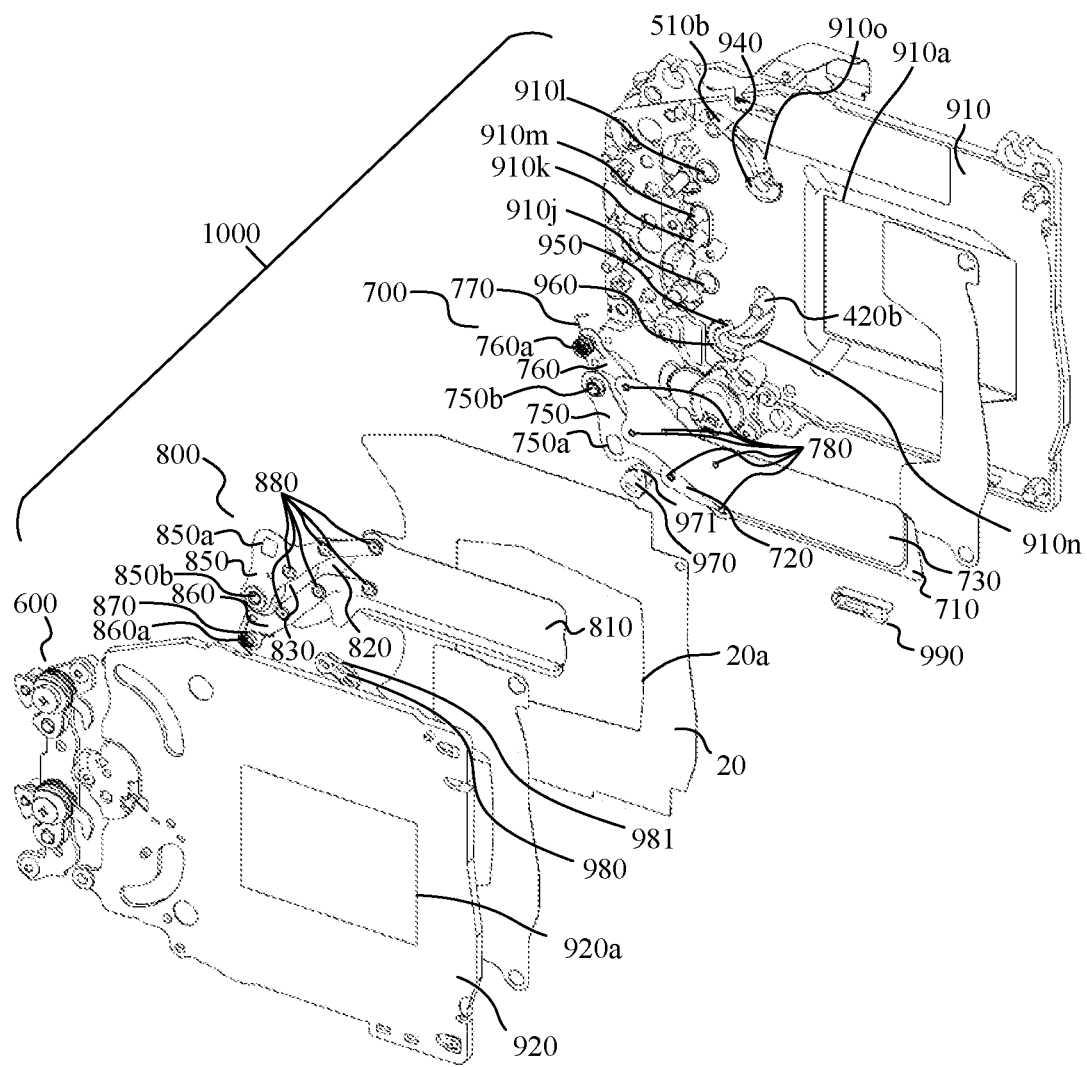
FIG. 3A is an exploded perspective view of the focal plane shutter according to the embodiment.
Figure 3B:
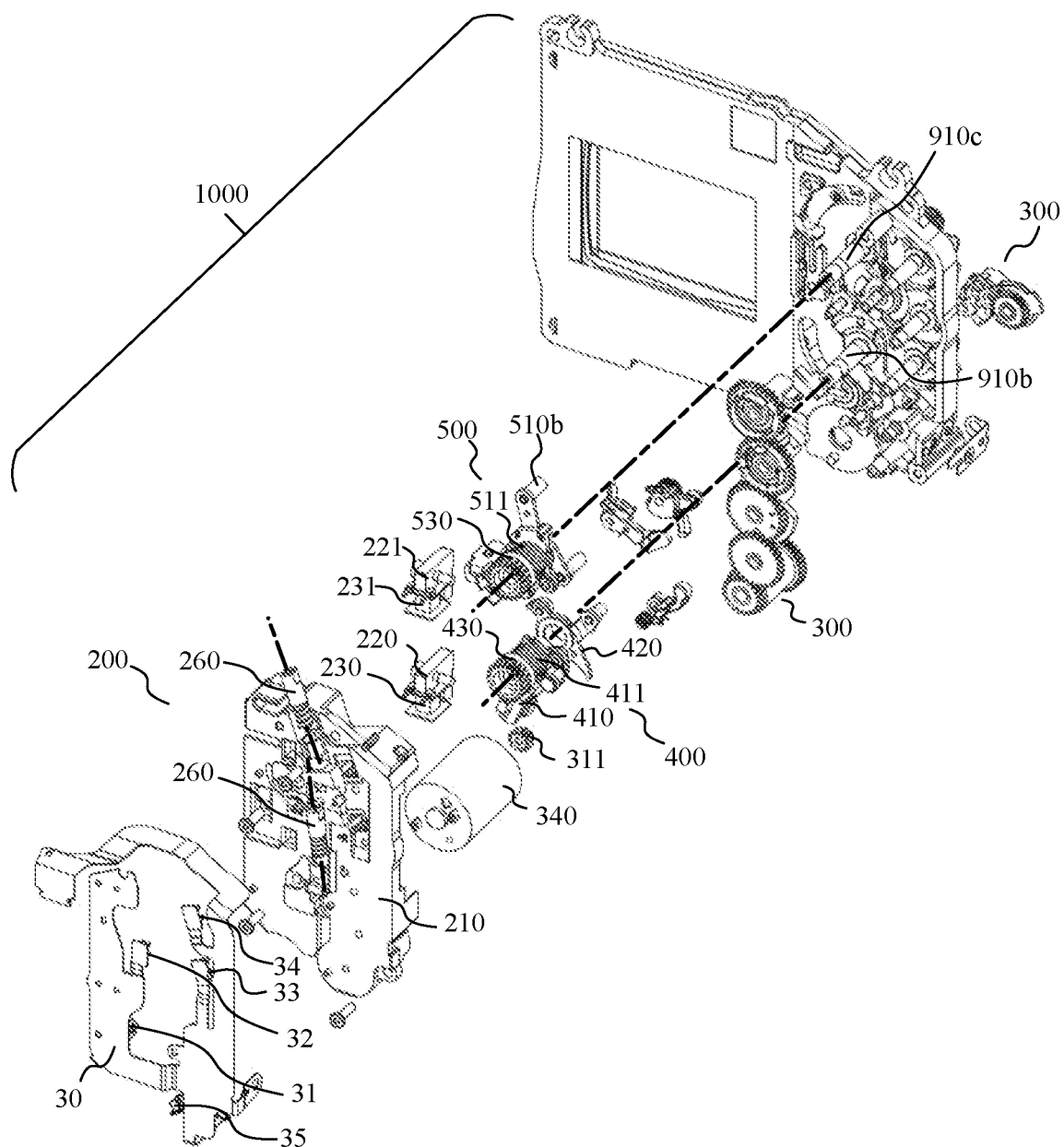
FIG. 3B is an exploded perspective view of the focal plane shutter according to the embodiment.

FIG. 2 is a perspective view of the focal plane shutter 1000. FIGS. 3A and 3B are exploded perspective views of the focal plane shutter 1000. The focal plane shutter 1000 includes a base plate 910 as a basic supporting body, and each component is mounted on the base plate 910. The base plate 910 and a partition plate 20 form a space for traveling of the shutter front curtain (first blade member) 700. A cover plate 920 and the partition plate 20 form a space for traveling of the shutter rear curtain (second blade member) 800. An opening 910*a* is formed on the base plate 910. An opening 20*a* and an opening 920*a* are respectively formed on the partition plate 20 and the cover plate 920 at positions overlapping a position of the opening 910*a*. In imaging, the image sensor 6 is exposed to a light beam that has been transmitted through the lens apparatus 2 and has passed through the opening 920*a*, the opening 20*a*, and the opening 910*a* in this order. On the base plate 910, a front driving shaft 910*b* to which a front driving lever unit 400 is attached and a rear driving shaft 910*c* to which a rear driving lever unit (third driving member) 500 is attached are formed.

Charging system components 300, an MG base plate unit 200, a flexible printed circuit board 30, and a brake unit 600 are attached to the base plate 910. A front curtain detecting photointerrupter 31, a rear curtain detecting photointerrupter 32, a phase detecting photointerrupter 33, a phase detecting photointerrupter 34, and a pulse detecting photointerrupter 35 are mounted on the flexible printed circuit board 30. In this embodiment, the phase detecting photointerrupter 33 is a first optical detector, and the phase detecting photointerrupter 34 is a second optical detector.

The MG base plate 210 holds a front yoke 220, a coil 230, a rear yoke 221, a coil 231, and a worm 260. When the coils are energized, the front yoke 220 and the coil 230, and the rear yoke 221 and the coil 231 become electromagnets and can respectively attract and attach to a front armature 450 and a rear armature 550 described later. In this embodiment, the front yoke 220 and the coil 230 serve as a front holder that, in an energized state, holds a front driving lever (second driving member) 410 by attracting and attaching to the front armature 450. The rear yoke 221 and the coil 231 serve as a rear holder that, in an energized state, holds a rear driving lever (rear driving member) 510 by attracting and attaching to the rear armature 550.

A half-moon rubber 940 is used as a shock-absorbing member for the rear driving lever unit 500. A half-moon rubber 960 and a rubber cover 950 are used in combination as a shock-absorbing member for the front driving lever unit 400. The rubber cover 950 is less sticky than the half-moon rubber 960 and is disposed so that the front blade lever (blade operating member) 420 easily follows the front driving lever (driving member) 410 at a start of charging.

A front curtain arm rubber 970 is used for absorbing shock by receiving an arm portion of the shutter front curtain 700 described later when the shutter front curtain 700 completes traveling. A front curtain arm rubber cover 971 is used for protecting a surface of the front curtain arm rubber 970 and preventing a front main arm 750 from being damaged by contact with the front curtain arm rubber 970. A rear curtain arm rubber 980 is used for absorbing shock by receiving an arm portion of the shutter rear curtain 800 described later when the shutter rear curtain 800 completes traveling. A rear curtain arm rubber cover 981 is used for protecting a surface of the rear curtain arm rubber 980 and prevents a rear sub arm 860 from being damaged by contact with the rear curtain arm rubber 980. A blade tip rubber 990 is used for absorbing shock when the shutter front curtain 700 completes traveling.

The shutter front curtain 700 has a parallel link formed by the front main arm 750, a front sub arm 760, a front first blade 710, a front second blade 720, and a front third blade 730. The blades and arms are rotatably supported by blade caulking dowels 780. A front anti-backlash spring (first biasing member) 770 is a spring for eliminating a backlash at a fitting portion described later between the front driving lever unit 400 and the shutter front curtain 700, and biases (or presses) the shutter front curtain 700 in a counterclockwise direction of FIG. 3A. At the same time, the front anti-backlash spring 770 biases (or presses) the front blade lever 420 (first driving member) to the front driving lever 410 via the blades in a first direction. That is, the front blade lever 420 is movable integrally with the shutter front curtain 700, and is biased so that the shutter front curtain 700 moves from a retracted state to a closed state. A front main arm shaft 910*j* is fitted into a fitting portion 750*b* of the front main arm 750. A front sub arm shaft 910*k* is fitted into a fitting portion 760*a* of the front sub arm 760. The shutter front curtain 700 can move between the closed state in which the shutter front curtain 700 closes (or shields) the opening 910*a* and the retracted state in which the shutter front curtain 700 retracts from the opening 910*a*.

The shutter rear curtain 800 has a parallel link formed by a rear main arm 850, the rear sub arm 860, a rear first blade 810, a rear second blade 820, and a rear third blade 830. The blades and arms are rotatably supported by blade caulking dowels 880. A rear anti-backlash spring 870 is a spring for eliminating a backlash at a fitting portion described later between the rear driving lever unit 500 and the shutter rear curtain 800, and biases (or presses) the shutter rear curtain 800 in the counterclockwise direction of FIG. 3A. In the rear main arm 850, a rear main arm shaft 910*l* is fitted into a fitting portion 850*b* at a rotation center, and a rear driving pin 510*b* is fitted into a fitting portion 850*a* at a predetermined distance from the rotation center. In the rear sub arm 860, the rear sub arm shaft 910*m* is fitted into a fitting portion 860*a*. The shutter rear curtain 800 can move between a closed state in which the shutter rear curtain 800 closes (or shields) the opening 910*a* and a retracted state in which the shutter rear curtain 800 retracts from the opening 910*a*, and transitions from the retracted state to the closed state during an exposure operation.

The front driving lever 410 and the front blade lever 420 are coaxially, reciprocally, and rotatably supported by the front driving shaft 910*b* and can rotate separately from each other. In the front blade lever 420, a front driving pin 420*b* that passes through a long hole 910*n* of the base plate 910 is fitted into a fitting portion 750*a* at a predetermined distance from a rotation center so that the front blade lever 420 can operate integrally with the front main arm 750.

A driving spring (second biasing member) 411 is a torsion spring for causing the front driving lever unit 400 and the shutter front curtain 700 to operate, and the shutter front curtain 700 is biased in a clockwise direction of FIG. 3A. The driving spring 411 biases the front driving lever 410 in a second direction opposite to the first direction. The front driving lever 410 is movable integrally with the front blade lever 420 and is also movable separately from the front blade lever 420. A fixed end of the driving spring 411 is incorporated into an adjuster gear 430 so that a spring force can be adjusted by a worm 260. The rear driving lever 510 is reciprocally and rotatably supported by the rear driving shaft 910*c*. In the rear driving lever 510, the rear driving pin 510*b* that passes through a long hole 910*o* of the base plate 910 is fitted into the fitting portion 850*a* at a predetermined distance from a rotation center so that the rear driving lever 510 can operate integrally with the rear main arm 850. A driving spring (third biasing member) 511 is a torsion spring for causing the rear driving lever unit 500 and the shutter rear curtain 800 to operate, and biases (or presses) the shutter rear curtain 800 in the clockwise direction of FIG. 3A. A fixed end of the driving spring 511 is incorporated into an adjuster gear 530 so that a spring force can be adjusted by a worm 260.

Figure 4A:
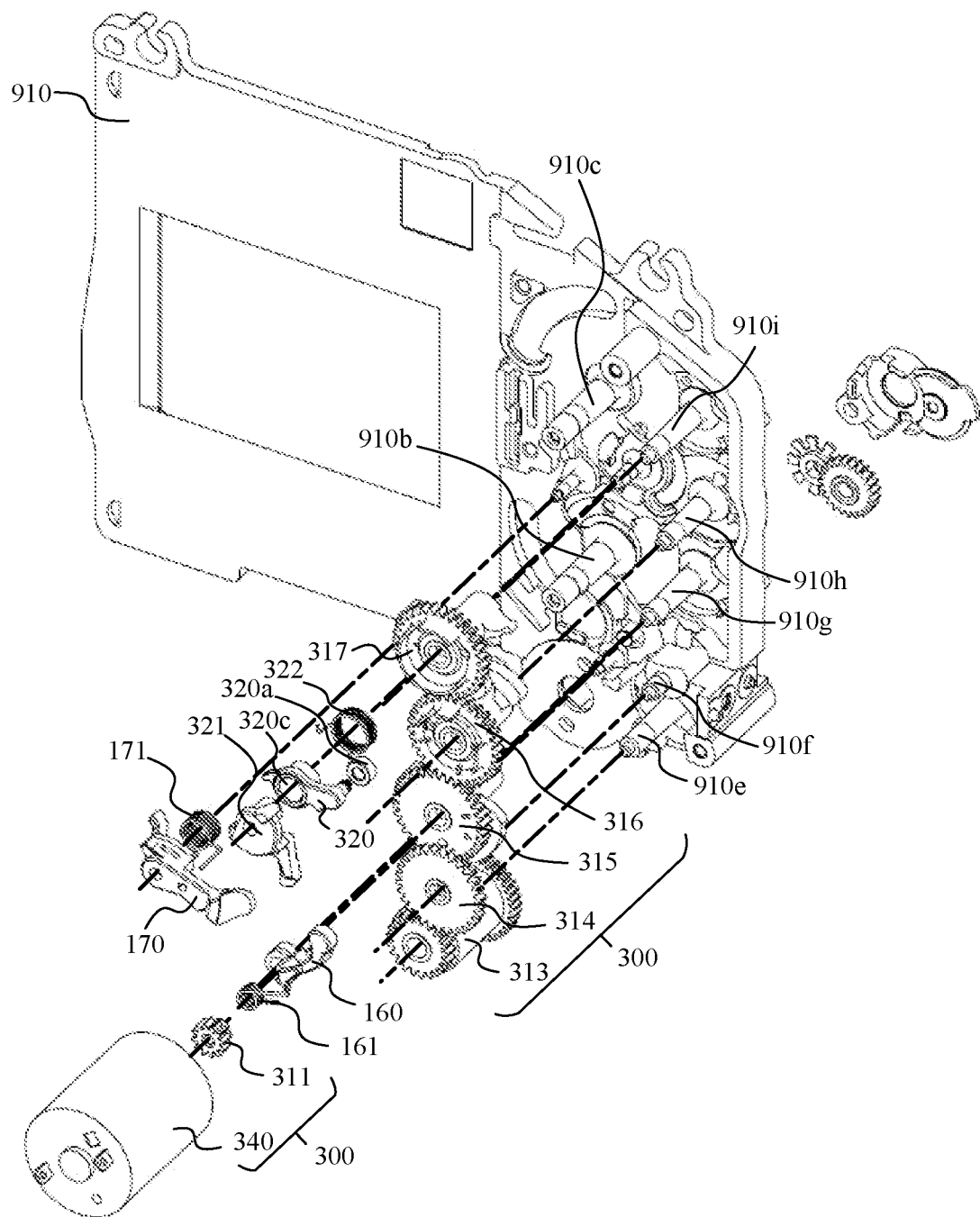
FIG. 4A is a perspective view of charging system components and a base plate according to the embodiment.
Figure 4B:
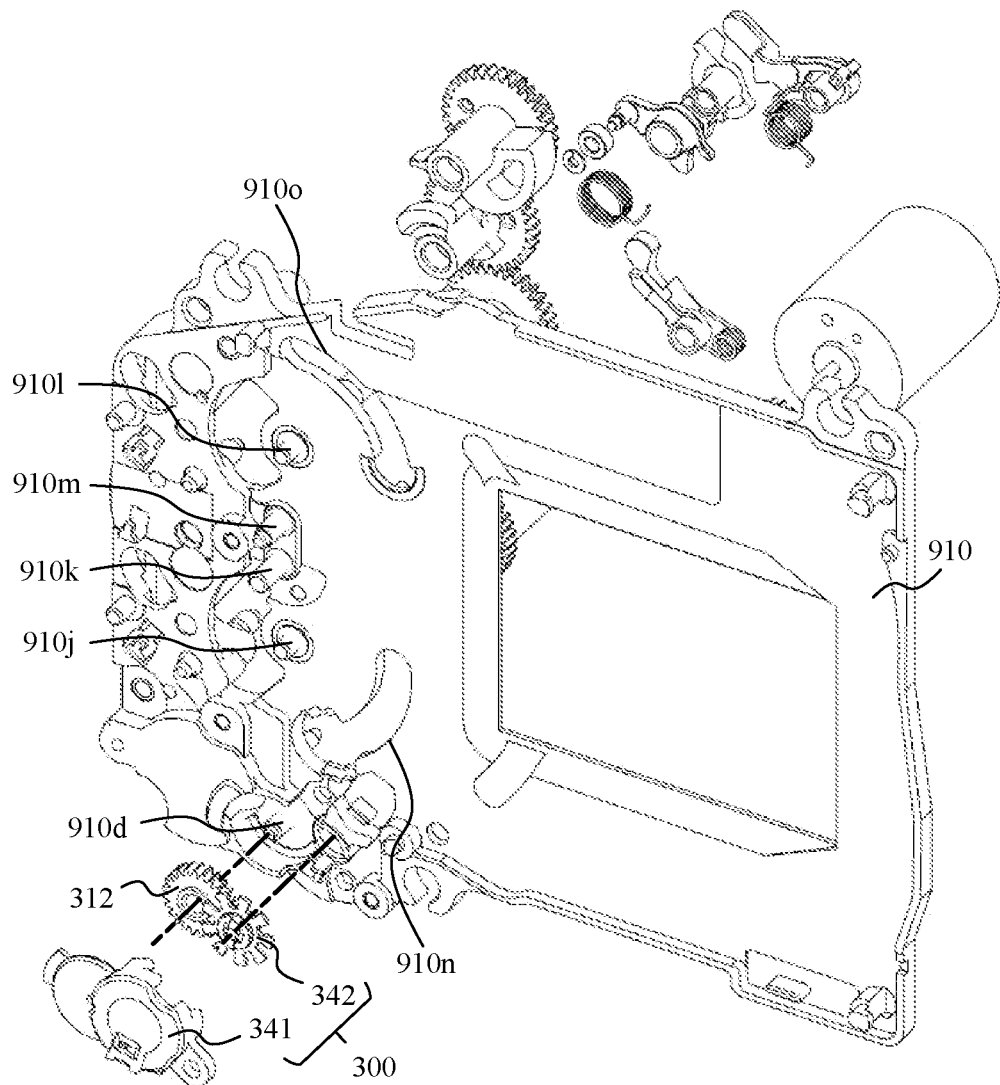
FIG. 4B is a perspective view of the charging system components and the base plate according to the embodiment.

FIGS. 4A and 4B are perspective views each of which illustrates a state in which the charging system components 300 are to be attached to the base plate 910. Charging is an operation that transmits a driving force supplied from a motor 340 to the front driving lever unit 400 and the rear driving lever unit 500 via gears, etc., and causes them to recover from a traveling completion position to a set position at which charging is completed, against the driving spring 411 and the driving spring 511. Hereinafter, a rotation direction of the motor 340 in this operation is referred to as a forward rotation direction, and a rotation in the opposite direction is referred to as a reverse rotation.

This embodiment uses a control method by a pulse width modulation (PWM). The PWM control method makes unchanged an amplitude of a driving voltage applied to the motor 340, and, to control the motor 340, changes an effective voltage to the motor 340 by changing time widths of pulses within a certain period, the pulses changing in rectangular wave shapes. In the following description, a voltage applied to the motor is referred to as an effective voltage.

As illustrated in FIGS. 3B to 4B, a pulse plate 342 having a plurality of blades and the pulse detecting photointerrupter 35 are arranged coaxially with the motor 340. The pulse plate 342 is rotated together with the motor 340 by the rotation of the motor 340, and light to the pulse detecting photointerrupter 35 is repeatedly blocked and transmitted as the blades of the pulse plate 342 rotate. A rotational velocity of the motor 340 can be detected from an interval of an output waveform of the blocking and transmitting of the light to the pulse detecting photointerrupter 35. In this embodiment, the pulse plate 342 and the pulse detecting photointerrupter 35 are used to detect the rotational velocity of the motor 340, but the configuration of the pulse plate 342 and the pulse detecting photointerrupter 35 is not always necessary. The pulse plate 342 and the pulse detecting photointerrupter 35 serve as a rotational velocity detector for detecting the rotational velocity of the motor 340.

A pinion gear 311 is attached to the motor 340, and torque generated by the motor 340 is transmitted to a gear group via the pinion gear 311. The pinion gear 311 directly meshes with an idle gear 312 rotatably supported by an idle gear shaft 910*d* of the base plate 910. A gear cover 341 covers the idle gear 312 so as to prevent the idle gear 312 from jumping out in a thrust direction. The idle gear 312 meshes with (or is connected to) a first gear 313 rotatably supported by a first gear shaft 910*e* and the rotation decelerates. The first gear 313 meshes with a second gear 314 rotatably supported by a second gear shaft 910*f*, and the rotation further decelerates. The second gear 314 meshes with a front curtain charge cam gear 315 rotatably supported by a front cam gear shaft 910*g*. The front curtain charge cam gear 315 is a second charge member that causes the front driving lever 410 to move in the first direction against the biasing force on the front driving lever 410 of the driving spring 411.

The front curtain charge cam gear 315 causes, in predetermined cam phases, a charging operation of the front driving lever 410 and a front brake lever (braking member) 620 and an unlocking operation for retracting the first locking lever 160 from a traveling trajectory of the front blade lever 420. The front curtain charge cam gear 315 meshes with an intermediate cam gear (fourth charging member) 316 rotatably supported by an intermediate cam gear shaft 910*h*.

In a state where the motor 340 rotates in the forward rotation direction (first rotation direction), the intermediate cam gear 316 causes, in predetermined cam phases, an unlocking operation for retracting a second locking lever (locking member) 170 from the traveling trajectory of the front blade lever 420 and a retracting operation for retracting a one-way lever (second lever) 320. In this embodiment, the intermediate cam gear 316 is a first unlocking member that causes a transition from a state in which the second locking lever 170 locks the front blade lever 420 to a retracted state in which traveling can be performed. In this embodiment, when the motor 340 rotates in the first rotation direction, the intermediate cam gear 316 is used in a transition from a state in which the front blade lever 420 is locked to a retracted state in which traveling can be performed.

On the other hand, in a state where the motor 340 rotates in the reverse rotation direction, the intermediate cam gear 316 causes, in a predetermined cam phase, the inverse charging lever (first lever) 321 via the one-way lever 320 to move the front blade lever 420 and the shutter front curtain 700 from an imaging standby position to the traveling completion position. Hereinafter, this operation is referred to as an inverse charging operation. In this embodiment, the one-way lever 320 and the inverse charging lever 321 serve as a first charging member that causes the front blade lever 420 to move in the second direction against the biasing force on the front blade lever 420 of the front anti-backlash spring 770. The intermediate cam gear 316 is rotatably supported by a rear cam gear shaft 910i and meshes with a rear curtain charge cam gear (third charging member) 317.

The rear curtain charge cam gear 317 causes, in a predetermined cam phase, a charging operation of the rear driving lever 510 and a rear brake lever (braking member) 630. The front curtain charge cam gear 315, the intermediate cam gear 316, and the rear curtain charge cam gear 317 have the same number of teeth as each other. However, this embodiment is not limited to this, and the number of teeth of the intermediate cam gear 316 may be an integral multiple of the number of teeth of each of the front curtain charge cam gear 315 and the rear curtain charge cam gear 317.

In this embodiment, the intermediate cam gear 316 causes the second locking lever 170, the one-way lever 320, and the inverse charging lever 321 to operate. The front curtain charge cam gear 315 and the rear curtain charge cam gear 317 respectively cause the front driving lever unit 400 and the rear driving lever unit 500 to operate. Therefore, the second locking lever 170, the one-way lever 320, and the inverse charging lever 321 can operate in conjunction with the front driving lever unit 400 and the rear driving lever unit 500.

The intermediate cam gear 316 and the rear curtain charge cam gear 317 respectively have a PI shielding portion 316c and a PI shielding portion 317d (refer to FIGS. 8A and 8B described later) for respectively blocking light to the phase detecting photointerrupter 33 and light to the phase detecting photointerrupter 34. Thereby, the cam phase can be determined.

Figure 5:
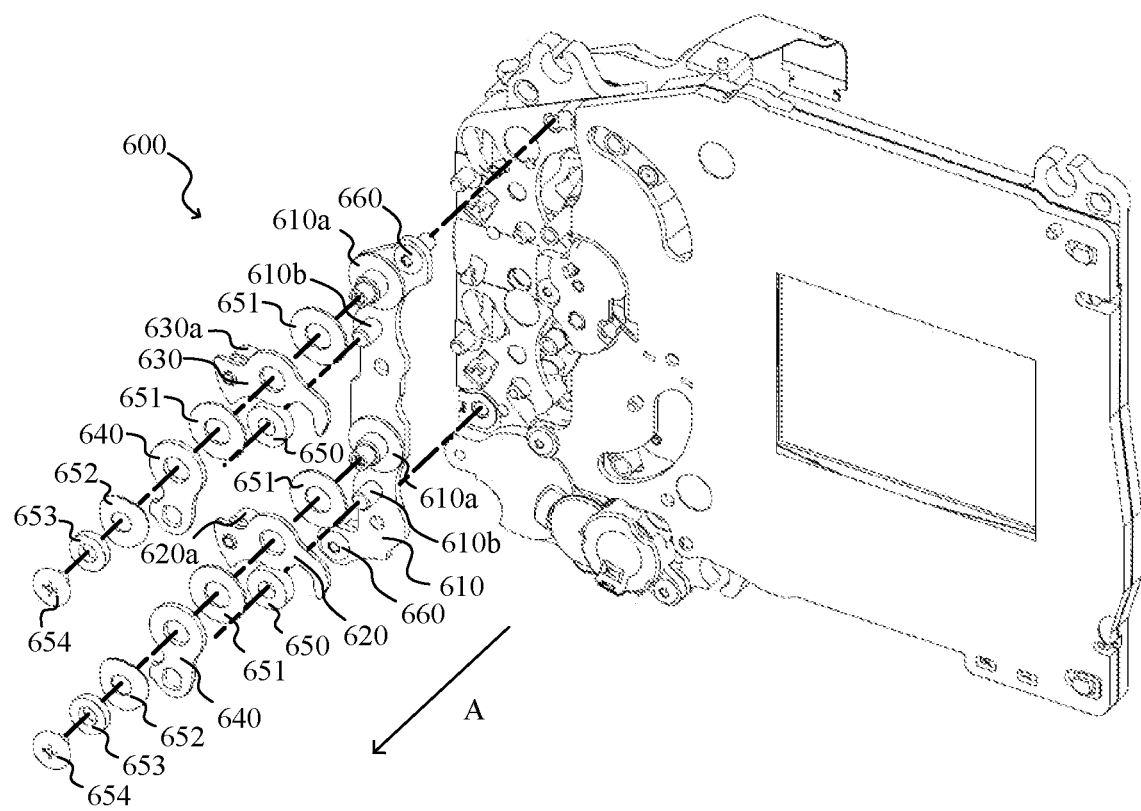
FIG. 5 is an exploded perspective view of a brake unit according to the embodiment.

FIG. 5 is an exploded perspective view of the brake unit 600. A brake base plate 610 includes a brake shaft 610a and a brake rubber shaft 610b on each of a front curtain side and a rear curtain side, and is fixed to the base plate 910 by screws 660. A friction sheet 651, a front brake lever 620 (or a rear brake lever 630), a friction sheet 651, a brake pressing plate 640, a leaf spring 652, and a collar member 653 are laminated in this order on the brake shaft 610a and are fixed by a brake screw 654. A thickness of the collar member 653 can be finely changed, and a compression amount (compressing force) of the leaf spring 652 can be adjusted by changing the thickness of the collar member 653. In this way, a braking force can be adjusted by adjusting a frictional force between the friction sheet 651 and the front brake lever 620 (rear brake lever 630).

A brake rubber 650 is rotatably supported by the brake rubber shaft 610b and the brake pressing plate 640 prevents the brake rubber 650 from falling. The front brake lever 620 (rear brake lever 630) is caused to rotate by the front driving lever unit 400 (rear driving lever unit 500) and stops when the front brake lever 620 (rear brake lever 630) comes into contact with the brake rubber 650. The brake unit 600 is fixed to the base plate 910 by the screws 660 in a completely assembled state. In this embodiment, no component is laminated (or placed) on a projected area in a direction in which the brake unit 600 is detached (direction of an arrow A in FIG. 5). Therefore, on the base plate 910, the brake unit 600 can be easily replaced.

Figure 6:
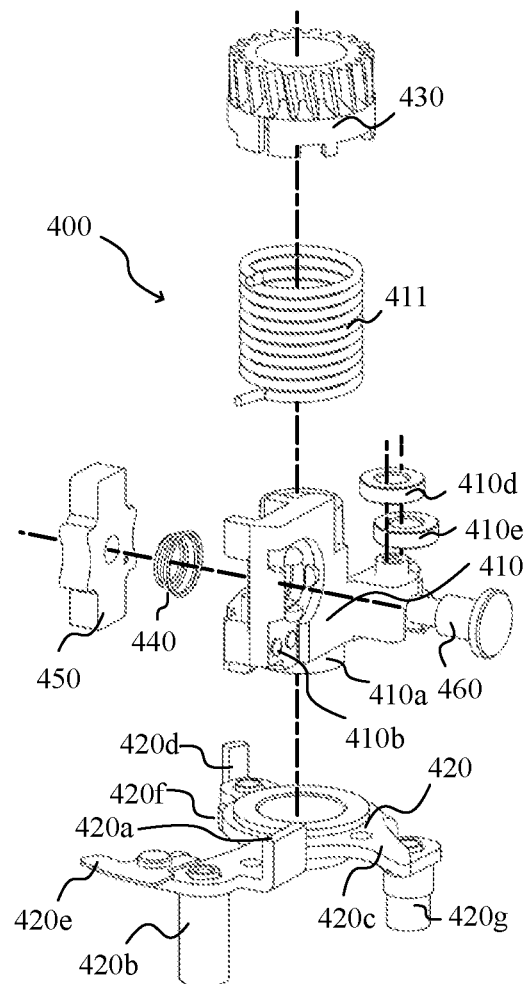
FIG. 6 is an exploded perspective view of a front driving lever unit according to the embodiment.

FIG. 6 is an exploded perspective view of the front driving lever unit 400. The front driving lever unit 400 is formed by two bodies of the front driving lever 410 and the front blade lever 420. The front armature (first movable iron piece) 450 is caulked and held while a tip of a front armature shaft 460 is locally deformed and the front driving lever 410 and an armature spring 440 are disposed between the front armature 450 and the front armature shaft 460. This armature unit can be charged by a minute amount in a direction of compressing the armature spring 440 against the front driving lever 410.

Since the plurality of components are involved in the charging operation of the driving levers, it is difficult to bring the front armature 450 into precise contact with an attraction surface of the front yoke 220. Therefore, a charge stroke of the front driving lever 410 charged by the front curtain charge cam gear 315 is made to have an excess amount in advance in addition to an amount for bringing the front armature 450 into contact with the front yoke 220, and a mechanism is provided for absorbing the excess charge. This mechanism uses the armature spring 440, the front armature 450, and the front armature shaft 460. This configuration is the same in the rear driving lever unit 500 illustrated in FIG. 7 described later.

Rollers 410d and 410e are respectively pushed by a cam 315a and a cam 315b of the front curtain charge cam gear 315 (refer to FIGS. 14A and 14B described later). A front blade lever fitting shaft 410a of the front driving lever 410 is fitted into the front blade lever 420. A driving lever contact portion 420a comes into contact with a front blade lever contact portion 410b of the front driving lever 410, and the front driving lever 410 and the front blade lever 420 integrally move during traveling.

The front driving pin 420b engages with the front main arm 750 to drive the shutter front curtain 700. The front blade lever 420 is biased toward the front driving lever 410 by a biasing force of the front anti-backlash spring 770 that is hooked to the front sub arm 760.

A locked portion 420c can be locked by the first locking lever 160. This acts to hinder the blades from bouncing when the shutter front curtain 700 travels from the blade unfolded state to the blade folded state. A locked portion 420d can be also locked by the second locking lever 170. The second locking lever 170 acts to hinder bouncing when the spring force of the front anti-backlash spring 770 causes the front blade lever 420 and the shutter front curtain 700 to return from the traveling completion state to the imaging standby position.

A PI shielding portion 420e blocks light to a front curtain detecting photointerrupter 31 in the vicinity of the traveling completion position so that whether or not the state is the traveling completion state is detected. A pressing portion 321b of the inverse charging lever 321 pushes a roller 420f so as to cause the front blade lever 420 to operate to the traveling completion position. When a brake pin 420g comes into contact with the front brake lever 620, a braking effect of sliding friction can be obtained from just before the completion of traveling, and the shock can be reduced when the traveling is completed.

Figure 7:
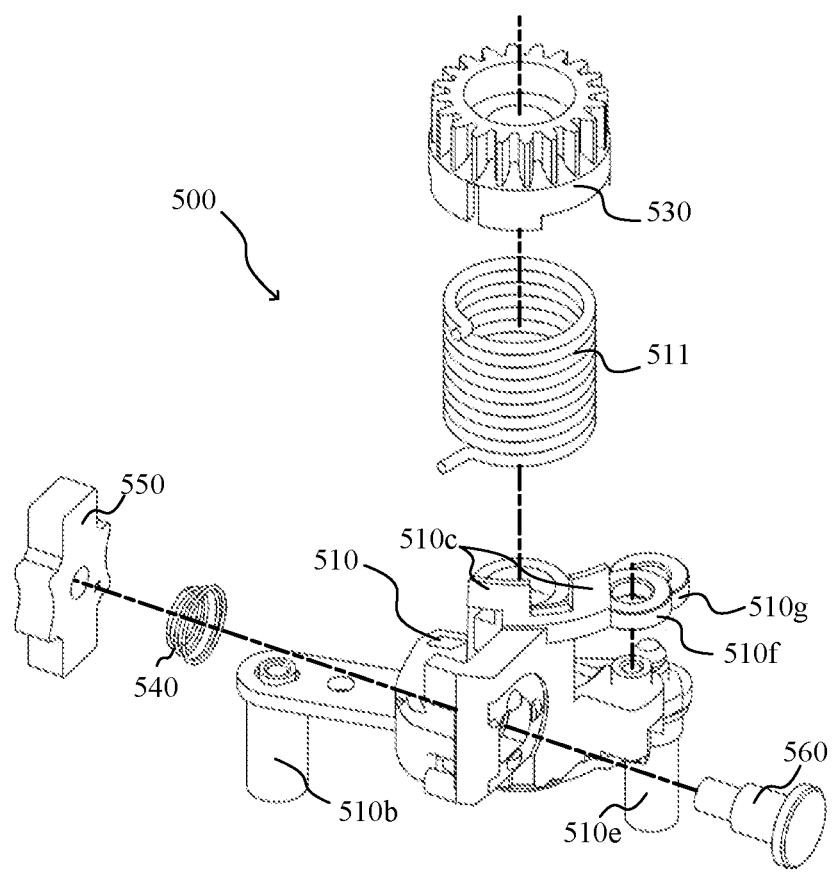
FIG. 7 is an exploded perspective view of a rear driving lever unit according to the embodiment.

FIG. 7 is an exploded perspective view of the rear driving lever unit 500. A rear armature (second movable iron piece) 550 is caulked and held while a tip of a rear armature shaft 560 is locally deformed and the rear driving lever 510 and an armature spring 540 are disposed between the rear armature 550 and the rear armature shaft 560. This armature unit can be charged by a minute amount in a direction of compressing the armature spring 540 against the rear driving lever 510.

The rear driving pin 510b engages with the rear main arm 850 to drive the shutter rear curtain 800. A PI shielding portion 510c blocks light to a rear curtain detecting photointerrupter 32 so that the state of the shutter rear curtain 800 is detected. When a brake pin 510e comes into contact with the rear brake lever 630, a braking effect of sliding friction can be obtained from just before the completion of traveling, and the shock can be reduced when the traveling is completed. Rollers 510f and 510g are respectively pushed by cams 317a and 317b of the rear curtain charge cam gear 317 (refer to FIGS. 14A and 14B described later).

Figure 8A:
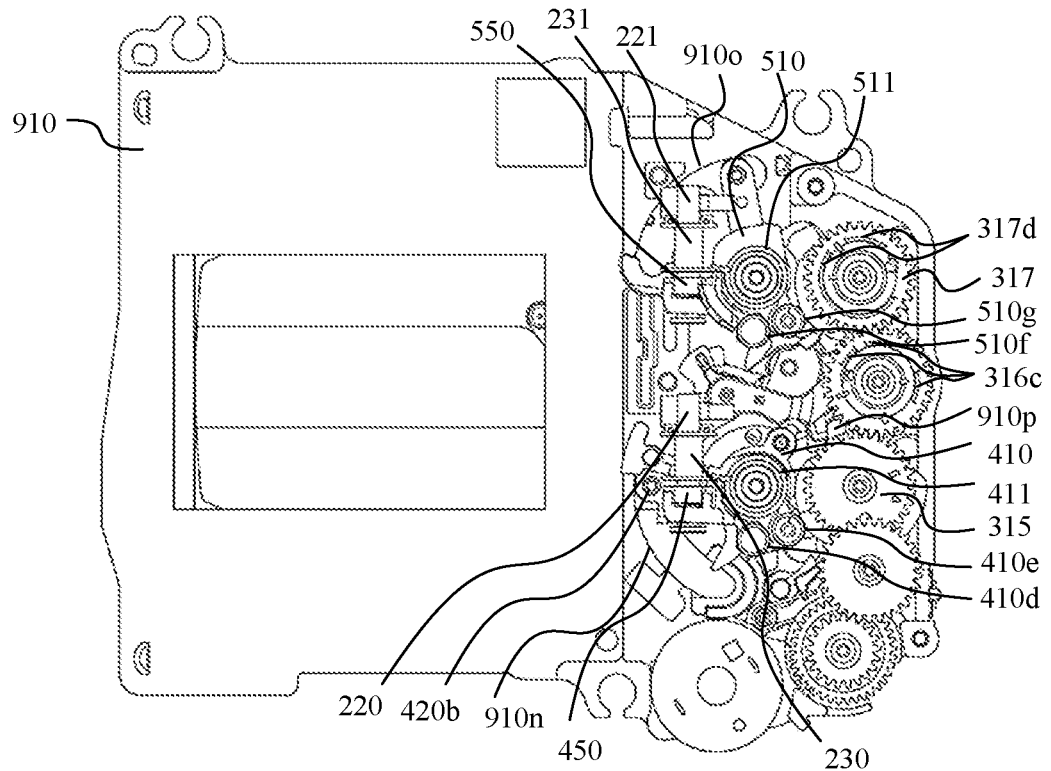
FIGS. 8A and 8B are front views of the focal plane shutter with an MG base plate unit removed, according to the embodiment.
Figure 8B:
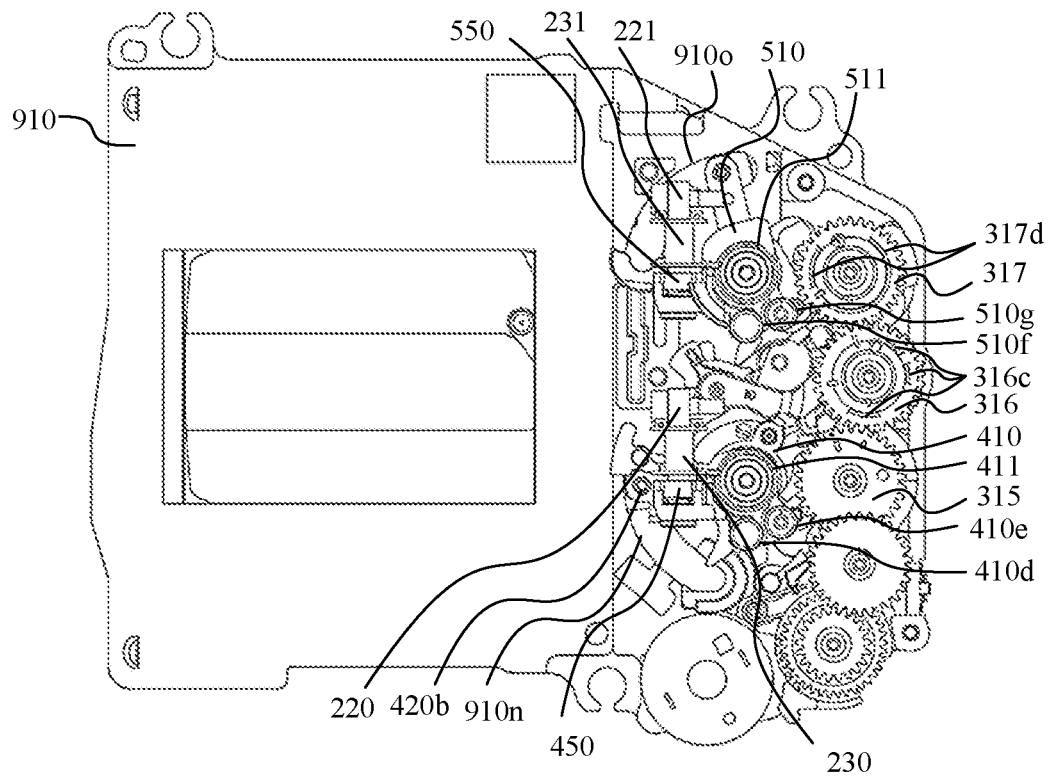

FIGS. 8A and 8B are front views of the focal plane shutter 1000 with the MG base plate unit 200 removed. FIG. 8A illustrates a state in which the front driving lever unit 400 and the rear driving lever unit 500 are respectively held by the front curtain charge cam gear 315 and the rear curtain charge cam gear 317. FIG. 8B illustrates a state in which the front driving lever unit 400 and the rear driving lever unit 500 are respectively attracted and held by the electromagnet including the front yoke 220 and the coil 230 and the electromagnet including the rear yoke 221 and the coil 231.

The front curtain charge cam gear 315 and the rear curtain charge cam gear 317 respectively cause the front driving lever 410 and the rear driving lever 510 to rotate against the biasing forces of the driving spring 411 and the driving spring 511. As illustrated in FIG. 8A, the front driving lever 410 and the rear driving lever 510 are respectively held by the front curtain charge cam gear 315 and the rear curtain charge cam gear 317, at the set position where the charging is completed. Thereafter, the front curtain charge cam gear 315 and the rear curtain charge cam gear 317 rotate, and the cam gears release the holding of the front driving lever 410 and the rear driving lever 510. Then, as illustrated in FIG. 8B, the front driving lever 410 and the rear driving lever 510 become ready for traveling (hereinafter, this state is referred to as the imaging standby position). At this time, the front armature 450 of the front driving lever 410 and the rear armature 550 of the rear driving lever 510 are respectively held by the electromagnet including the front yoke 220 and the coil 230 and the electromagnet including the rear yoke 221 and the coil 231.

Figure 9A:
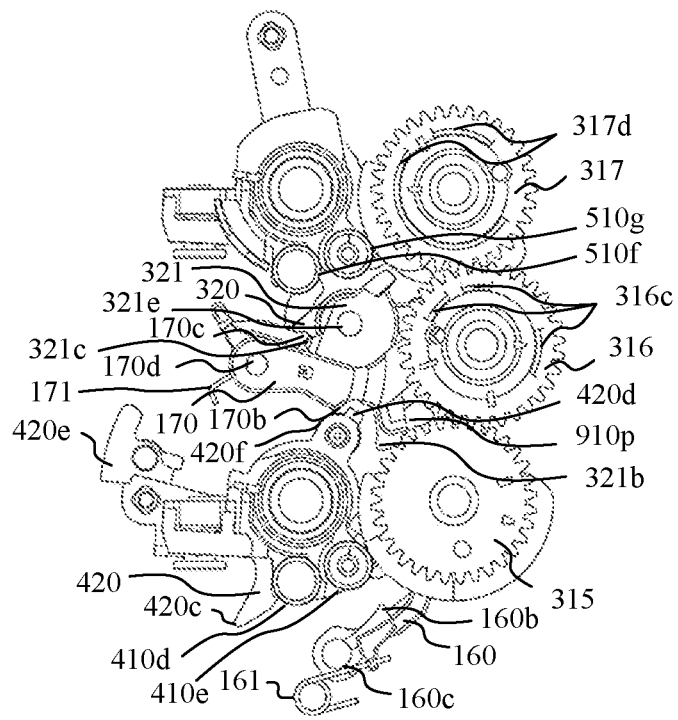
FIGS. 9A and 9B are a front view in a set phase and a rear view in the set phase each of which illustrates a relation between the driving lever units, cam gears, a first locking lever, a second locking lever, a one-way lever, and an inverse charging lever, according to the embodiment.
Figure 9B:
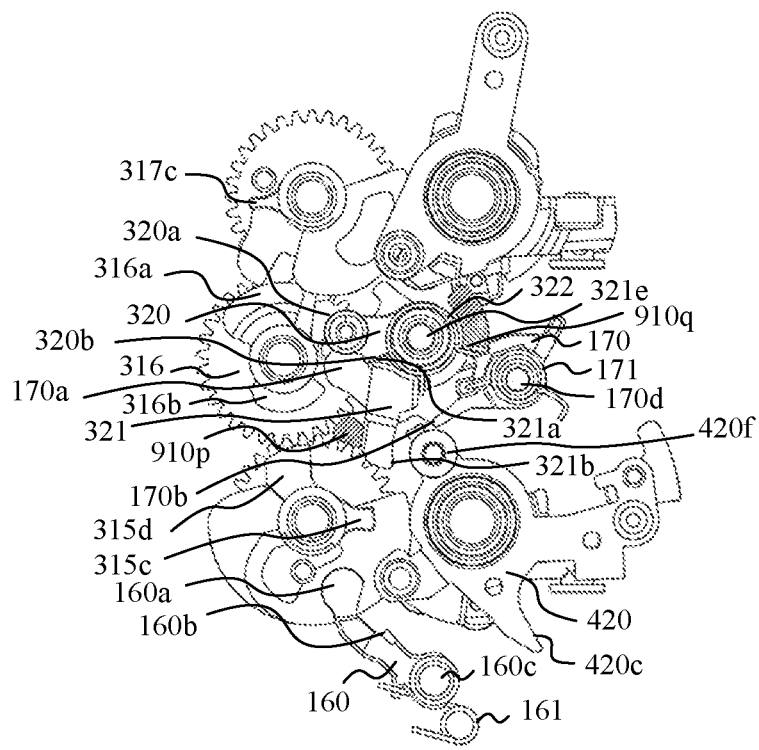
Figure 10A:
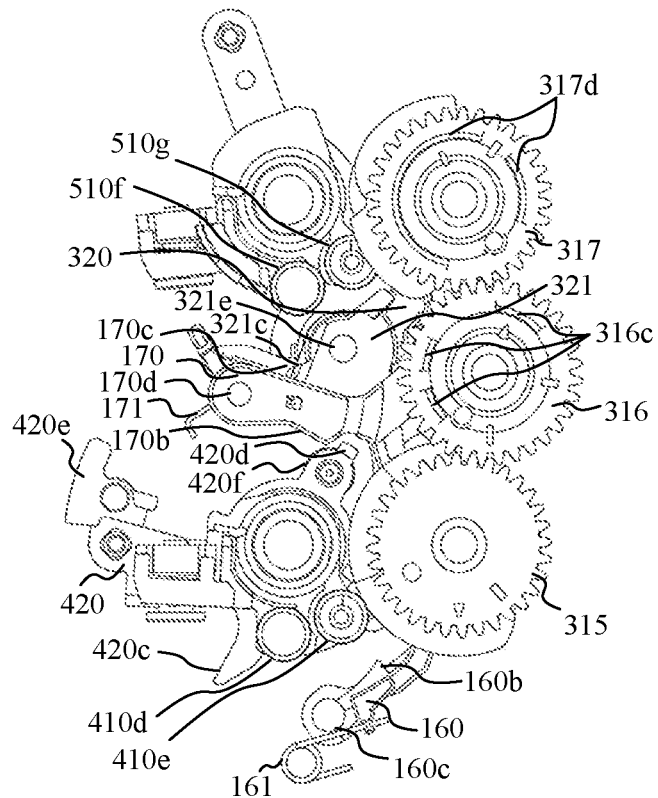
FIGS. 10A and 10B are a front view and a rear view each of which illustrates a state in which an intermediate cam gear completes charging of the one-way lever, according to the embodiment.
Figure 10B:
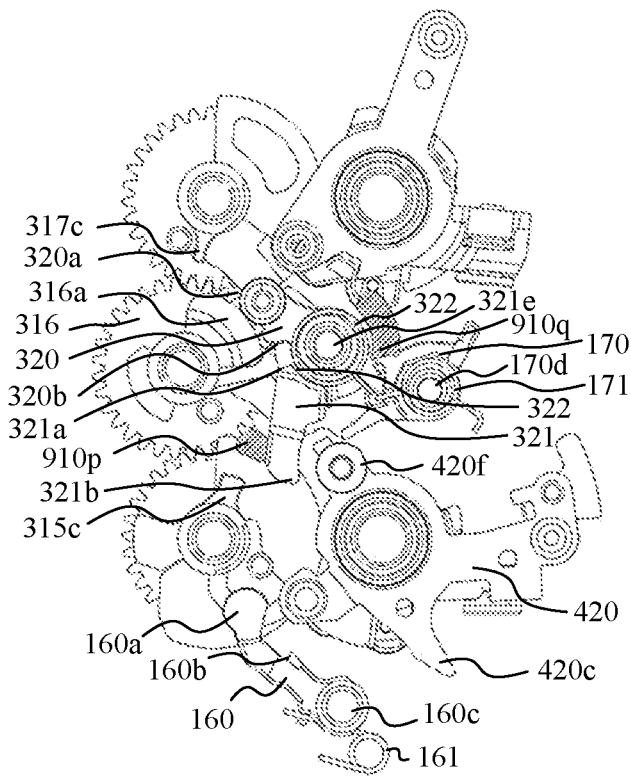
Figure 11A:
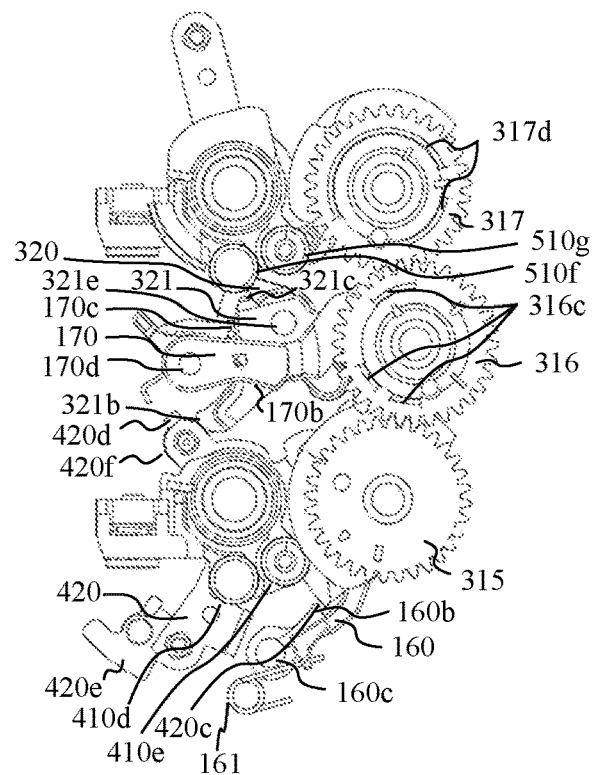
FIGS. 11A and 11B are a front view and a rear view each of which illustrates a state in which the inverse charging lever completes charging of a front blade lever, according to the embodiment.
Figure 11B:
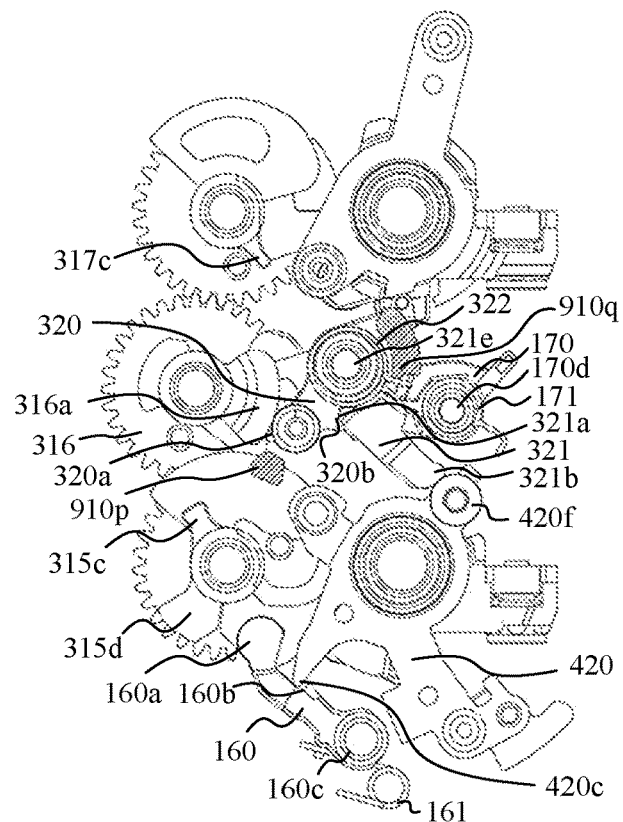

FIGS. 9A and 9B are a front view in a set phase and a rear view in the set phase each of which illustrates relations between the driving lever units, the cam gears, the first locking lever 160, the second locking lever 170, the one-way lever 320, and the inverse charging lever 321. FIGS. 10A and 10B are a front view and a rear view each of which illustrates a state in which the intermediate cam gear 316 completes charging of the one-way lever 320 and the intermediate cam gear 316 has completed retraction of the one-way lever 320. FIGS. 11A and 11B are a front view and a rear view each of which illustrates a state in which the inverse charging lever 321 completes the inverse charging of the front blade lever 420.

The first locking lever 160 is rotatably supported by the base plate 910 at a rotation hole portion 160c, and is biased by a biasing spring 161 in a counterclockwise direction of FIG. 9A about the rotation hole portion 160c. A cam 315d of the front curtain charge cam gear 315 causes the operated portion 160a to rotate in a clockwise direction of FIG. 9A about the rotation hole portion 160c against the biasing force of the biasing spring 161 so that the operated portion 160a retracts from the traveling trajectory of the front blade lever 420 (unlocking operation). A locking portion 160b locks the locked portion 420c of the front blade lever 420 in the vicinity of the traveling completion position, and thereby it is possible to hinder the front blade lever 420 from bouncing during traveling and to maintain the locking of the front blade lever 420 during the set phase in a case of normally open.

The second locking lever 170 is rotatably supported by the base plate 910 at a rotation hole portion 170d, and is biased by the biasing spring 171 in the clockwise direction of FIG. 9A about the rotation hole portion 170d. A cam 316b of the intermediate cam gear 316 causes an operated portion 170a to rotate in the counterclockwise direction of FIG. 9A about the rotation hole portion 170d against the biasing force of the biasing spring 171 so that the operated portion 170a retracts from the traveling trajectory of the front blade lever 420 (unlocking operation). A locking portion 170b locks the locked portion 420d of the front blade lever 420 in the vicinity of the imaging standby position, and thereby it is possible to hinder the front blade lever 420 from bouncing during returning traveling from the traveling completion position to the imaging standby position and during the charging operation.

The inverse charging lever 321 is rotatably supported by the base plate 910 at a rotation hole portion 321e. The one-way lever 320 is rotatably supported by the inverse charging lever 321 at a rotation hole portion 320c illustrated in FIG. 4A, and is rotatable about the same axis as the inverse charging lever 321.

During the forward rotation of the motor 340 (when the motor 340 rotates in the first rotation direction), the intermediate cam gear 316 rotates in a clockwise direction of FIG. 10A. A cam 316a comes into contact with a cam follower portion 320a of the one-way lever 320 in a predetermined phase, and causes the one-way lever 320 to rotate about the rotation hole portion 321e in a clockwise direction of FIG. 10B. At this time, a biasing spring (fourth biasing spring) 322 acts between the one-way lever 320 and the inverse charging lever 321 and biases the one-way lever 320 in the clockwise direction of FIG. 10A about the rotation hole portion 321e. That is, in cases other than a case where the inverse charging lever 321 moves the front blade lever 420 in a second direction, the inverse charging lever 321 acts on the one-way lever 320 via the biasing spring 322. On the other hand, since the inverse charging lever 321 is in contact with an inverse charging locking portion 910p of the base plate 910, the inverse charging lever 321 does not rotate and remains stopped. That is, the inverse charging lever 321 does not act on the other components.

During the reverse rotation of the motor 340 (when the motor 340 rotates in the second rotation direction), the intermediate cam gear 316 rotates in a counterclockwise direction of FIG. 11A, and the cam 316a comes into contact with the cam follower portion 320a of the one-way lever 320 in a predetermined phase. This operation causes the one-way lever 320 to rotate in a counterclockwise direction of FIG. 11B. At the same time, the pressing portion 320b of the one-way lever 320 pushes the pressed portion 321a of the inverse charging lever 321 and they integrally rotate in the counterclockwise direction of FIG. 11B.

Immediately after the start of the rotation of the inverse charging lever (second unlocking member) 321, a lock releasing portion 321c pushes a pressed portion 170c of the second locking lever 170, and the second locking lever 170 rotates in a counterclockwise direction of FIG. 11A about the rotation hole portion 321e. This operation causes the second locking lever 170 to retract from the traveling trajectory of the front blade lever 420 and to release the locking. Thereafter, the pressing portion 321b of the inverse charging lever 321 comes into contact with the roller 420f of the front blade lever 420 and causes the front blade lever 420 to rotate in the clockwise direction of FIG. 11B against the biasing force of the front anti-backlash spring 770 (inverse charging). In this way, when the motor 340 rotates in the second rotation direction, the inverse charging lever 321 is used for the transition from the state in which the front blade lever 420 is locked to the retracted state in which the traveling can be performed.

The locked portion 420c of the front blade lever 420 rotates to some extent beyond the locking portion 160b of the first locking lever 160, and the motor 340 stops. At this time, the biasing spring 322 acts between the inverse charging lever 321 and a spring locking portion 910q of the base plate 910 and biases the inverse charging lever 321 in the counterclockwise direction of FIG. 11A. In this way, since the one-way lever 320 and the inverse charging lever 321 are supported to be separately rotatable, it is possible to make the inverse charging lever 321 act on the front blade lever 420 only during the reverse rotation of the motor 340. That is, it is not necessary to install a dedicated actuator or the like that requires a separate control from the motor 340. Furthermore, there is no need for ensuring a place to install the dedicated actuator, and the unit can be made small. In addition, by changing the component on which the biasing spring 322 acts according to whether the rotation of the motor 340 is the forward rotation or the reverse rotation, the biasing direction can be changed by one component.

Thereafter, the motor 340 rotates in the forward rotation direction again so that the front driving lever 410 and the rear driving lever 510 are held by the cams of the front curtain charge cam gear 315 and the rear curtain charge cam gear 317. Since the inverse charging lever 321 returns to the standby position, the locked portion 420c is locked by the locking portion 160b of the first locking lever 160 and the front blade lever 420 stops even though the biasing force of the front anti-backlash spring 770 biases the front blade lever 420 in the clockwise direction of FIG. 10A.

As described above, since the inverse charging lever 321 causes the front blade lever 420 to rotate in the clockwise direction of FIG. 10B only during the reverse rotation of the motor 340, the opening 910a of the base plate 910 can be opened and normally open can be realized. In other words, the change in the rotation direction of the motor 340 can change a method when the power is turned off to a normally open method with the opening 910a open and to a normally closed method with the opening 910a closed, while no dedicated actuator is equipped.

Figure 12A:
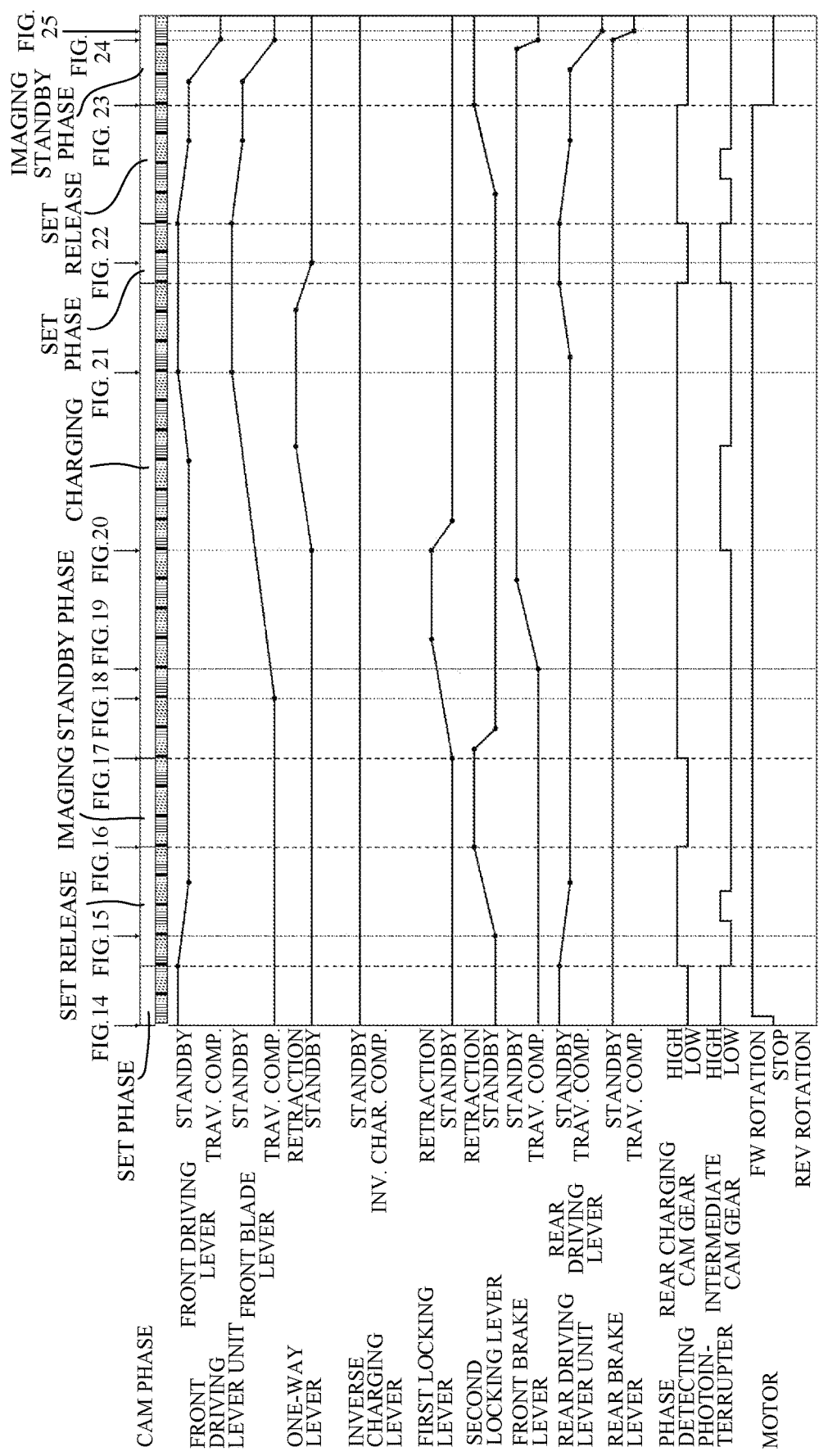
FIG. 12A is a cam diagram illustrating a movement of each component and signal states during a forward rotation of a motor, according to the embodiment.
Figure 12B:
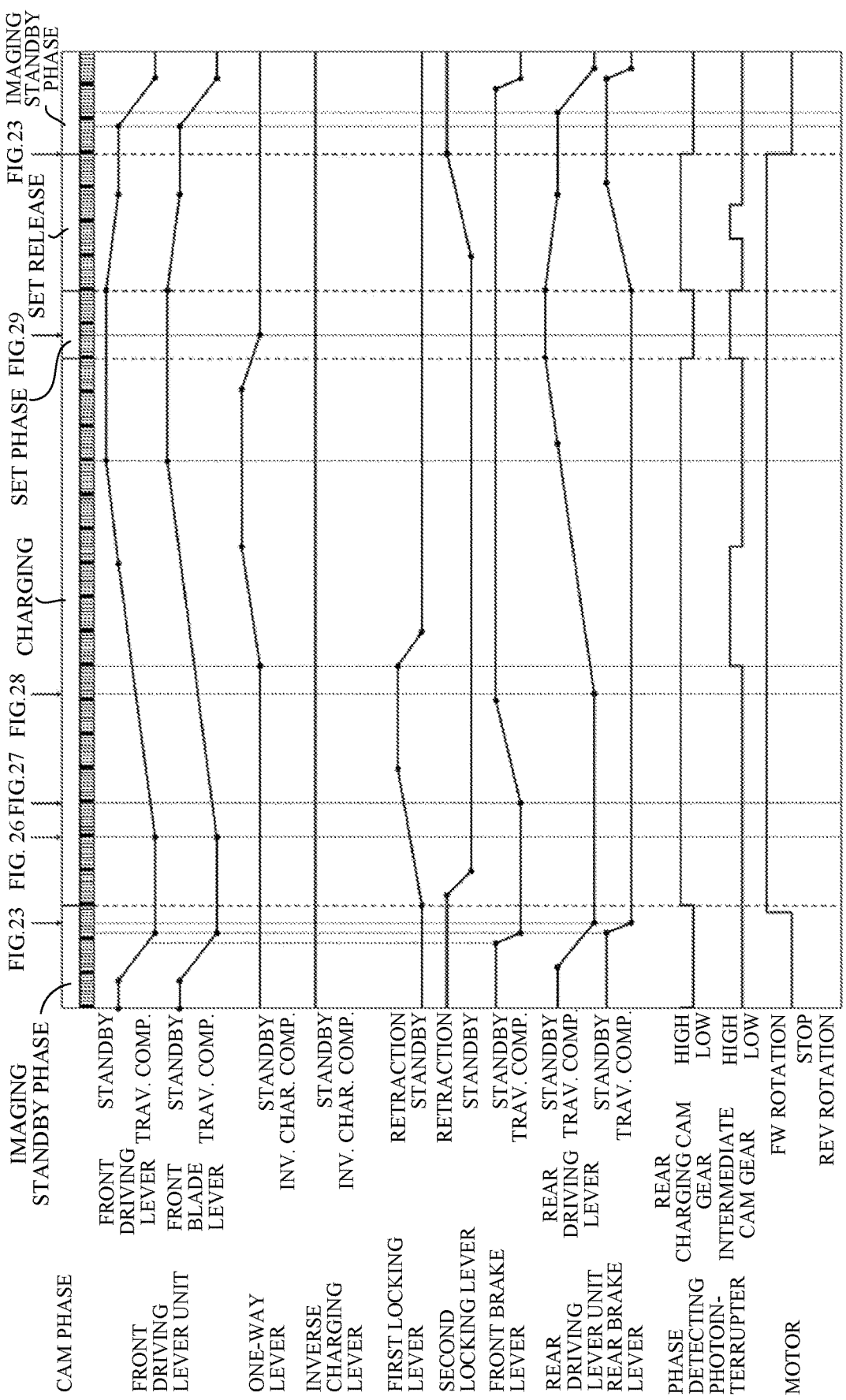
FIG. 12B is a cam diagram illustrating the movement of each component and the signal states during the forward rotation of the motor according to the embodiment.

Next, a description is given of a series of operations of the focal plane shutter 1000 during imaging using the shutter front curtain 700 and the shutter rear curtain 800 with reference to FIGS. 12A to 36B. FIGS. 12A and 12B are cam diagrams illustrating a movement of each component and signal states during the forward rotation of the motor. FIG. 12B is a continuation of FIG. 12A, and a combination of these two figures illustrates a series of operations. In FIGS. 12A and 12B, "TRAV. COMP." represents "traveling completion", "INV. CHAR. COMP." represents "inverse charging", "FW ROTATION" represents "forward rotation", and "REV ROTATION" represents "reverse rotation". The same applies to FIG. 30 described later. FIGS. 12A and 12B include corresponding figure numbers of FIGS. 13 to 30. Each of FIGS. 13 to 29B and FIGS. 32A to 36B omits illustrations of the motor 340 and a gear portion of each gear of the pinion gear 311, the idle gear 312, the first gear 313, the second gear 314, the idle gear 312, the front curtain charge cam gear 315, and the rear curtain charge cam gear 317. For simplification, each of FIGS. 13 to 30 and FIGS. 32A to 36B omits illustrations of the biasing spring 161, the biasing spring 171, the driving spring 411, the armature spring 440, the armature spring 540, the front anti-backlash spring 770, and the rear anti-backlash spring 870.

Figure 13:
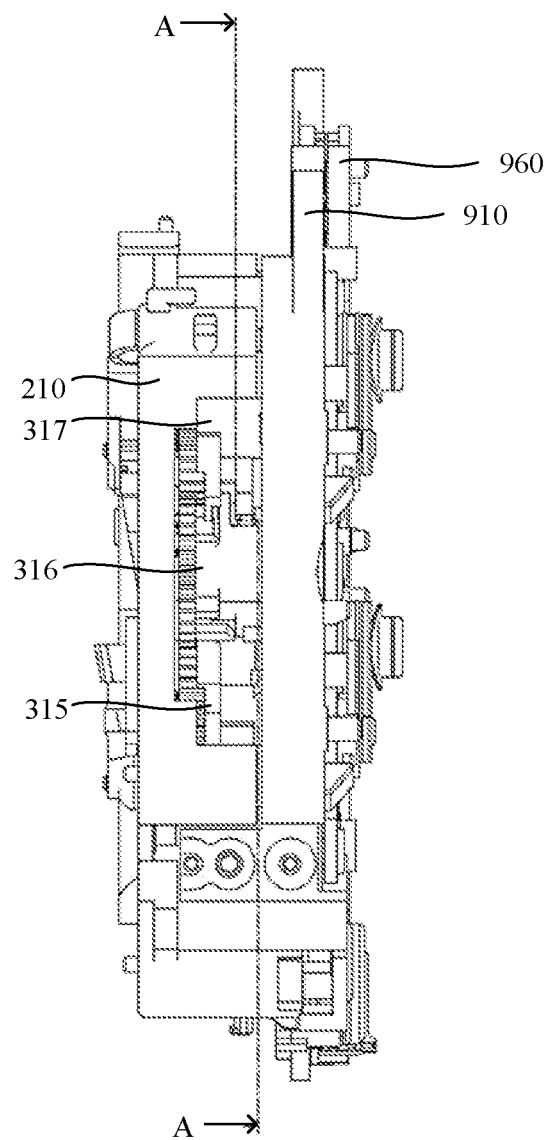
FIG. 13 is a side view of a focal plane shutter as viewed from a charging-system-component side according to the embodiment.

FIG. 13 is a side view of the focal plane shutter 1000 as viewed from the charging system components 300 side. A sectional view at a line A-A in FIG. 13 is a sectional view that omits an illustration of the second locking lever 170 so that the cam portion of each gear, the one-way lever 320, and the inverse charging lever 321 can be easily viewed. Each sectional view of state transition diagrams described later is a sectional view at the line A-A in FIG. 13.

Figure 14A:
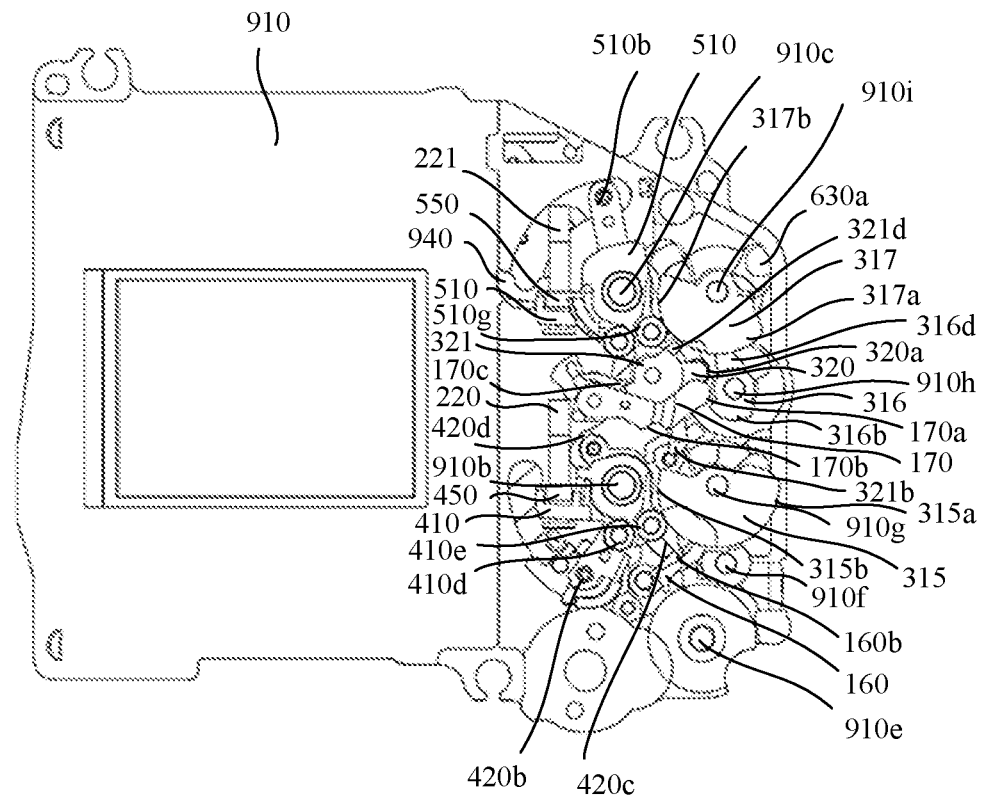
FIGS. 14A and 14B are a planar view and a sectional view each of which illustrates a normally open state according to the embodiment.
Figure 14B:
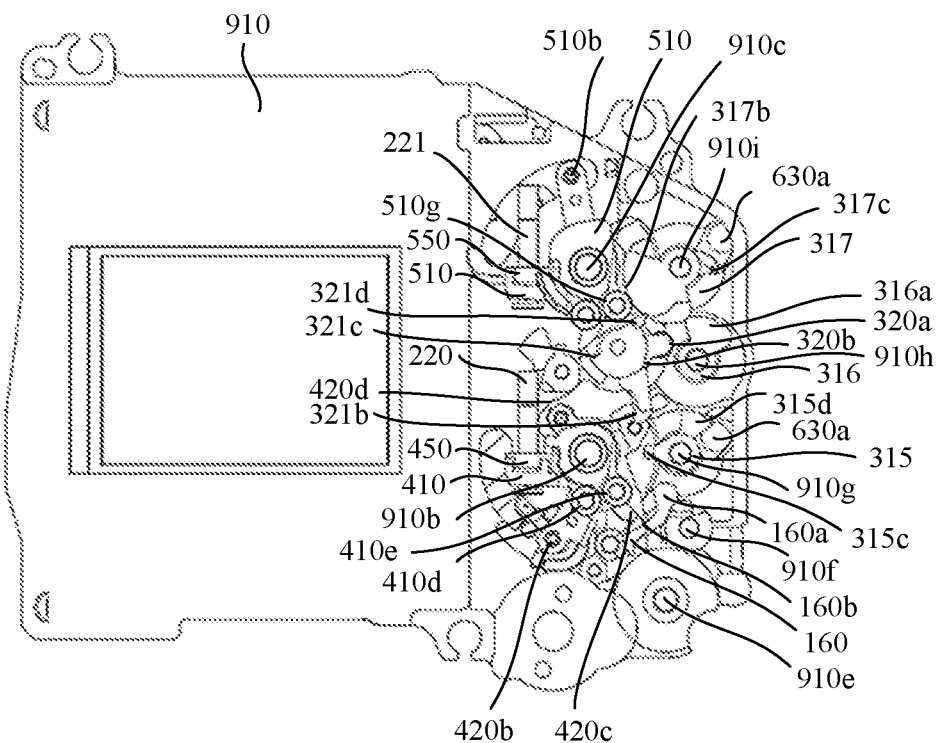

FIGS. 14A and 14B are a planar view and a sectional view each of which illustrates a normally open state. The normally open state is a state in which, as illustrated in FIG. 14A, the front curtain charge cam gear 315 locks the roller 410e of the front driving lever 410 so as to hinder the biasing force of the driving spring 411 from rotating the front driving lever 410 counterclockwise. On the other hand, as illustrated in FIG. 14B, the biasing force of the biasing spring 161 makes the first locking lever 160 held by the base plate 910. The locking portion 160b of the first locking lever 160 locks the locked portion 420c of the front blade lever 420 so as to hinder the biasing force of the front anti-backlash spring 770 from rotating the front blade lever 420 clockwise and to lock the front blade lever 420 at the traveling completion position. Therefore, the shutter front curtain 700 is in the folded state, and a light beam from the lens apparatus 2 is guided to the image sensor 6. As illustrated in FIG. 14A, the cam 317b of the rear curtain charge cam gear 317 locks the roller 510g held by the rear driving lever 510 so as to hinder the biasing force of the driving spring 511 from rotating the rear curtain charge cam gear 317 counterclockwise.

When the image pickup apparatus 1 is turned on and the unillustrated release button is operated, the energization to the coil 230 and the coil 231 is started, and at the same time, the energization to the motor 340 in the forward rotation direction is started. At this time, the front driving lever 410 and the rear driving lever 510 are held by the electromagnets. Subsequently, the unillustrated motor 340 is continuously energized, and the rotation of the motor 340 is transmitted to the pinion gear 311, the idle gear 312, the first gear 313, and the second gear 314. Thereby, the front curtain charge cam gear 315, the intermediate cam gear 316, and the rear curtain charge cam gear 317 rotate to perform set release in which the phase transitions from the set phase to the imaging standby phase.

Figure 15:
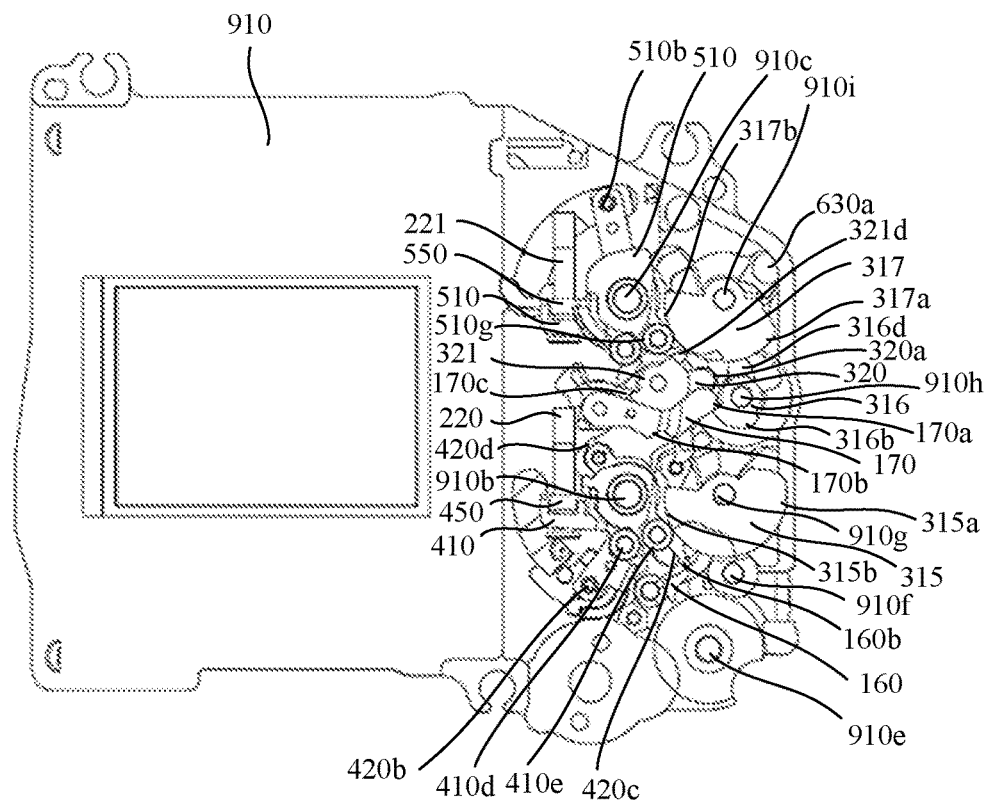
FIG. 15 is a planar view illustrating a state in which a cam of the intermediate cam gear starts to come into contact with an operated portion of the second locking lever, according to the embodiment.

FIG. 15 is a planar view illustrating a state in which the cam 316b of the intermediate cam gear 316 starts to come into contact with the operated portion 170a of the second locking lever 170. The contact of the cam 316b causes the second locking lever 170 to start to retract from the traveling trajectory of the front blade lever 420. During the set release, the roller 410e is released from the contact with the cam 315b of the front curtain charge cam gear 315. Similarly, the roller 510g is released from the contact with the cam 317b of the rear curtain charge cam gear 317. On the other hand, the driving levers 410 and 510 continue to be held by the electromagnets.

Figure 16:
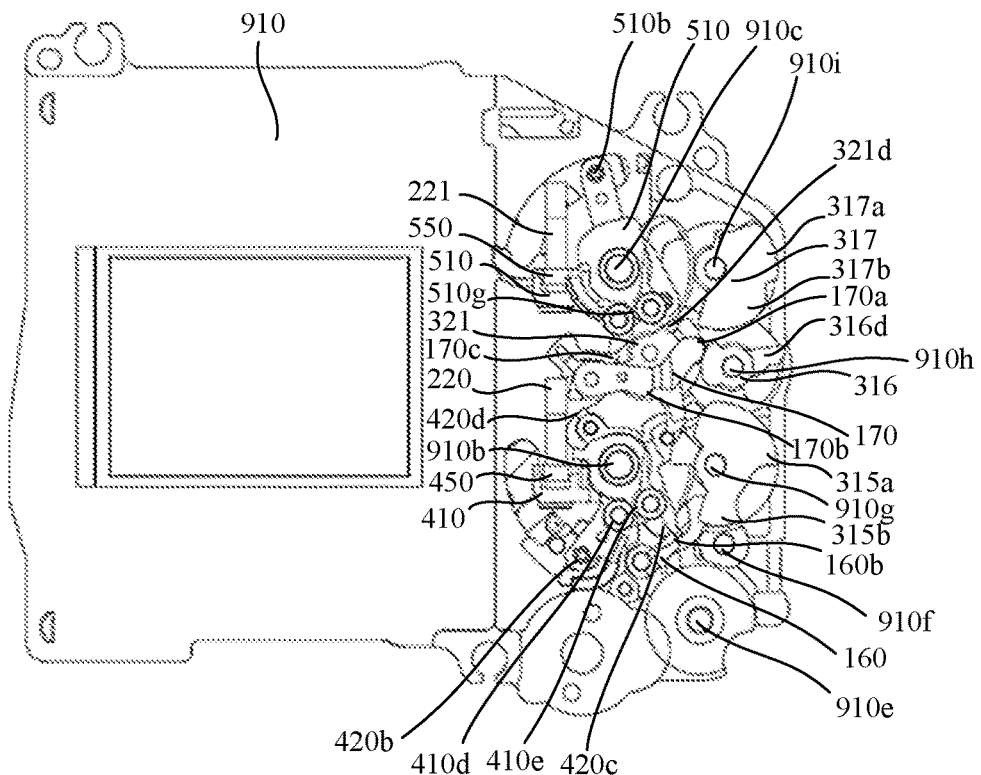
FIG. 16 is a planar view illustrating a state in which a phase enters an imaging standby phase, according to the embodiment.

FIG. 16 is a planar view illustrating a state in which the phase enters the imaging standby phase after the motor 340 is further energized from the state of FIG. 15, and the front curtain charge cam gear 315 and the rear curtain charge cam gear 317 are rotated. The cams 315a and 315b of the front curtain charge cam gear 315 are retracted from the traveling trajectory of the front driving lever 410. The cams 317a and 317b of the rear curtain charge cam gear 317 are retracted from the traveling trajectory of the rear driving lever 510. The cam 316b of the intermediate cam gear 316 is in contact with the operated portion 170a of the second locking lever 170 so as to hold the second locking lever 170 in a state of retracting from the traveling trajectory of the front driving lever 410. Here, the front driving lever 410 and the rear driving lever 510 continue to be held by the electromagnets as the coils 230 and 231 are energized. The front blade lever 420 remains in a state where the locked portion 420c is locked by the locking portion 160b of the first locking lever 160, and the shutter front curtain 700 remains in the folded state.

Figure 17:
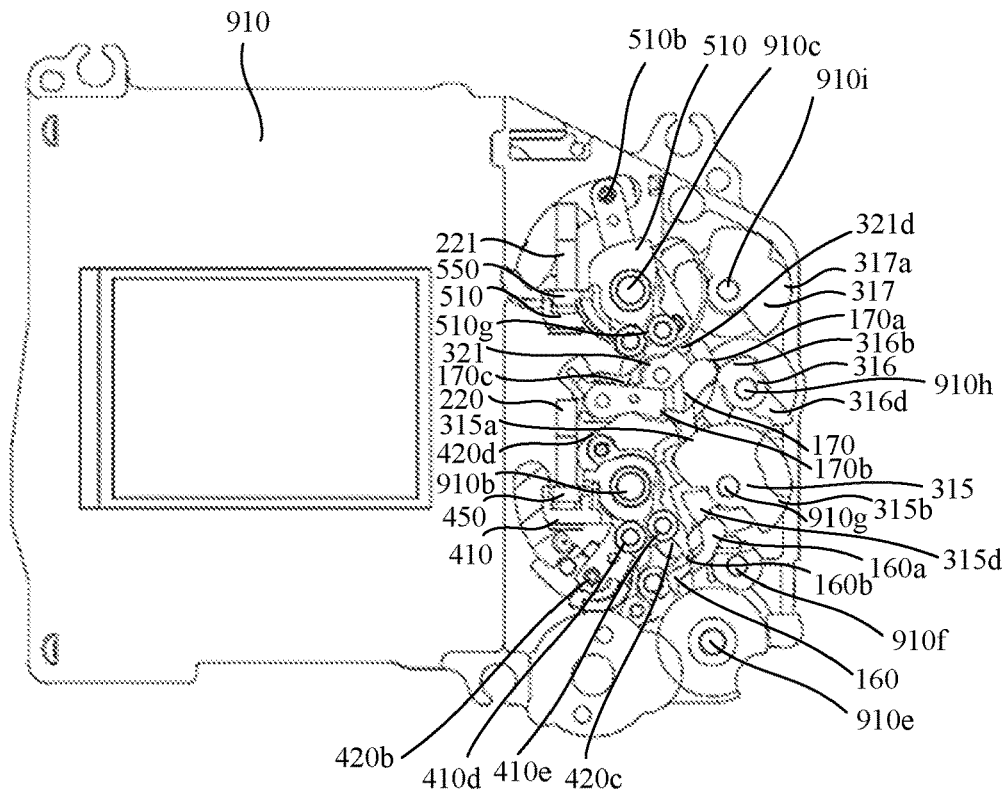
FIG. 17 is a planar view illustrating a state in which an operated portion of the first locking lever is in contact with a cam of a front curtain charge cam gear, according to the embodiment.

FIG. 17 is a planar view illustrating a state in which the operated portion 160a of the first locking lever 160 comes into contact with the cam 315d of the front curtain charge cam gear 315 after the motor 340 is further energized from the state of FIG. 16. The cam 315d of the front curtain charge cam gear 315 starts to come into contact with the operated portion 160a of the first locking lever 160, and the first locking lever 160 starts to rotate clockwise against the biasing force of the biasing spring 161. When the contact between the operated portion 170a of the second locking lever 170 and the cam 316b of the intermediate cam gear 316 is released, the biasing force of the biasing spring 171 causes the second locking lever 170 to return into the traveling trajectory of the front blade lever 420.

Figure 18:
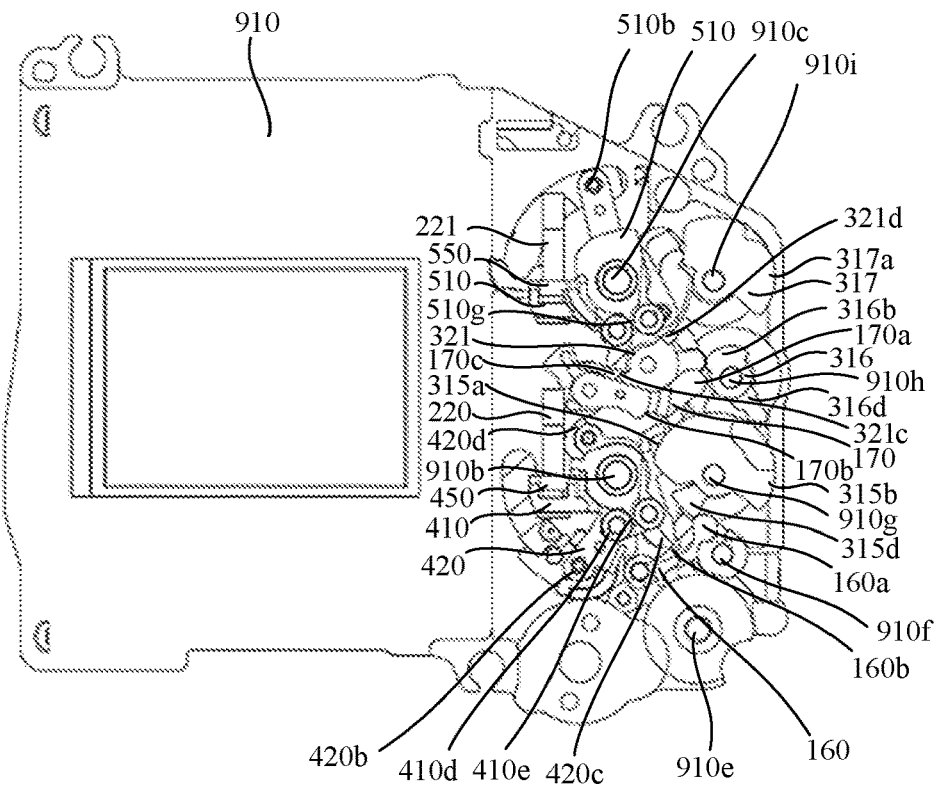
FIG. 18 is a planar view illustrating a state in which the front blade lever is released from locking by the first locking lever according to the embodiment.

FIG. 18 is a planar view illustrating a state in which the front blade lever 420 is released from the locking by the first locking lever 160 after the motor 340 is further energized from the state illustrated in FIG. 17 and the front curtain charge cam gear 315 and the rear curtain charge cam gear 317 rotates. When the first locking lever 160 retracts from the traveling trajectory of the front blade lever 420, the front blade lever 420 is released from the locking by the first locking lever 160. Thereafter, the biasing force of the front anti-backlash spring 770 causes the front blade lever 420 to start to rotate clockwise from the traveling completion position toward the standby position. At this time, the shutter front curtain 700 linked to the front blade lever 420 also starts to rotate clockwise and starts to move from the folded state to the unfolded state. Further, the contact between the operated portion 170a of the second locking lever 170 and the cam 316b of the intermediate cam gear 316 is released, and the second locking lever 170 returns into the traveling trajectory of the front blade lever 420.

Figure 19A:
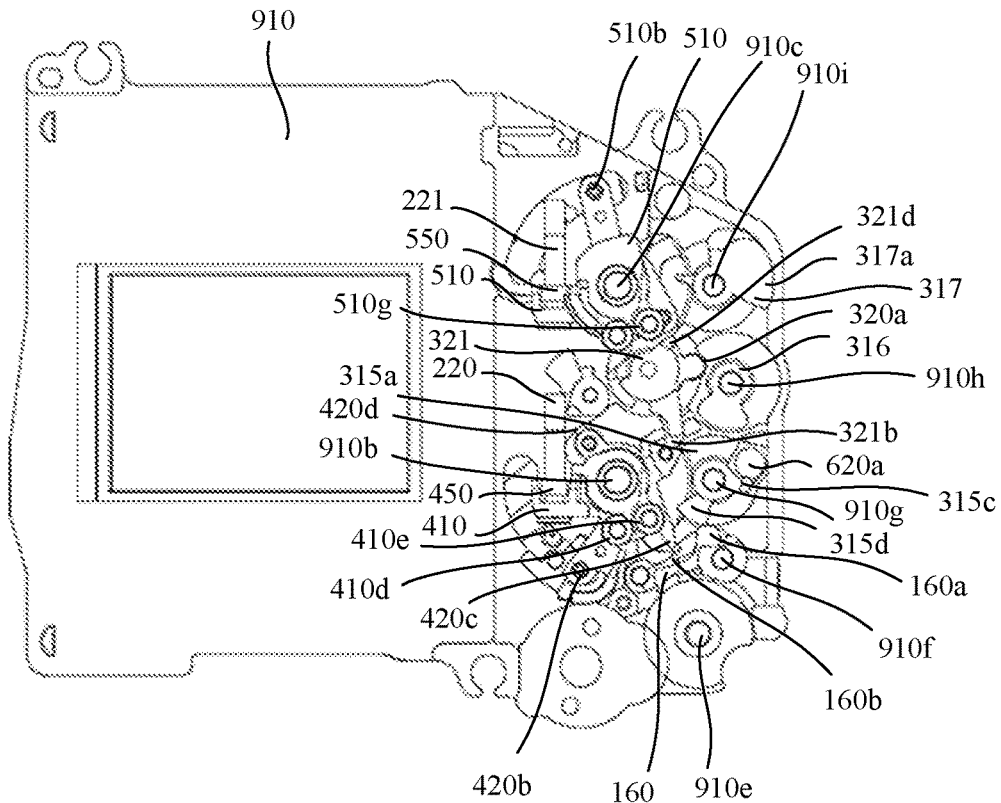
FIGS. 19A and 19B are a planar view and a rear view each of which illustrates a state in which the cam of the front curtain charge cam gear starts to come into contact with a cam follower of a front brake lever, according to the embodiment.
Figure 19B:
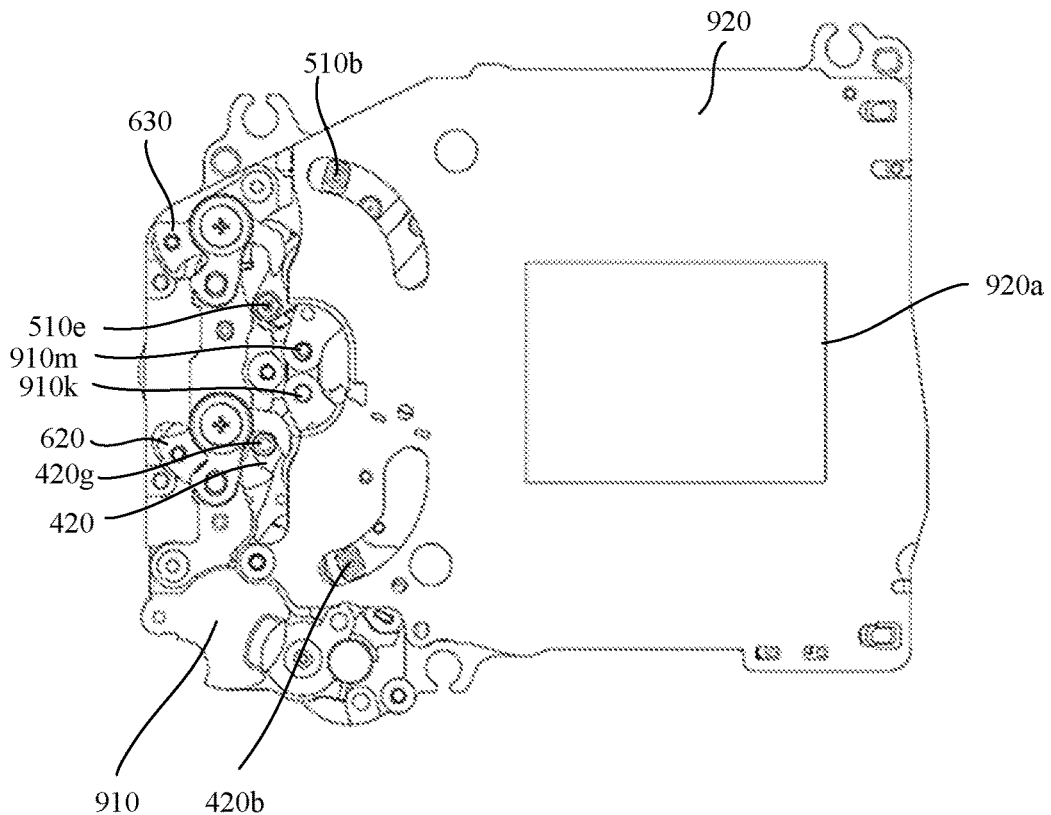

FIGS. 19A and 19B are a planar view and a rear view each of which illustrates a state in which the cam 315c of the front curtain charge cam gear 315 starts to come into contact with the cam follower 620a of the front brake lever 620 after the motor 340 is further energized from the state illustrated in FIG. 18. Here, as will be described later, in a state where the front blade lever 420 is at the standby position, the front brake lever 620 is stopped in the traveling trajectory of the front blade lever 420. The front brake lever 620 starts to come into contact with the brake pin 420g of the front blade lever 420 at a position just before the traveling completion position of the traveling front blade lever 420, rotates to the traveling completion position of the front blade lever 420 while being in contact with the brake pin 420g, and stops. Hereinafter, the stopping position of the front brake lever 620 just before the traveling completion position of the front blade lever 420 is referred to as an operation standby position, and the position of the front brake lever 620 when the front blade lever 420 at the traveling completion position is referred to as an operation completion position.

Since the front blade lever 420 is locked at the traveling completion position in the normally open state illustrated in FIGS. 14A and 14B, the front brake lever 620 stops at the operation completion position from the normally open state illustrated in FIGS. 14A and 14B to the state illustrated in FIGS. 18A and 18B. When the front curtain charge cam gear 315 rotates, the cam 315c of the front curtain charge cam gear 315 pushes the cam follower 620a of the front brake lever 620, and the front brake lever 620 rotates from the operation completion position to the operation standby position. A rotational velocity of the front blade lever 420 is slower than a rotational velocity of the front brake lever 620 rotated by the cam 315c of the front curtain charge cam gear 315 because the biasing force of the front anti-backlash spring 770 is weak. Therefore, the front brake lever 620 comes into contact with the brake pin 420g of the front blade lever 420 that has started to rotate prior to the rotation of the front brake lever 620 from the state illustrated in FIG. 18, and rotates while pushing the front blade lever 420.

After the front curtain charge cam gear 315 further rotates and the cam follower 620a of the front brake lever 620 moves to a cam top of the cam 315c, the front brake lever 620 stops at the operation standby position. On the other hand, the front blade lever 420 continues to rotate while accelerating due to the biasing force from the front anti-backlash spring 770 and the driving force of pushing by the front brake lever 620. That is, the power of the front curtain charge cam gear 315 is transmitted to the front blade lever 420 via the front brake lever 620. The assistance of the rotation of the front brake lever 620 to the start of the rotation of the front blade lever 420 realizes an increase in a speed of returning traveling operation in which the front blade lever 420 moves from the traveling completion position to the standby position. This makes it possible to shorten a required time for the shutter front curtain 700 to move from the folded state to the unfolded state, which is effective in increase in the frame rate.

The biasing force of the front anti-backlash spring 770 is a biasing force in a direction of canceling the biasing force of the driving spring 411. If the spring force of the front anti-backlash spring 770 is increased for speeding up the returning traveling operation, it is also necessary to increase the spring force of the driving spring 411.

Therefore, the assistance of the front brake lever 620 makes it unnecessary to increase the spring force of the front anti-backlash spring 770 for speeding up the returning traveling operation, which makes it unnecessary to increase the spring force of the driving spring 411. As a result, it becomes possible to reduce a load for charging the biasing force of the driving spring 411, which is effective for improving the frame rate (speed of continuous imaging) and for reducing a current value of the motor 340.

Figure 20A:
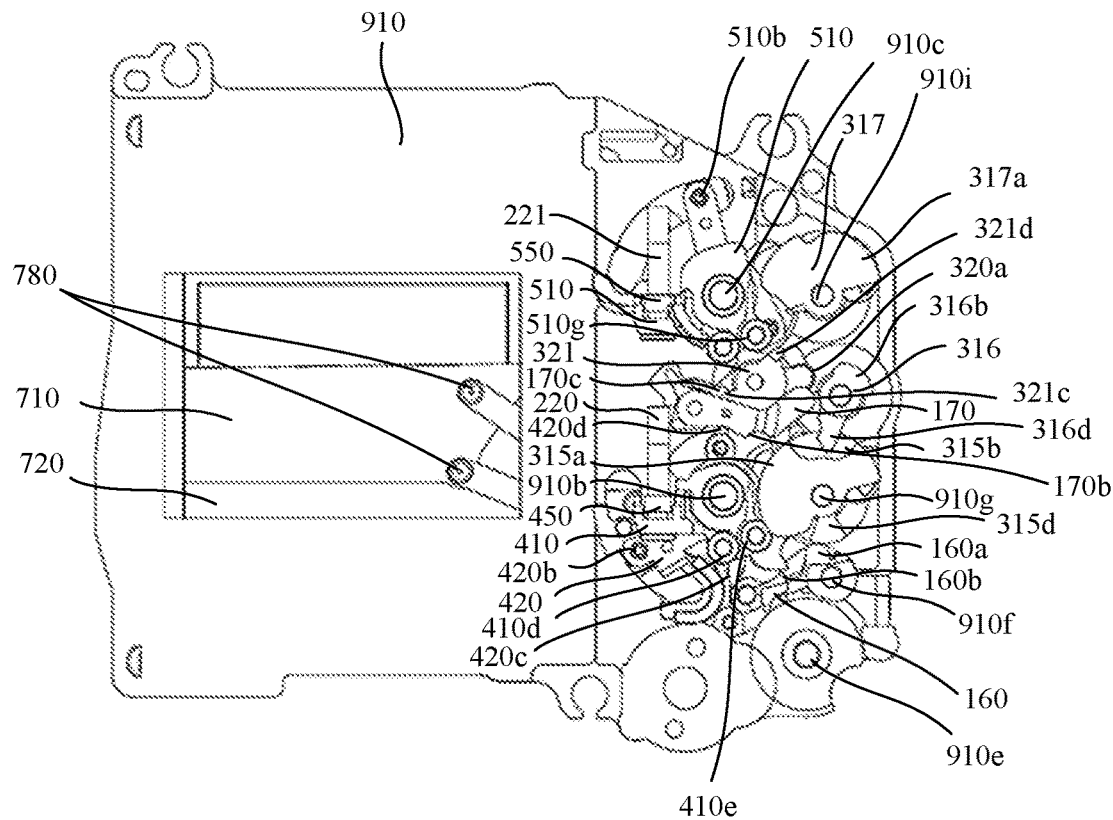
FIGS. 20A and 20B are a planar view illustrating a state in which the front blade lever starts to come into contact with the second locking lever, and a sectional view illustrating a state in which the cam of the intermediate cam gear starts to come into contact with a cam follower portion of the one-way lever, according to the embodiment.
Figure 20B:
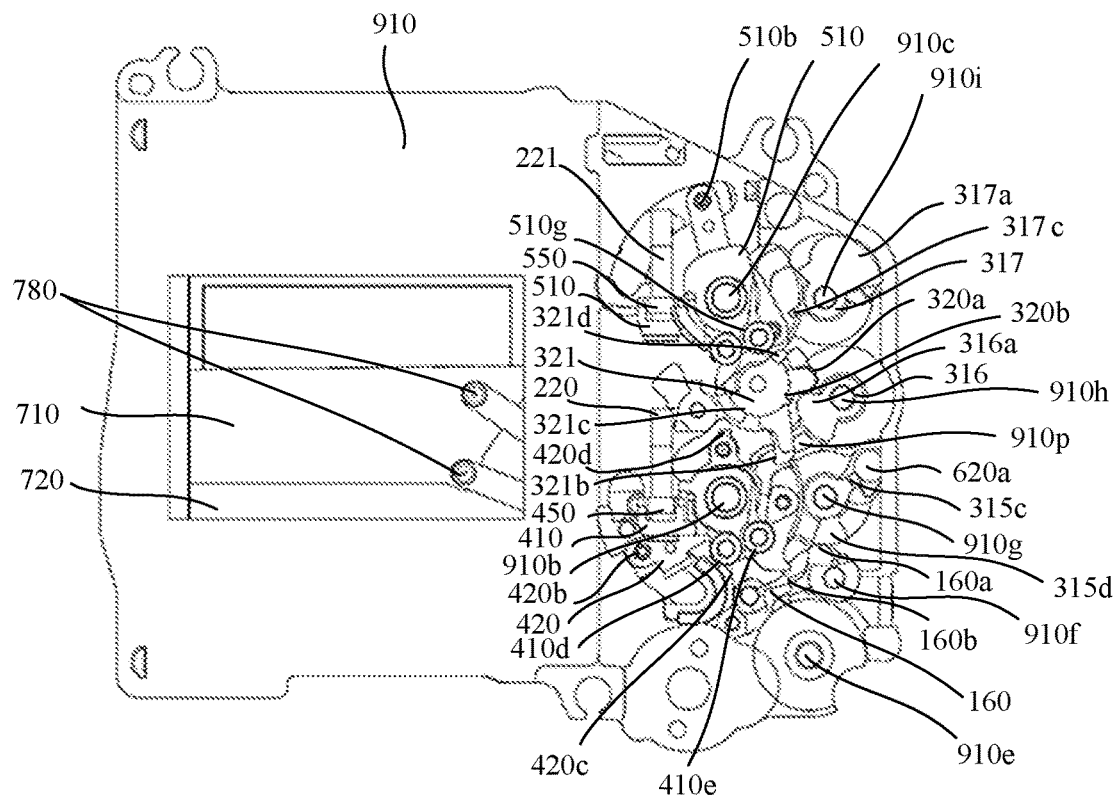

FIGS. 20A and 20B are a planar view and a sectional view each of which illustrates a state in which the cam 316a of the intermediate cam gear 316 starts to come into contact with the cam follower portion 320a of the one-way lever 320 after the motor 340 is further energized from the state illustrated in FIGS. 19A and 19B. FIG. 20A is a planar view illustrating a state in which the rotating front blade lever 420 starts to come into contact with the locking portion 170b of the second locking lever 170. The front blade lever 420 continues to rotate while the locked portion 420d of the front blade lever 420 comes into contact with the locking portion 170b of the second locking lever 170 and thereafter pushes away a slope of a cam of the locking portion 170b. FIG. 20B is a sectional view illustrating a state in which the cam 316a of the intermediate cam gear 316 starts to come into contact with the cam follower portion 320a of the one-way lever 320.

As illustrated in FIG. 9B, the pressing portion 320b of the one-way lever 320 is in contact with the pressed portion 321a of the inverse charging lever 321, and the inverse charging lever 321 is in contact with the inverse charging locking portion 910p of the base plate 910. As illustrated in FIG. 20B, the one-way lever 320 starts to rotate counterclockwise when the cam 316a starts to come into contact with the cam follower portion 320a. On the other hand, the inverse charging lever 321 is in contact with the inverse charging locking portion 910p of the base plate 910, and does not operate at this time.

As illustrated in FIG. 20A, the cam 317a of the rear curtain charge cam gear 317 starts to enter the traveling trajectory of the rear driving lever 510. However, since the rear driving lever 510 is in a state of being held by the electromagnet, the rear curtain charge cam gear 317 rotates without charging the rear driving lever 510 (hereinafter referred to as idle charging).

After the motor 340 is further energized and the front curtain charge cam gear 315 and the rear curtain charge cam gear 317 rotate, the operated portion 160a of the first locking lever 160 is released from the contact with the cam 315d of the front curtain charge cam gear 315. Then, the biasing force of the biasing spring 161 causes the first locking lever 160 to return into the traveling trajectory of the front blade lever 420, and the first locking lever 160 stops when coming into contact with the base plate 910.

Figure 21:
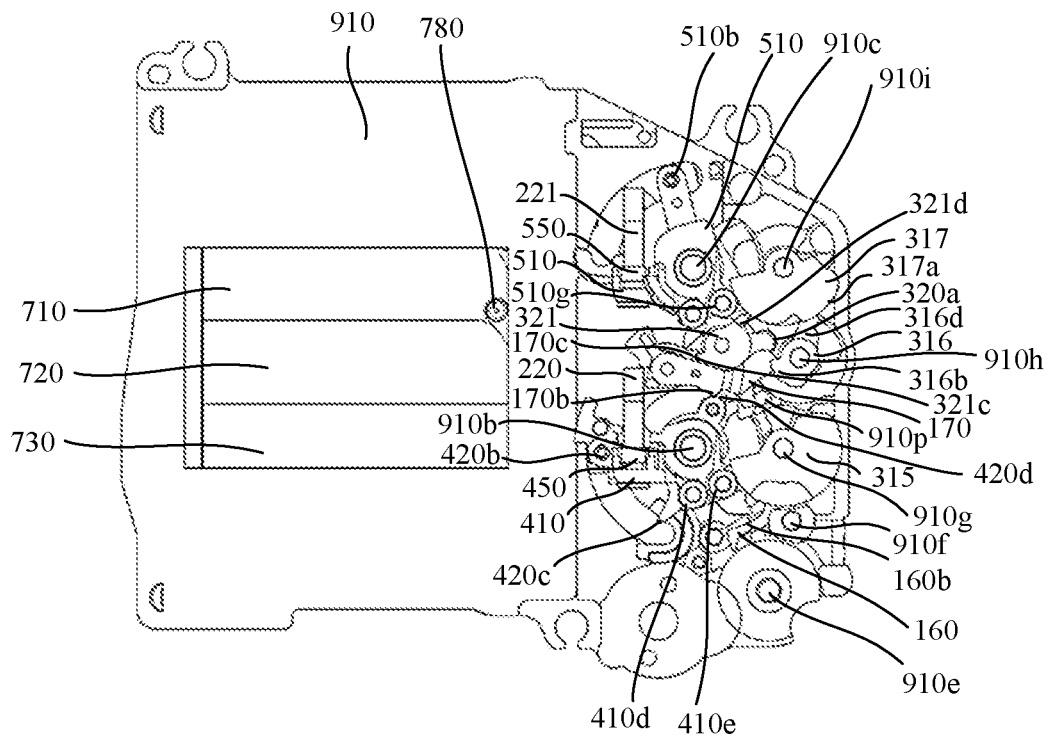
FIG. 21 is a planar view illustrating a state in which a shutter front curtain completes a transition from a folded state to an unfolded state, according to the embodiment

FIG. 21 is a planar view illustrating a state in which the shutter front curtain 700 completes a transition from the folded state to the unfolded state. From the state illustrated in FIG. 20B, the front blade lever 420 and the shutter front curtain 700 further rotate clockwise and return to the standby position. When the front blade lever 420 reaches the standby position, the front blade lever 420 collides with the front driving lever 410 and is close to returning counterclockwise due to the shock of the collision, but the locked portion 420d is locked at the locking portion 170b of the second locking lever 170. As a result, the front blade lever 420 and the shutter front curtain 700 is hindered from bouncing. By hindering bouncing in the returning traveling operation, operation after the returning traveling can be immediately performed, which is effective for increasing the frame rate. At this time, the light beam from the lens apparatus 2 is blocked by the shutter front curtain 700.

Figure 22:
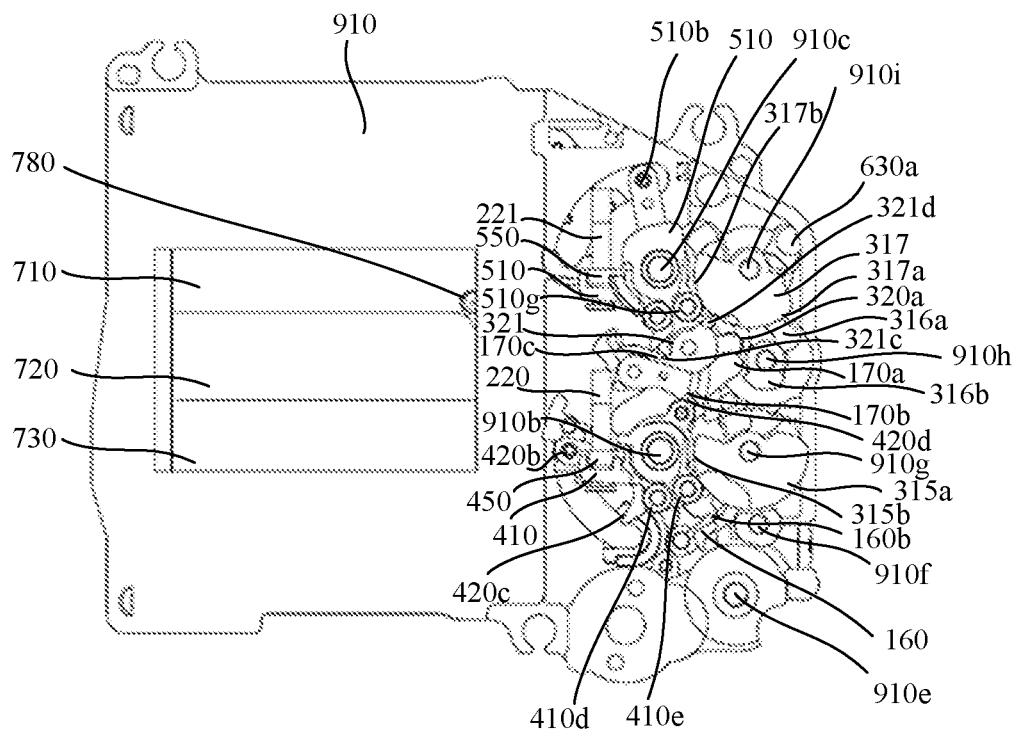
FIG. 22 is a planar view illustrating a state in which the front driving lever unit and the rear driving lever unit arrive at a set position, according to the embodiment.

FIG. 22 is a planar view illustrating a state in which the front driving lever unit 400 and the rear driving lever unit 500 enter the set phase after the motor 340 is further energized from the state illustrated in FIG. 21. The cam follower portion 320a of the one-way lever 320 is released from the contact with the cam 316a of the intermediate cam gear 316, and the one-way lever 320 is rotated clockwise by the biasing force of the biasing spring 322. Then, as illustrated in FIG. 9B, the pressing portion 320b of the one-way lever 320 comes into contact with the pressed portion 321a of the inverse charging lever 321 and stops. Here, if the energization to the motor 340 is stopped, the opening 910a is closed and the state becomes the normally closed state.

After the motor 340 is further energized and the front curtain charge cam gear 315 and the rear curtain charge cam gear 317 rotate, the state enters the set release similar to the state illustrated in FIG. 15. During the set release, the roller 410e is released from the contact with the cam 315b of the front curtain charge cam gear 315. Similarly, the roller 510g is released from the contact with the cam 317b of the rear curtain charge cam gear 317. On the other hand, the driving levers 410 and 510 are held by the electromagnets. The cam 316b of the intermediate cam gear 316 comes into contact with the operated portion 170a of the second locking lever 170, and the second locking lever 170 moves in a direction of retracting from the traveling trajectory of the front blade lever 420.

Figure 23:
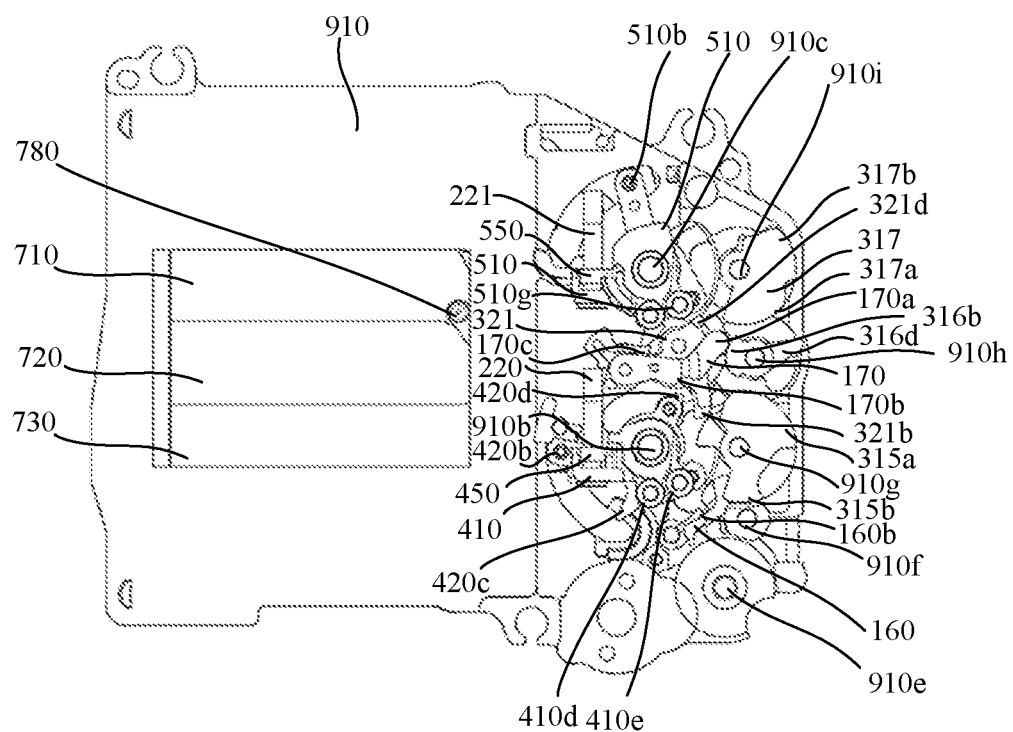
FIG. 23 is a planar view illustrating a state in which the phase stops in the imaging standby phase according to the embodiment.

After the motor 340 is further energized and the front curtain charge cam gear 315 and the rear curtain charge cam gear 317 rotate, the state becomes as illustrated in FIG. 23, and the energization to the motor 340 is stopped as described later. FIG. 23 is a planar view illustrating a state stopping in the imaging standby phase.

When the units rotate to the position of FIG. 23 in the cam diagram of FIG. 12A, the PI shielding portion 317d of the rear curtain charge cam gear 317 changes the state of the phase detecting photointerrupter 34 from light transmission (Hi in FIGS. 12A and 12B) to light blocking (Lo in FIGS. 12A and 12B). On the other hand, the PI shielding portion 316c of the intermediate cam gear 316 does not change the state of the phase detecting photointerrupter 33 in light blocking (Lo in FIGS. 12A and 12B). When the phase detecting photointerrupter 34 detects the change from the light transmission to the light blocking and the phase detecting photointerrupter 33 detects that the light blocking remains unchanged, the camera system controlling circuit 5 stops energizing the motor 340.

The cam 315a and the cam 315b of the front curtain charge cam gear 315 are retracted from the traveling trajectory of the front driving lever 410. The cam 317a and the cam 317b of the rear curtain charge cam gear 317 are retracted from the traveling trajectory of the rear driving lever 510. The cam 316b of the intermediate cam gear 316 come into contact with and holds the operated portion 170a of the second locking lever 170 so that the operated portion 170a remains retracted from the traveling trajectory of the front driving lever 410. Here, the front driving lever 410 and the rear driving lever 510 are biased counterclockwise in FIG. 23 respectively by the driving spring 411 and the driving spring 511, but are held by the electromagnets as the coil 230 and the coil 231 are energized. Thereafter, the camera system controlling circuit 5 stops the energization to the coil 230 so as to start exposure to the image sensor 6. The shutter speed of the camera is controlled by changing an interval between stop of the energization to the coil 230 on the front curtain side and stop of the energization to the coil 231 on the rear curtain side.

The front driving lever 410 and the front blade lever 420 integrally rotate counterclockwise from the state illustrated in FIG. 23 after the stop of the energization to the coil 230. The shutter front curtain 700 also starts to rotate counterclockwise and transitions from the unfolded state to the folded state.

Figure 24A:
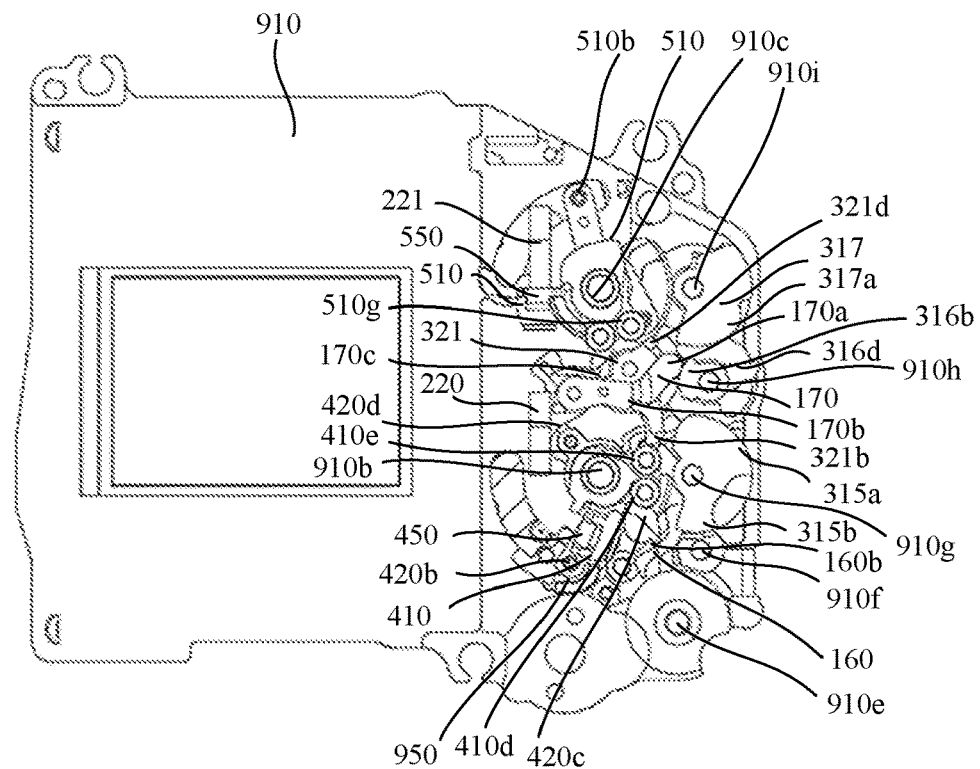
FIGS. 24A and 24B are a planar view and a rear view each of which illustrates a state in which the front driving lever unit and the front blade lever completes traveling according to the embodiment.
Figure 24B:
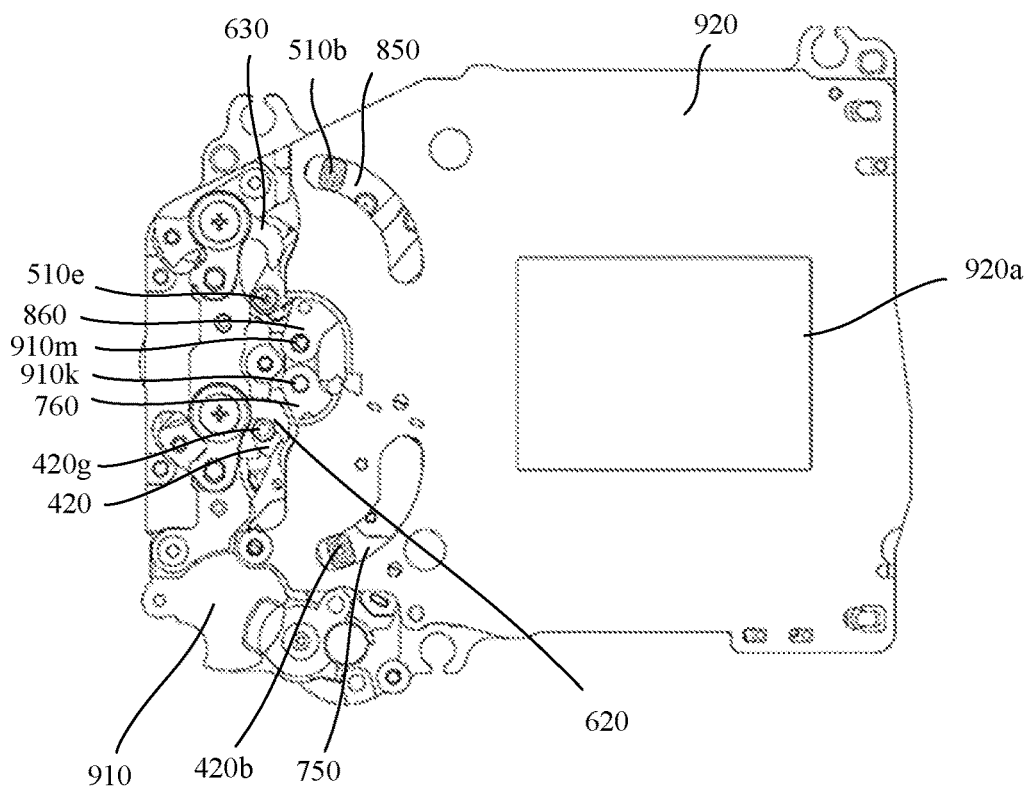

FIGS. 24A and 24B are a planar view and a rear view each of which illustrates a state in which the front driving lever 410 and the front blade lever 420 complete traveling after they travel. As illustrated in FIG. 24A, the front blade lever 420 continues to rotate while the locked portion 420c pushes the locking portion 160b of the first locking lever 160 away in the vicinity of the traveling completion position. Immediately thereafter, the biasing spring 161 causes the first locking lever 160 to return into the traveling trajectory of the front blade lever 420.

As illustrated in FIG. 24B, the brake pin 420g of the front blade lever 420 similarly comes into contact with the front brake lever 620 in the vicinity of the traveling completion position, and they rotate integrally. At this time, energy of the biasing force of the driving spring 411 is canceled by the frictional force between the front brake lever 620 and the friction sheet 651, and the front blade lever 420 rotates while gradually decelerating.

When the front blade lever 420 arrives at the traveling completion position, the front driving pin 420b of the front blade lever 420 comes into contact with the rubber cover 950 illustrated in FIG. 3A, and the front blade lever 420 and the front driving lever 410 stop rotating. At the same time, the front main arm 750 of the shutter front curtain 700 comes into contact with the front curtain arm rubber cover 971 illustrated in FIG. 3A at the traveling completion position and stops rotating. The front curtain arm rubber cover 971 is in contact with the front curtain arm rubber 970, and the front curtain arm rubber 970 absorbs shock of the traveling of the shutter front curtain 700, which is effective in reducing blade damage in use over time. As soon as the front blade lever 420 arrives at the traveling completion position, the front brake lever 620 comes into contact with the brake rubber 650 illustrated in FIG. 5, and the front brake lever 620 stops rotating.

The front blade lever 420 and the front driving lever 410 are close to bouncing and rotating clockwise due to the shock when the front driving pin 420b comes into contact the rubber cover 950. However, the bouncing is hindered by locking the locked portion 420c of the front blade lever 420 at the locking portion 160b of the first locking lever 160 that has returned into the traveling trajectory of the front blade lever 420.

The deceleration of the front blade lever 420 by the front brake lever 620 and the mechanism for hindering the bouncing using the first locking lever 160 can shorten the bouncing time of the front blade lever 420 and can shorten the time until the start of the charging operation thereafter, which is effective for increasing the frame rate (speed of continuous imaging).

The front driving lever 410 is held by the electromagnet during the returning traveling operation of the front blade lever 420. However, when the front blade lever 420 arrives at the standby position, the front driving lever 410 is displaced from an initial position due to the shock when the front blade lever 420 collides with the front driving lever 410. If the energization is stopped and the traveling is started in this state, the driving operation for each imaging will not be consistent because of a variation in the displaced position. In this embodiment, after the returning traveling operation of the front blade lever 420, the roller 410e of the front driving lever 410 comes into contact with a cam top of the cam 315b of the front curtain charge cam gear 315, and then the front driving lever 410 returns to the position in the set release. Thereby, the position of the front driving lever 410, which has been displaced due to the returning traveling operation of the front blade lever 420, is reset to the initial position. Therefore, the running operation for each imaging becomes consistent and the shutter accuracy is improved.

When the camera system controlling circuit 5 stops the energization to the coil 231 at a predetermined interval, the rear driving lever unit 500 starts to rotate counterclockwise.

Figure 25A:
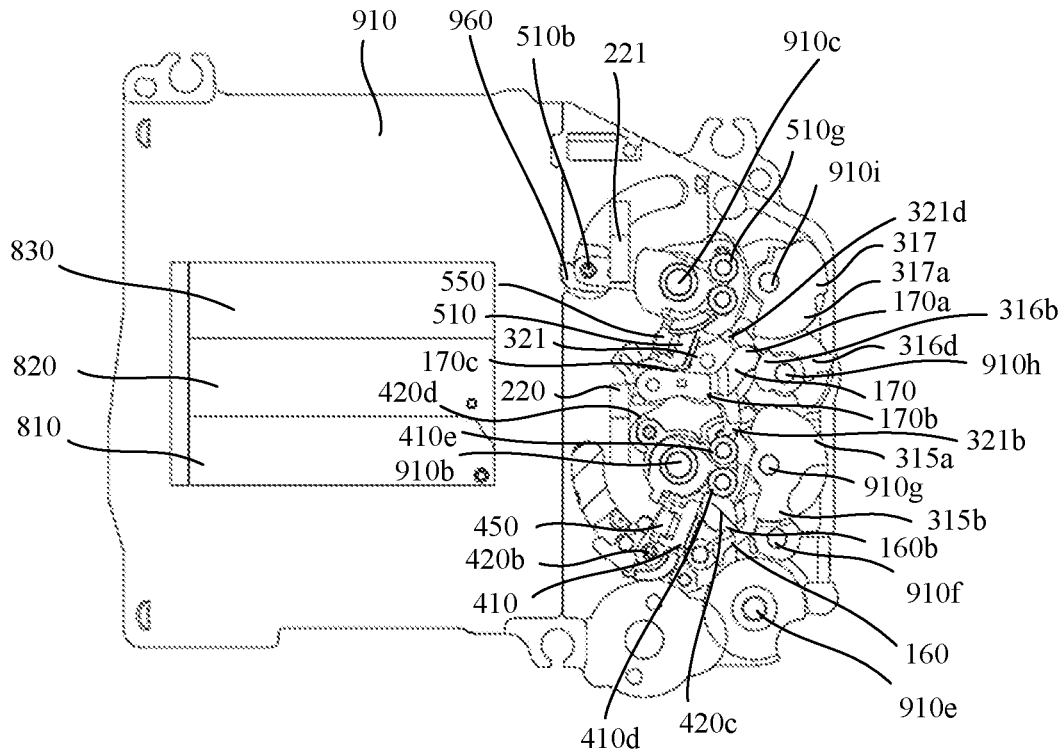
FIGS. 25A and 25B are a planar view and a rear view each of which illustrates a state in which the rear driving lever unit completes traveling according to the embodiment.
Figure 25B:
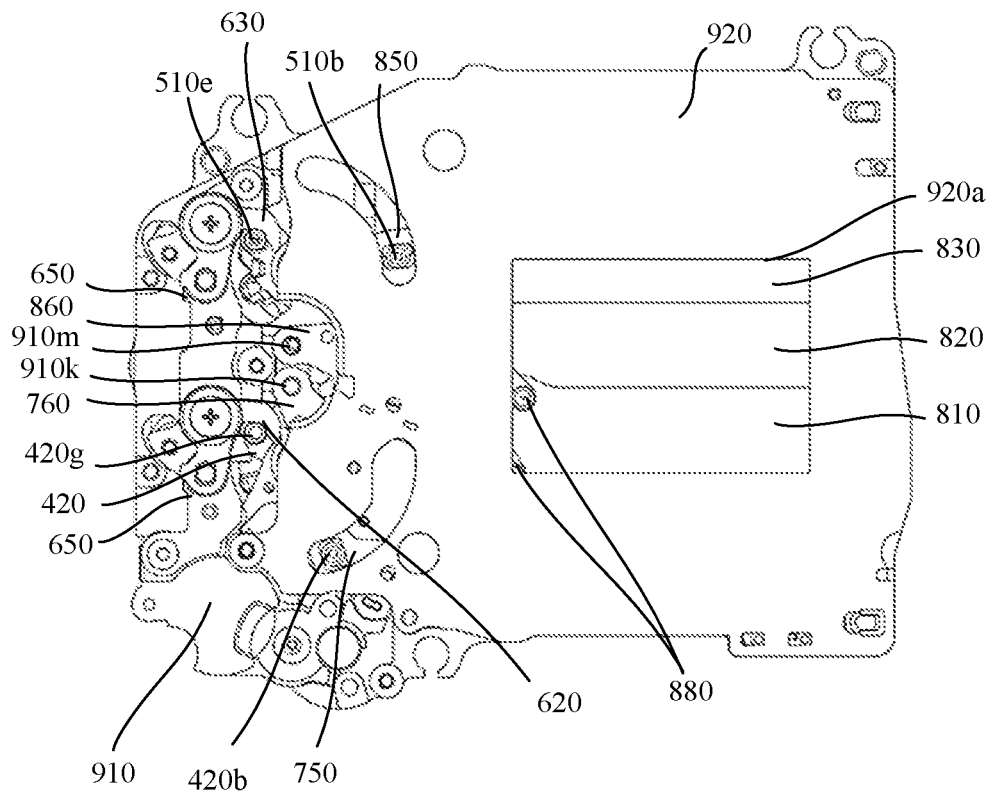

FIGS. 25A and 25B are a planar view and a rear view each of which illustrates a state in which the rear driving lever unit 500 completes traveling after its traveling. In the vicinity of a position just before the traveling completion position, the brake pin 510e of the rear driving lever 510 comes into contact with the rear brake lever 630, and the rear driving lever 510 gradually decelerates. When the rear driving pin 510b comes into contact with the half-moon rubber 960, the rear driving lever 510 arrives at the traveling completion position and stops rotating. At the same time, as soon as the rear driving lever 510 arrives at the traveling completion position, the rear brake lever 630 comes into contact with the brake rubber 650 illustrated in FIG. 5, and the rear brake lever 630 stops rotating.

Hereinafter, the stop position of the rear brake lever 630 when the rear driving lever 510 is at the position just before the traveling completion position is referred to as the operation standby position, and the stop position of the rear brake lever 630 when the rear driving lever 510 is at the traveling completion position is referred to as the operation completion position. The rear driving lever 510 rotates between the operation standby position and the operation completion position. The camera system controlling circuit 5 resumes the energization to the motor 340 in order to cause the charging for the next imaging when a predetermined time has passed since the exposure operation by the shutter front curtain 700 and the shutter rear curtain 800 is completed. When the energization to the motor 340 is resumed, both the front curtain charge cam gear 315 and the rear curtain charge cam gear 317 rotate counterclockwise, and the intermediate cam gear 316 rotates clockwise.

Figure 26:
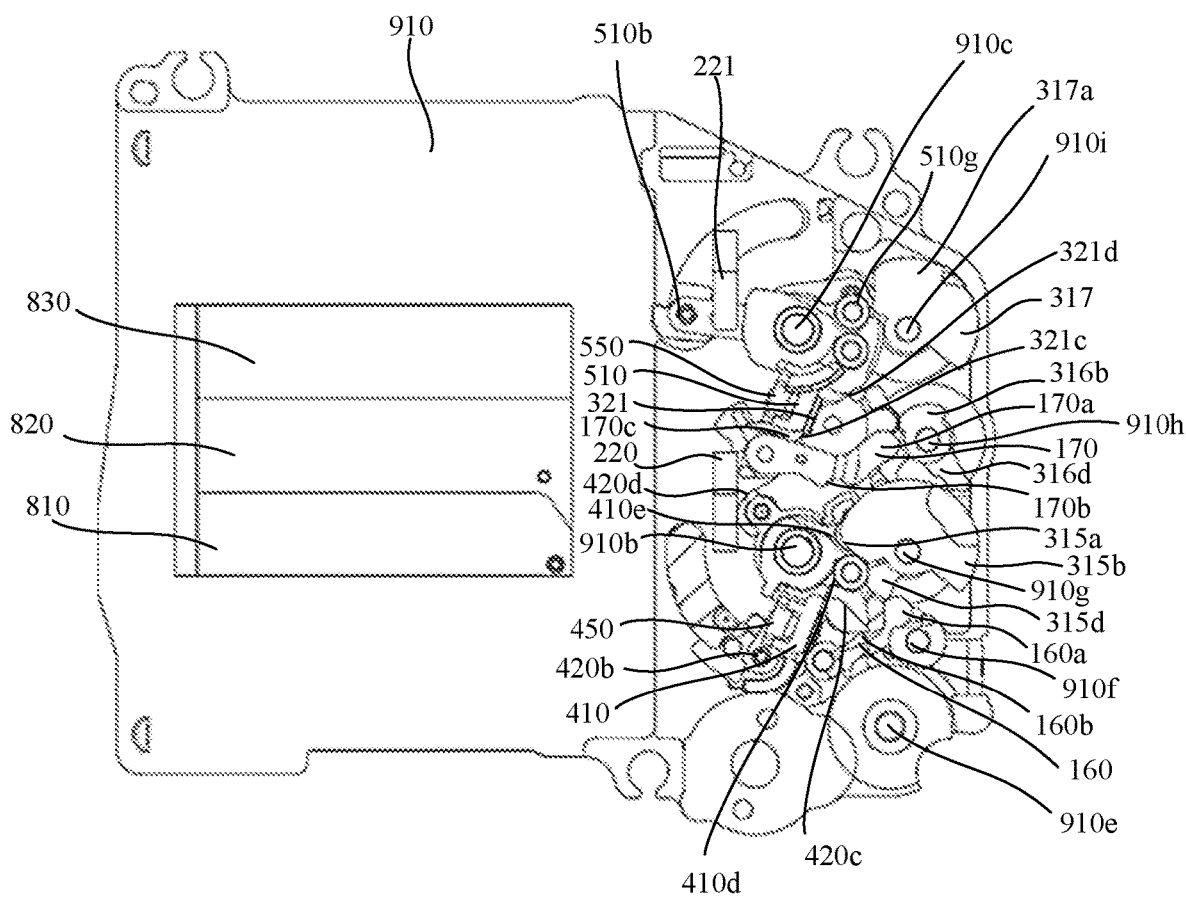
FIG. 26 is a planar view illustrating a state in which the cam of the front curtain charge cam gear releases locking by causing the operated portion of the first locking lever to operate according to the embodiment.

FIG. 26 is a planar view illustrating a state in which the cam 315d of the front curtain charge cam gear 315 operates the operated portion 160a of the first locking lever 160 for unlocking. When the cam 315d of the front curtain charge cam gear 315 comes into contact with the first locking lever 160, the first locking lever 160 is caused to retract from the traveling trajectory of the front blade lever 420, and as a result, the first locking lever 160 unlocks the front blade lever 420. Then, the biasing force of the front anti-backlash spring 770 causes the front blade lever 420 to start to rotate clockwise from the traveling completion position to the standby position. At this time, the shutter front curtain 700 linked to the front blade lever 420 also starts to rotate counterclockwise and starts to move from the folded state to the unfolded state.

The cam 315a of the front curtain charge cam gear 315 starts to come into contact with the roller 410d of the front driving lever 410, and cause the front driving lever 410 to rotate clockwise. At this time, the front driving lever 410 and the front blade lever 420 are rotating in the same direction, but the front driving lever 410 rotates ahead of the front blade lever 420 because the biasing force of the front anti-backlash spring 770 causing the front blade lever 420 to rotate is weak.

Figure 27A:
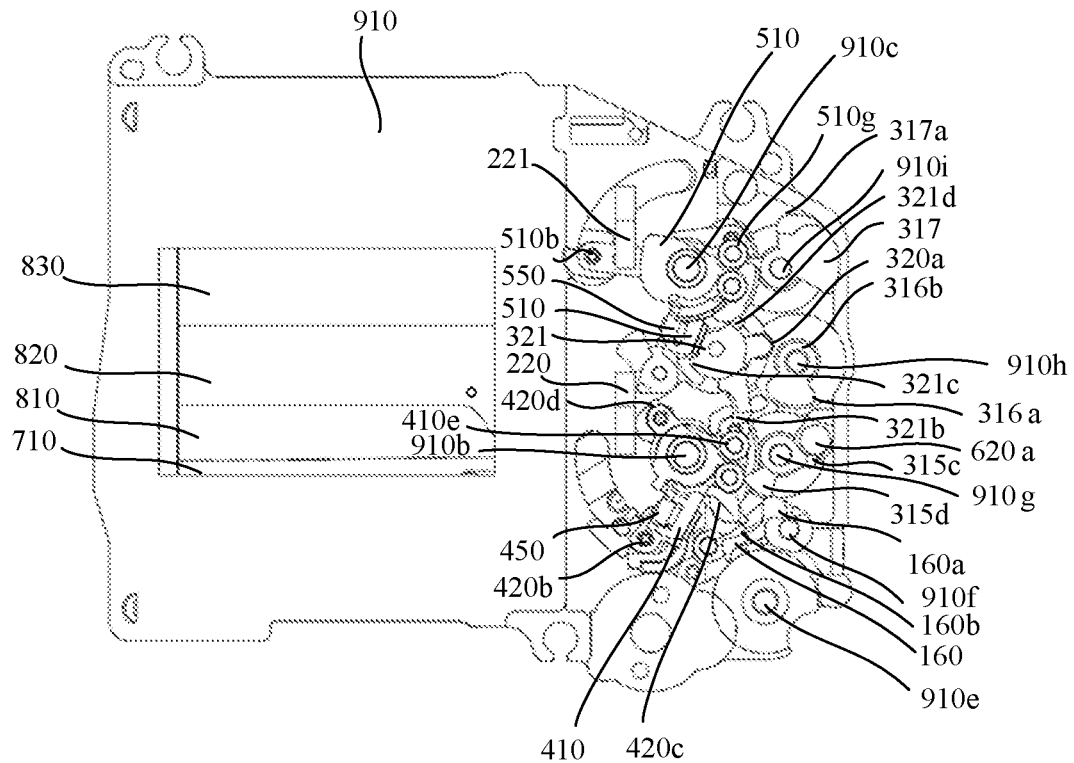
FIGS. 27A and 27B are a sectional view and a rear view each of which illustrates a state in which the cam of the front curtain charge cam gear starts to come into contact with the cam follower of the front brake lever according to the embodiment.
Figure 27B:
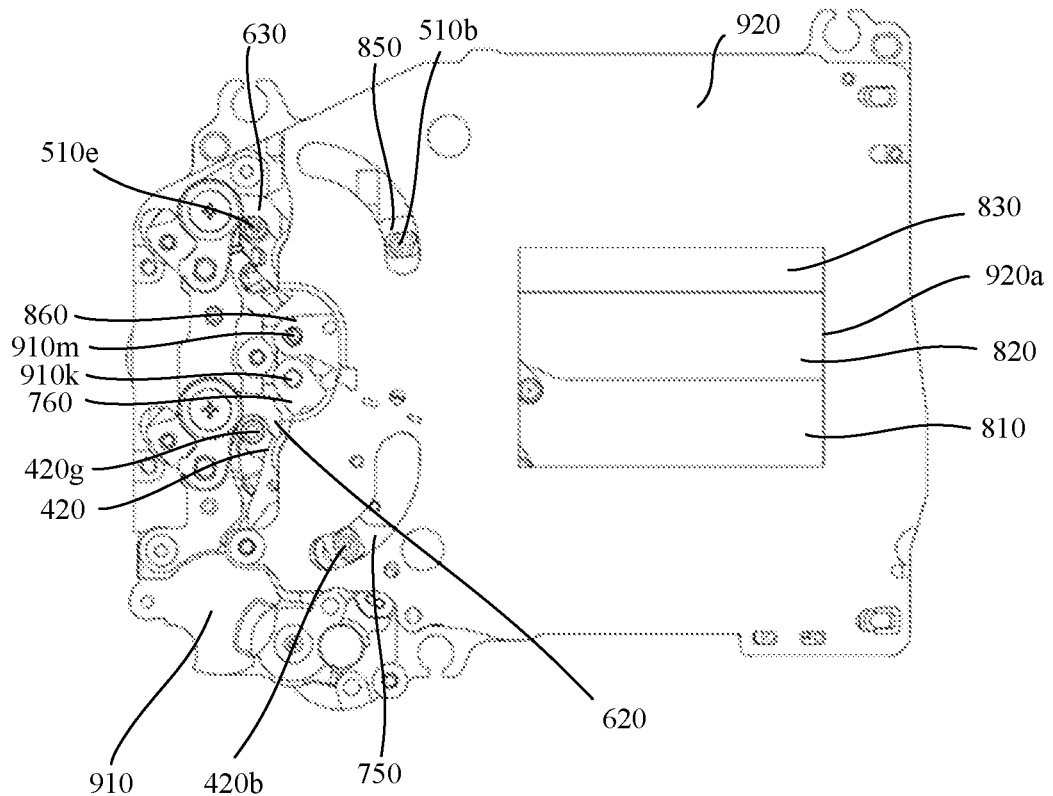

FIGS. 27A and 27B are a sectional view and a rear view each of which illustrates a state in which the cam 315c of the front curtain charge cam gear 315 starts to come into contact with the cam follower 620a of the front brake lever 620 after the motor 340 is further energized from the state illustrated in FIG. 26. Similarly to FIGS. 19A and 19B, as illustrated in FIG. 27A, the cam 315c of the front curtain charge cam gear 315 pushes the cam follower 620a of the front brake lever 620, and the front brake lever 620 rotates from the operation completion position to the operation standby position.

As illustrated in FIG. 27B, the front brake lever 620 comes into contact with the brake pin 420g of the front blade lever 420 which has started to rotate prior to the front brake lever 620 from the state of FIG. 26, and rotates while pushing the front blade lever 420. After the front curtain charge cam gear 315 further rotates, the cam follower 620a of the front brake lever 620 moves to the cam top of the cam 315c, and thereby the front brake lever 620 stops at the operation standby position. On the other hand, the biasing force of the front anti-backlash spring 770 and the driving force of pushing by the front brake lever 620 causes the front blade lever 420 to continue to rotate while accelerating. Then, the accelerated front blade lever 420 catches up with the front driving lever 410 that rotates while being in contact with the front curtain charge cam gear 315, and thereafter they continue to rotate as a unit.

The assistance of the rotation of the front brake lever 620 to the initial rotation of the front blade lever 420 makes the front blade lever 420 catch up with the front driving lever 410, and then they can rotate as a unit. As a result, it is possible to shorten the rotation operation time of both the front blade lever 420 and the front driving lever 410, which is effective in increasing the frame rate (speed of continuous imaging).

Figure 28:
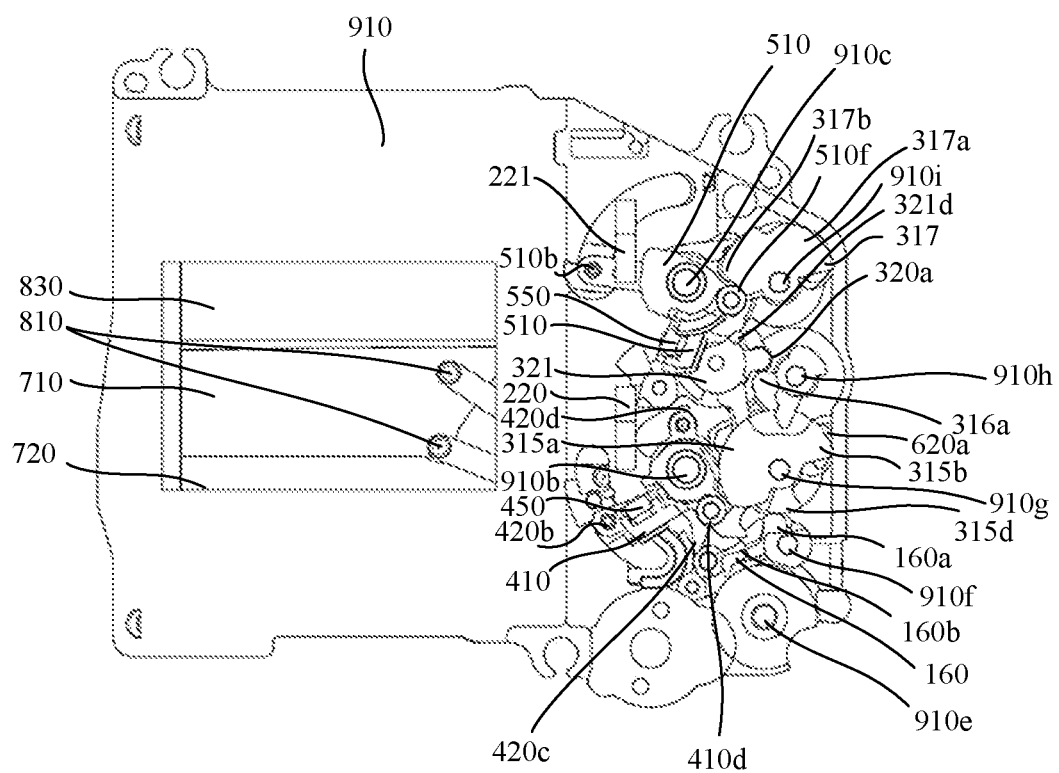
FIG. 28 is a planar view illustrating a state in which the front brake lever stops at an operation standby position and a cam of a rear curtain charge cam gear starts to come into contact with a roller of the rear driving lever, according to the embodiment.

After, from the state of FIGS. 27A and 27B, the motor 340 is further energized and the front curtain charge cam gear 315 and the rear curtain charge cam gear 317 rotate, the state becomes as illustrated in FIG. 28. FIG. 28 is a planar view illustrating a state in which the front brake lever 620 is stopped at the operation standby position and the cam 317a of the rear curtain charge cam gear 317 starts to come into contact with the roller 510f of the rear driving lever 510. FIG. 28 omits an illustration of the second locking lever 170 so that the intermediate cam gear 316 and the one-way lever 320 can be seen. The cam 317a causes the rear driving lever 510 to start to rotate clockwise. Loads are distributed by starting the rotation of the rear driving lever 510 after the completion of the rotation of the front brake lever 620. Since the loads are distributed, a high-torque motor is not necessary, and therefore the size and cost of the motor can be reduced, which is also effective to reduce the size of the camera.

The cam 316a of the intermediate cam gear 316 starts to come into contact with the cam follower portion 320a of the one-way lever 320. The cam 316a rotates the one-way lever 320 counterclockwise as illustrated in FIG. 28B, while the inverse charging lever 321 is in contact with the inverse charging locking portion 910p of the base plate 910 as illustrated in FIG. 9B and does not operate at this time. The operated portion 160a of the first locking lever 160 is released from the contact with the cam 315d of the front curtain charge cam gear 315. Then, the biasing force of the biasing spring 161 causes the first locking lever 160 to return into the traveling trajectory of the front blade lever 420 and to come into contact with the base plate 910.

After the motor 340 is further energized and the front curtain charge cam gear 315 and the rear curtain charge cam gear 317 rotate, the contact between the roller 410d of the front driving lever 410 and the cam 315a of the front curtain charge cam gear 315 is released as described above. On the other hand, the roller 410e of the front driving lever 410 comes into contact with the cam 315b of the front curtain charge cam gear 315 and rotates because the driving force continues to be transmitted.

The front blade lever 420 continues to rotate while the locked portion 420c pushes away the locking portion 170b of the second locking lever 170 in the vicinity of the returning traveling operation completion position. Immediately thereafter, the biasing spring 171 causes the second locking lever 170 to return into the traveling trajectory of the front blade lever 420 and to come into contact with the base plate 910.

Similarly, in the rear driving lever 510, the contact between the roller 510f of the rear driving lever 510 and the cam 317a of the rear curtain charge cam gear 317 is released. On the other hand, the roller 510g of the rear driving lever 510 comes into contact with the cam 317b of the rear curtain charge cam gear 317 and rotates because the driving force continues to be transmitted.

Figure 29A:
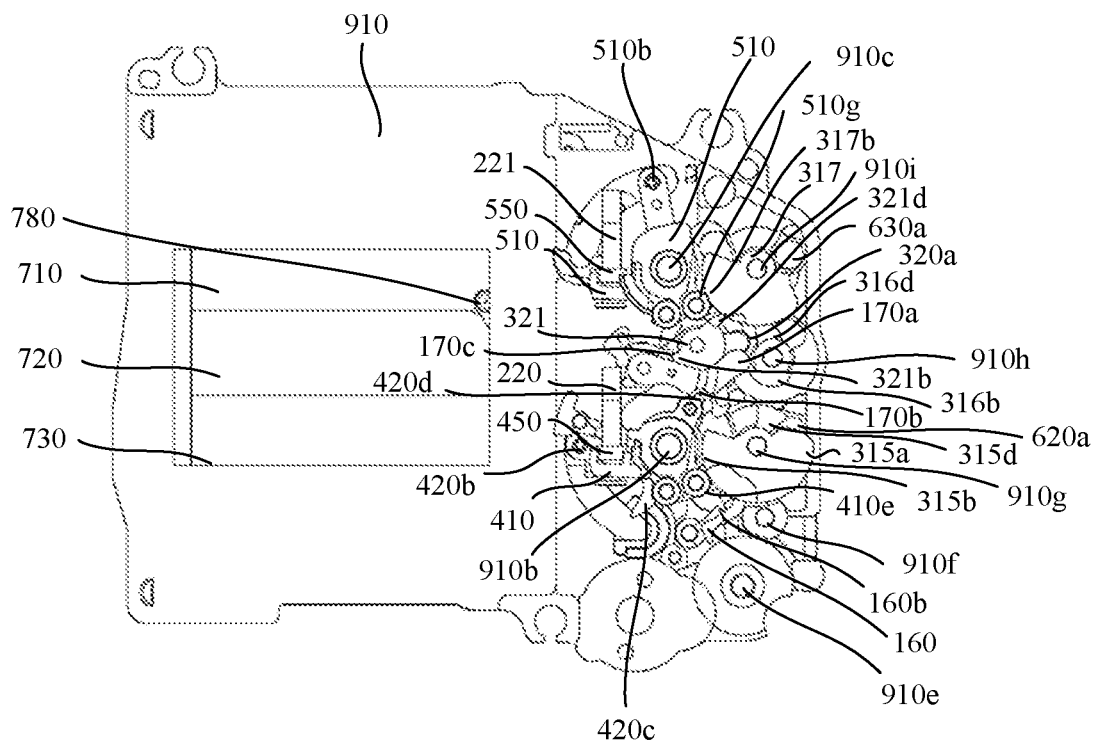
FIGS. 29A and 29B are a planar view and a sectional view each of which illustrates a state of the set position at which charging of each lever of the front driving lever, the front blade lever, and the rear driving lever is completed according to the embodiment.
Figure 29B:
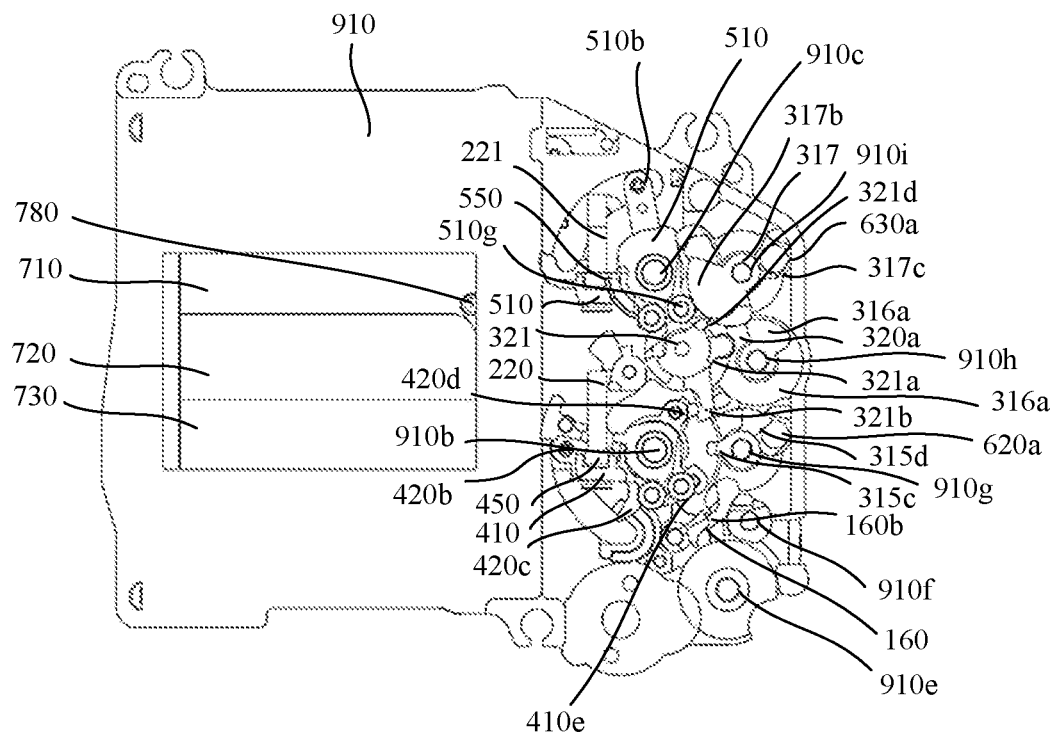

FIGS. 29A and 29B are a planar view and a sectional view each of which illustrates a state of the set phase in which charging of each lever of the front driving lever 410, the front blade lever 420, and the rear driving lever 510 is completed. As illustrated in FIG. 29A, the cam 315b of the front curtain charge cam gear 315 moves to the cam top, and the front armature 450 of the front driving lever 410 comes into contact with the front yoke 220. The front blade lever 420, which was driven integrally with the front driving lever 410, is close to returning counterclockwise due to the shock at the time of the contact, but the locked portion 420d is locked by the locking portion 170b of the second locking lever 170. Thereby, bouncing of the front blade lever 420 and the shutter front curtain 700 is hindered. As a result, it is possible to shorten the time for transition to the next operation, which is effective for increasing the frame rate.

On the other hand, the cam 317b of the rear curtain charge cam gear 317 moves to the cam top, and the rear armature 550 of the rear driving lever 510 comes into contact with the rear yoke 221. At this time, the front brake lever 620 is at the operation standby position, but the rear brake lever 630 is still at the operation completion position.

As illustrated in FIG. 29B, the contact between the cam follower portion 320a of the one-way lever 320 and the cam 316a of the intermediate cam gear 316 is released. The biasing force of the biasing spring 322 causes the one-way lever 320 to rotate clockwise and the one-way lever 320 stops when it comes into contact with the pressed portion 321a of the inverse charging lever 321.

After the motor 340 is further energized and the front curtain charge cam gear 315 and the rear curtain charge cam gear 317 rotate, the state transitions to the set release. During the set release, the contact between the roller 410e and the cam 315b of the front curtain charge cam gear 315 is released. Similarly, the contact between the roller 510g and the cam 317b of the rear curtain charge cam gear 317 is released. On the other hand, the driving levers 410 and 510 are held by the electromagnets. The cam 317c of the rear curtain charge cam gear 317 pushes the cam follower 630a of the rear brake lever 630, and the rear brake lever 630 rotates from the operation completion position to the operation standby position.

In a conventional configuration, the rear curtain charge cam gear 317 rotates the rear brake lever 630 from the operation completion position to the operation standby position at the same time as the charging operation of the rear driving lever 510. According to the present disclosure, the rear curtain charge cam gear 317 rotates the rear brake lever 630 from the operation completion position to the operation standby position during the set release, and thereby the load during driving is distributed. Since the load is distributed, a high-torque motor is not necessary for charging the driving lever, which makes it possible to reduce the size and cost of the motor and further reduce the size of the camera. Furthermore, since it is possible to shorten the charging time, it is also effective for increasing the frame rate.

The camera system controlling circuit 5 detects the rotation speed of the motor 340 by using the pulse plate 342 and the pulse detecting photointerrupter 35, which are illustrated in FIGS. 3B and 4B, during the set release, and determines whether the detected rotation speed of the motor 340 is equal to or higher than a certain threshold value. Then, the camera system controlling circuit 5 changes a voltage to be applied to the motor 340 based on the determination result. Thereby, it is possible to maintain the rotational velocity of the motor 340, and to control the rotational velocity of the front curtain charge cam gear 315 and the rear curtain charge cam gear 317 during the set release to be constant (predetermined rotational velocity). Thus, even if the load during set release greatly varied by variations in the braking force of the rear brake lever 630 or changes in the braking force caused by a temperature environment, it is possible to make constant the set release time and to stably realize a high frame rate. Further, since the rotational velocity of the front curtain charge cam gear 315 is constant, the velocity is constant when the contact between the roller 410e of the front driving lever 410 and the cam 315b of the front curtain charge cam gear 315 is released in the set release.

Therefore, it is possible to hinder the front driving lever 410 from moving to a position displaced from the charge completion position due to the shock when the contact is released, which makes consistent the traveling operation of the shutter front curtain 700 and is effective for improving the shutter accuracy. The same similarly applies to the rear driving lever 510.

Furthermore, by making the rotational velocity of the motor 340 constant, it is possible to reduce a variation in a stop position of the motor 340 after the energization to the motor 340 is stopped.

Thereby, it is not necessary to ensure wide run-up sections of the front curtain charge cam gear 315 and the rear curtain charge cam gear 317 for after the energization to the motor is stopped. Therefore, a charging section for each driving lever can be lengthened, and the load during charging can be reduced by reducing cam lift angles of the front curtain charge cam gear 315 and the rear curtain charge cam gear 317. Thus, the frame rate can be effectively increased.

When rotation is performed and the state becomes a position of FIG. 23 in the cam diagram of FIG. 12B, the phase detecting photointerrupter 33 and the phase detecting photointerrupter 34 detect the imaging standby phase, and the camera system controlling circuit 5 stops the energization to the motor 340. The cams 315a and 315b of the front curtain charge cam gear 315 have retracted from the traveling trajectory of the front driving lever 410. The cams 317a and 317b of the rear curtain charge cam gear 317 have retracted from the traveling trajectory of the rear driving lever 510. The second locking lever 170 is held in a state where the operated portion 170a has been driven by the cam 316b of the intermediate cam gear 316 and has retracted from the traveling trajectory of the front driving lever 410.

The front driving lever 410 and the rear driving lever 510 are biased counterclockwise by the driving spring 411 and the driving spring 511, respectively, but are still held by the electromagnets as the coils 230 and 231 are energized. Here, the operation detector 10 makes a determination on pressing on the shutter release button. In a case where the shutter release button remains pressed by a user and continuous imaging is to be performed, the focal plane shutter 1000 stops the energization to the coil 230 thereafter, and exposure to the image sensor 6 is started. The shutter speed of the camera is controlled by changing the interval between the stopping of the energization to the coil 230 on the front curtain side and the stopping of the energization to the coil 231 on the rear curtain side. After that, the energization to the motor 340 is started, and the operation illustrated in the cam diagram of FIG. 12B is repeated. On the other hand, in a case where the shutter release button is not pressed by the user, the camera system controlling circuit 5 temporarily stops the energization to the motor 340 after the phase enters the imaging standby phase in the cam diagram of FIG. 30 described later, and thereafter starts energization in the reverse rotation direction to the motor 340.

Figure 30:
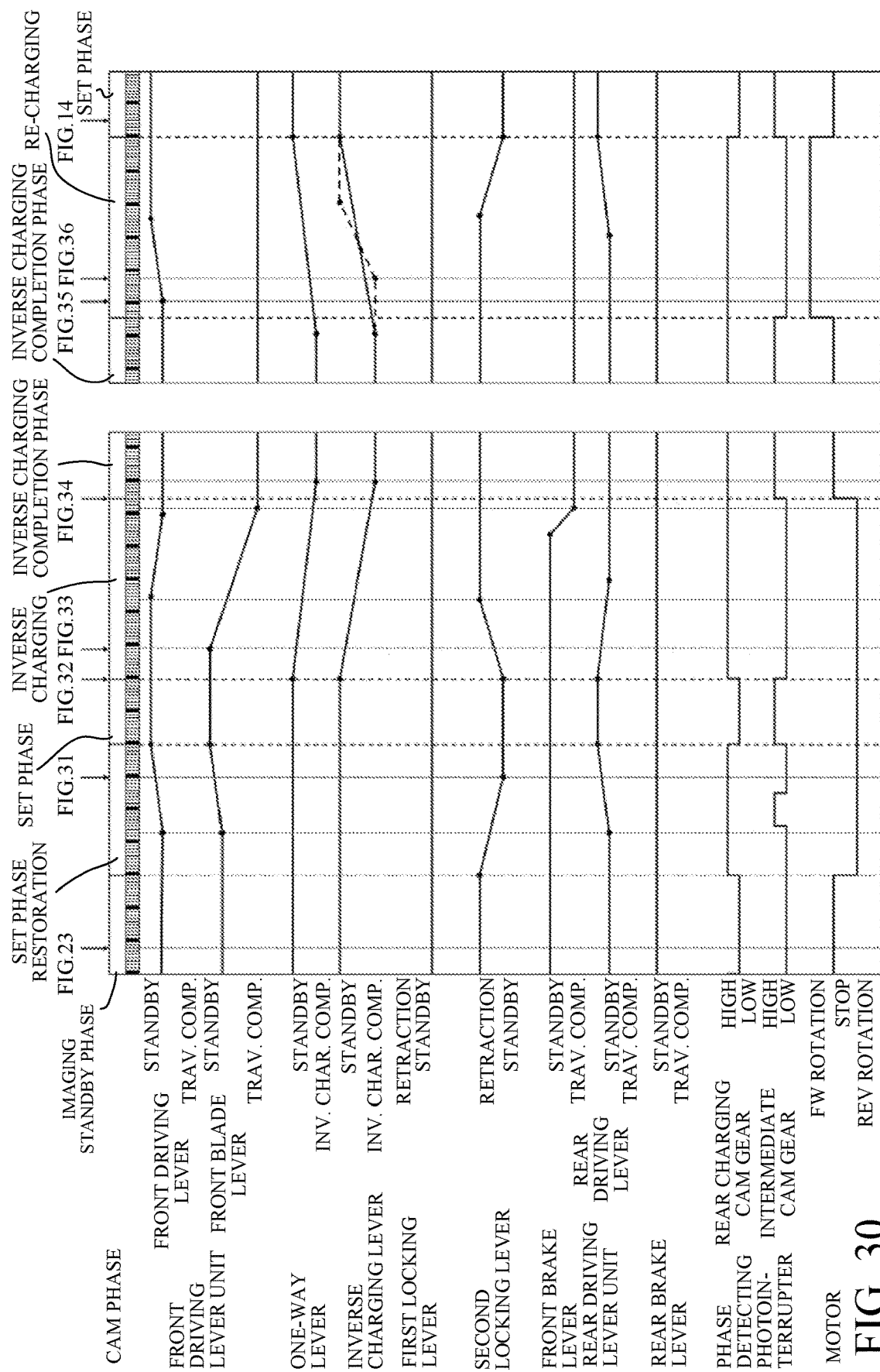
FIG. 30 is a cam diagram illustrating a movement of each component and signal states from when energization to the motor in a reverse rotation direction starts to when the state becomes the normally open state, according to the embodiment.

Hereinafter, a description is given of a series of operations of the focal plane shutter 1000 in a case where the motor 340 is energized in the reverse rotation direction and then energized in the forward rotation direction. FIG. 30 is a cam diagram illustrating a movement of each component and signal states in a case where the motor 340 is energized in the reverse rotation direction and then energized in the forward rotation direction. FIG. 30 includes corresponding figure numbers of FIGS. 31 to 36B, FIGS. 14A and 14B, and FIG. 23.

When the energization to the motor 340 in the reverse rotation direction is started, both the front curtain charge cam gear 315 and the rear curtain charge cam gear 317, which are illustrated in FIG. 23, rotate clockwise, and the intermediate cam gear 316, which is illustrated in FIG. 23, rotates counterclockwise. At this time, the second locking lever 170 is in contact with the cam 316b of the intermediate cam gear 316 and is at a cam top state. The coil 230 on the front curtain side and the coil 231 on the rear curtain side are continuously energized, and the front driving lever 410 and the rear driving lever 510 are held by the electromagnets until the state becomes the normally open state.

Figure 31:
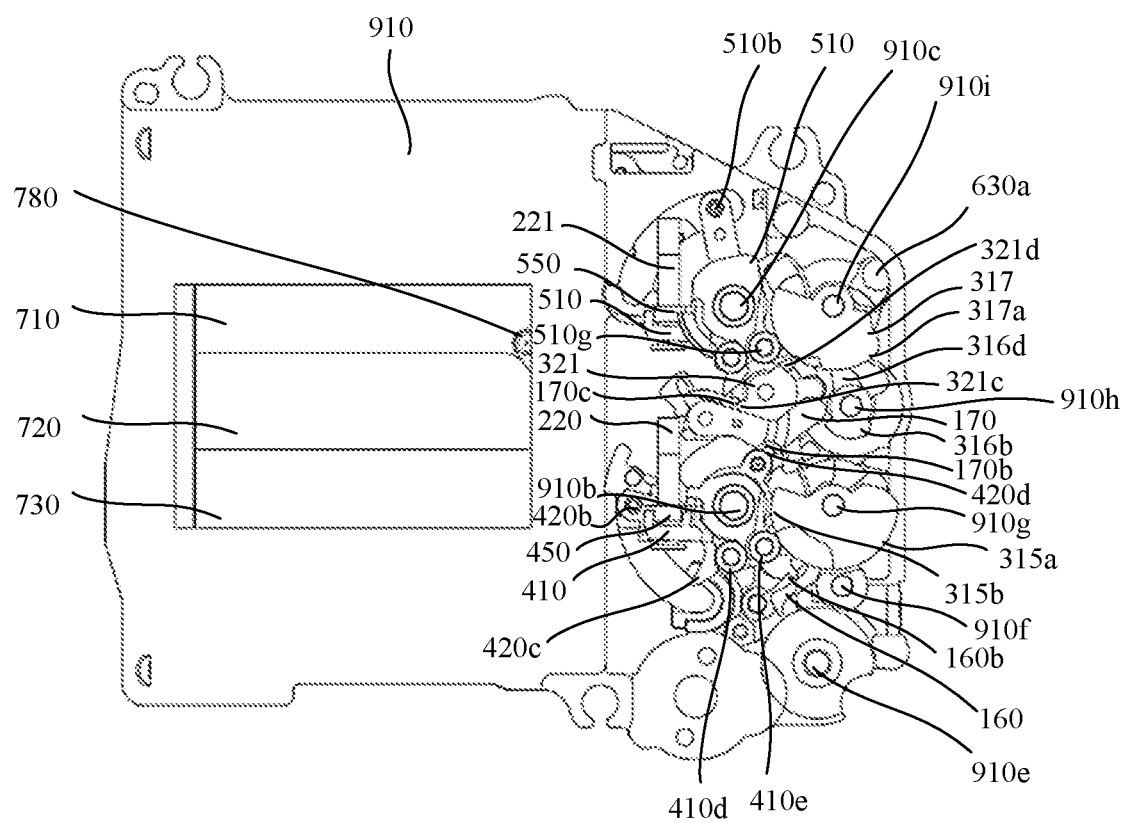
FIG. 31 is a planar view illustrating a state in which the second locking lever has moved to a cam bottom of the intermediate cam gear, according to the embodiment

When the energization to the motor 340 in the reverse rotation direction is started from the state illustrated in FIG. 23, a recovering operation is performed from the imaging standby phase to the set phase, and the state transitions to a state illustrated in FIG. 31. FIG. 31 is a planar view illustrating a state in which the contact between the operated portion 170a of the second locking lever 170 and the cam 316b of the intermediate cam gear 316 is released after the intermediate cam gear 316 rotates. At this time, the second locking lever 170 can lock the locked portion 420d of the front blade lever 420.

Figure 32A:
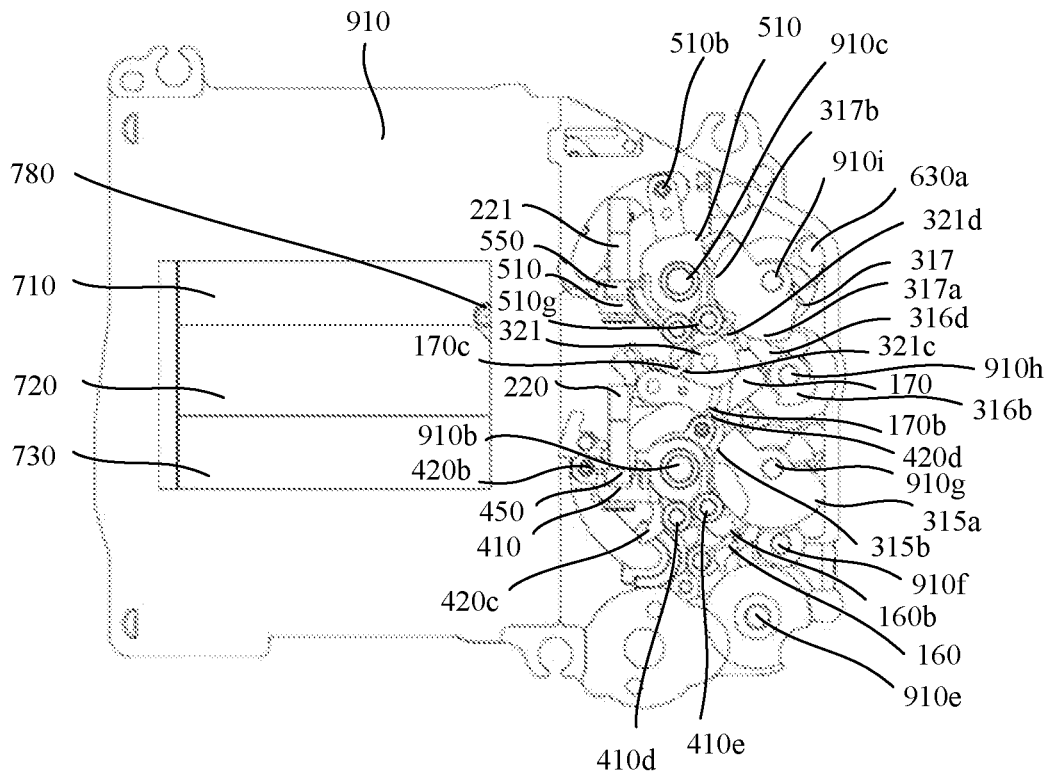
FIGS. 32A and 32B are a planar view and a sectional view each of which illustrates a state in which the cam of the intermediate cam gear comes into contact with the cam follower portion of the one-way lever and inverse charging is started, according to the embodiment.
Figure 32B:
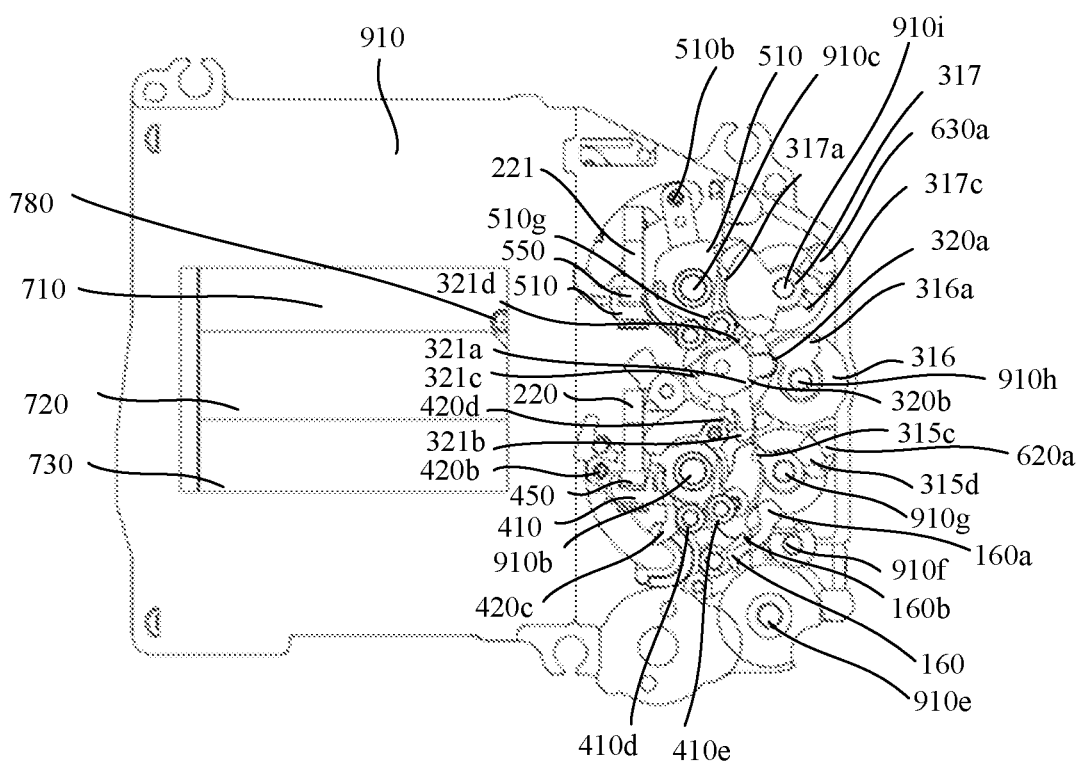

When the intermediate cam gear 316 further rotates from the state illustrated in FIG. 31, the state transitions to a state illustrated in FIGS. 32A and 32B. FIGS. 32A and 32B are a planar view and a sectional view each of which illustrates a state in which the cam 316a of the intermediate cam gear 316 comes into contact with the cam follower portion 320a of the one-way lever 320 and inverse charging is started. As illustrated in FIG. 32B, the pressing portion 320b of the one-way lever 320 pushes the pressed portion 321a of the inverse charging lever 321 and they rotate clockwise as a unit. As illustrated in FIG. 32A, the inverse charging lever 321 is in a state where the lock releasing portion 321c is in contact with the pressed portion 170c of the second locking lever 170. Thereafter, if the energization to the motor 340 is continued, the second locking lever 170 is charged counterclockwise via the one-way lever 320 and the inverse charging lever 321, and the second locking lever 170 retracts from the traveling trajectory of the front blade lever 420. Thus, during the reverse rotation of the motor 340, the second locking lever 170 is unlocked by the inverse charging lever 321 which operates only during the reverse rotation of the motor 340. On the other hand, during the forward rotation of the motor 340, the second locking lever 170 is unlocked by the cam 316b of the intermediate cam gear 316. Therefore, in an inverse charging phase indicated in FIG. 30, the second locking lever 170 is in the retracted position. On the other hand, in the charging phase (overlapping with the inverse charging phase) indicated in FIGS. 12A and 12B, the second locking lever 170 can remain in the standby position. That is, in the charging phase indicated in FIGS. 12A and 12B, it is possible to ensure the long standby phase of the second locking lever 170, and to ensure a long phase in which bouncing locking of the returning traveling is effective. Further, it is possible to hinder an occurrence of extra waiting time until the bouncing is settled, which makes it possible to increase the frame rate.

Figure 33A:
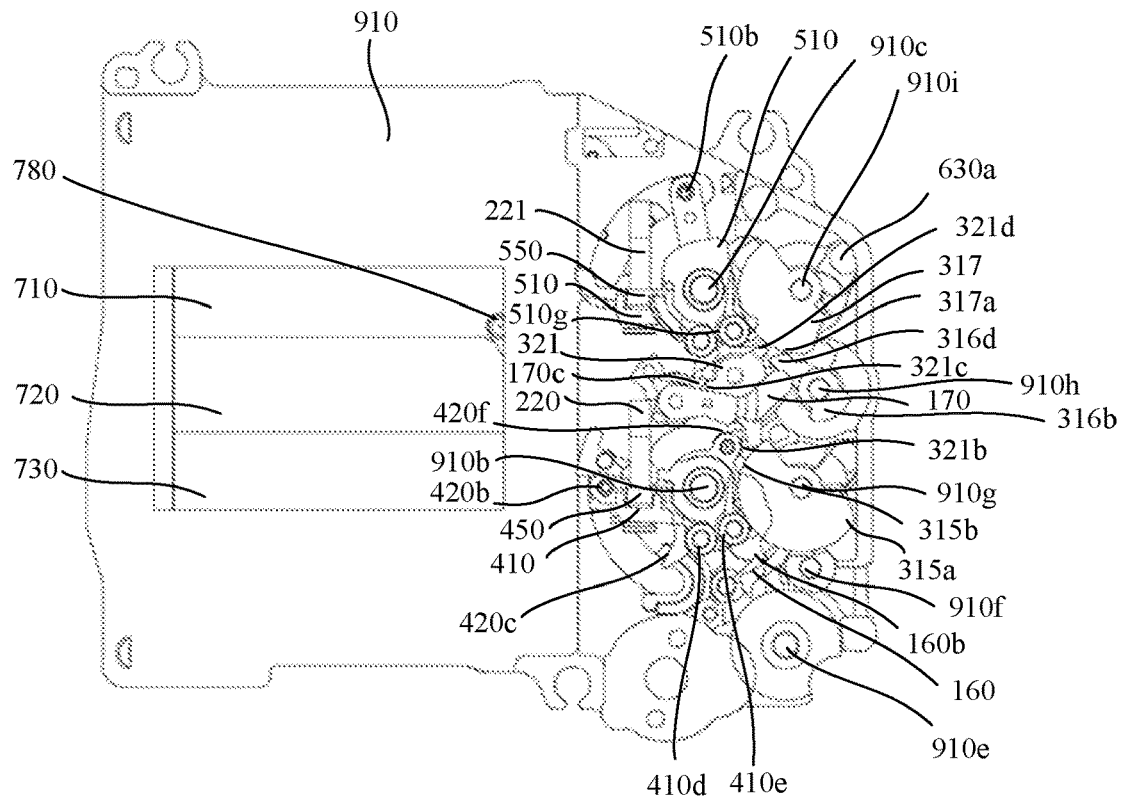
FIGS. 33A and 33B are a planar view and a sectional view each illustrating a state in which a pressing portion of the inverse charging lever starts to come into contact with a roller of the front blade lever according to the embodiment.
Figure 33B:
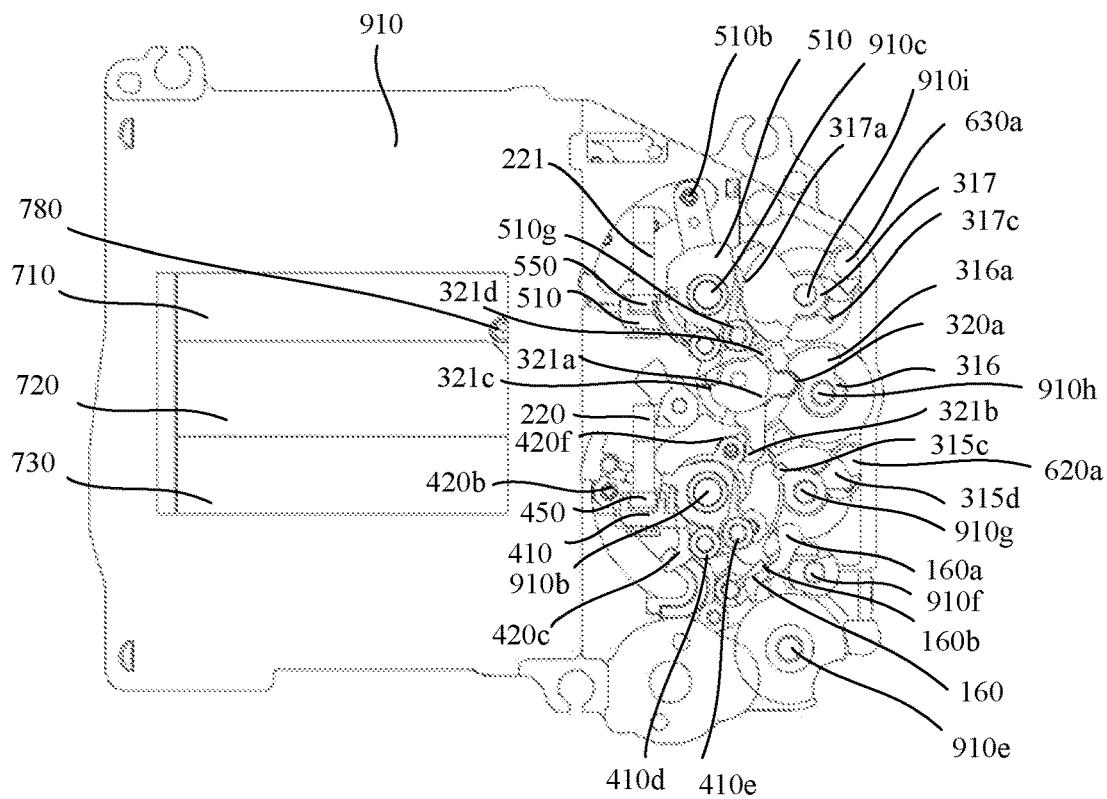

After the intermediate cam gear 316 further rotates from the state of FIGS. 32A and 32B, the state transitions to a state of FIGS. 33A and 33B. At this time, as illustrated in FIG. 33B, the pressing portion 321b of the inverse charging lever 321 is in a state of starting to come into contact with the roller 420f of the front blade lever 420. Thereafter, when the energization to the motor 340 is continued, the front blade lever 420 continues to rotate counterclockwise against the biasing force of the front anti-backlash spring 770 as the inverse charging lever 321 rotates clockwise. In this process, the front blade lever 420 rotates while pushing the front brake lever 620 away via the brake pin 420g. Then, the roller 420f of the front blade lever 420 moves to the cam top of the inverse charging lever 321 and the locked portion 420c of the front blade lever 420 is locked at the locking portion 160b of the first locking lever 160. When this inverse charging is completed, the energization of the motor 340 in the reverse rotation direction is stopped.

Figure 34A:
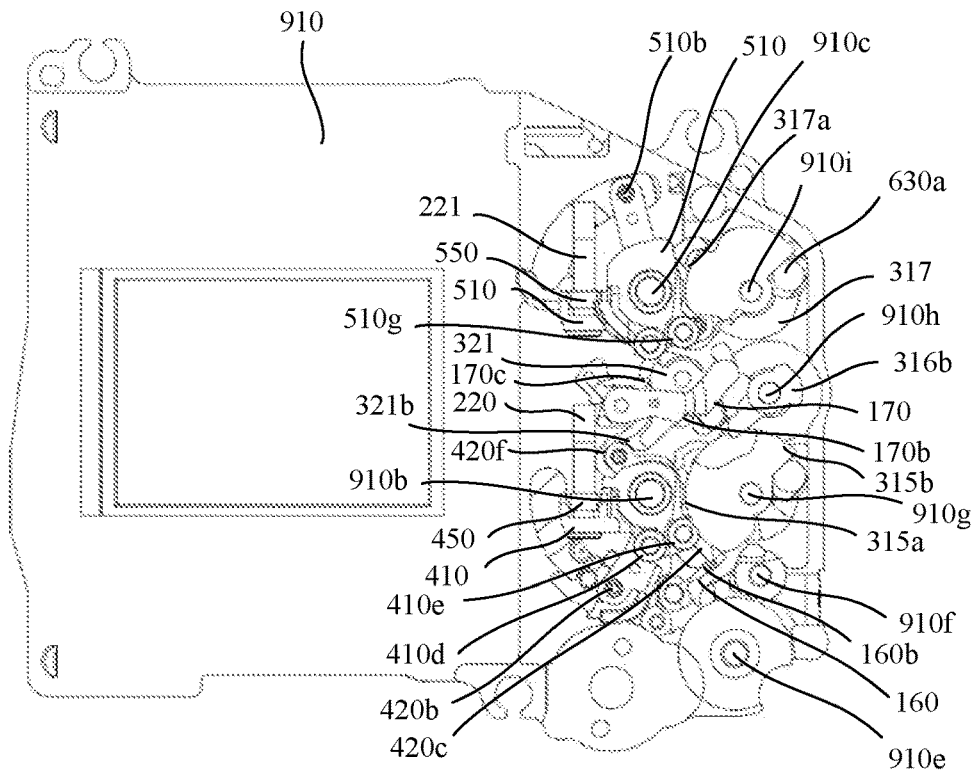
FIGS. 34A and 34B are a planar view and a sectional view each of which illustrates a state in which the inverse charging is completed according to the embodiment.
Figure 34B:
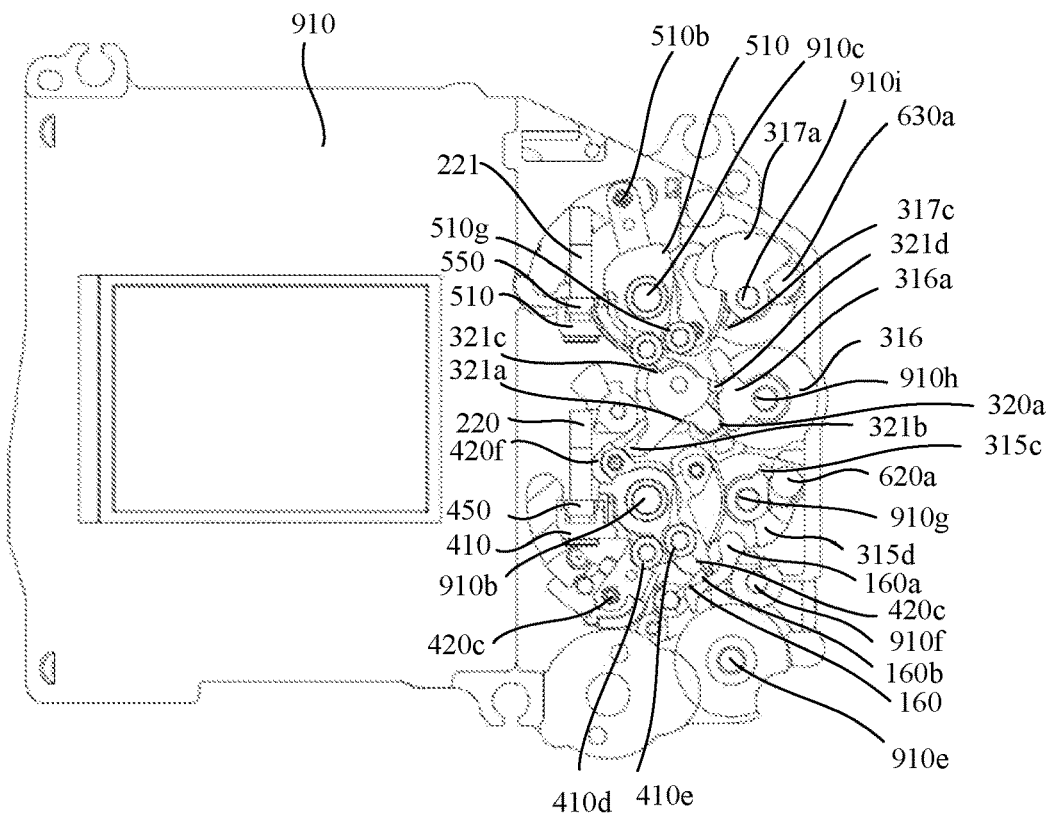

FIGS. 34A and 34B are a planar view and a sectional view each of which illustrates an inverse charging completion state in which the roller 420f of the front blade lever 420 has moved to the cam top of the inverse charging lever 321. At this time, as illustrated in FIG. 35B, the front blade lever 420 is rotated to a phase in which the locked portion 420c can be locked at the locking portion 160b of the first locking lever 160. The shutter front curtain 700 is in the folded state. On the other hand, the energization to the coil 230 on the front curtain side is continued, and the front driving lever 410 is held by the energized coil 230.

When the energization to the motor 340 in the forward rotation direction is started from the state of FIGS. 34A and 34B, both the front curtain charge cam gear 315 and the rear curtain charge cam gear 317 start to rotate counterclockwise, and the intermediate cam gear 316 starts to rotate clockwise.

Figure 35A:
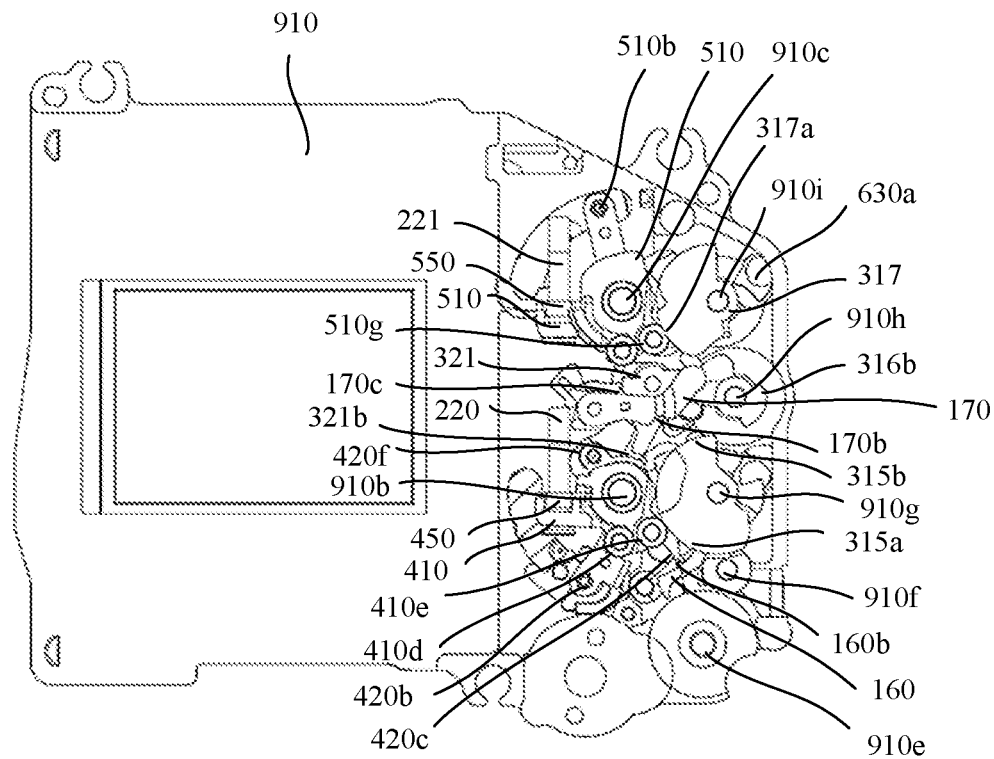
FIGS. 35A and 35B are a planar view and a sectional view each of which illustrates a state in which the roller of the front blade lever is separated from the pressing portion of the inverse charging lever according to the embodiment.
Figure 35B:
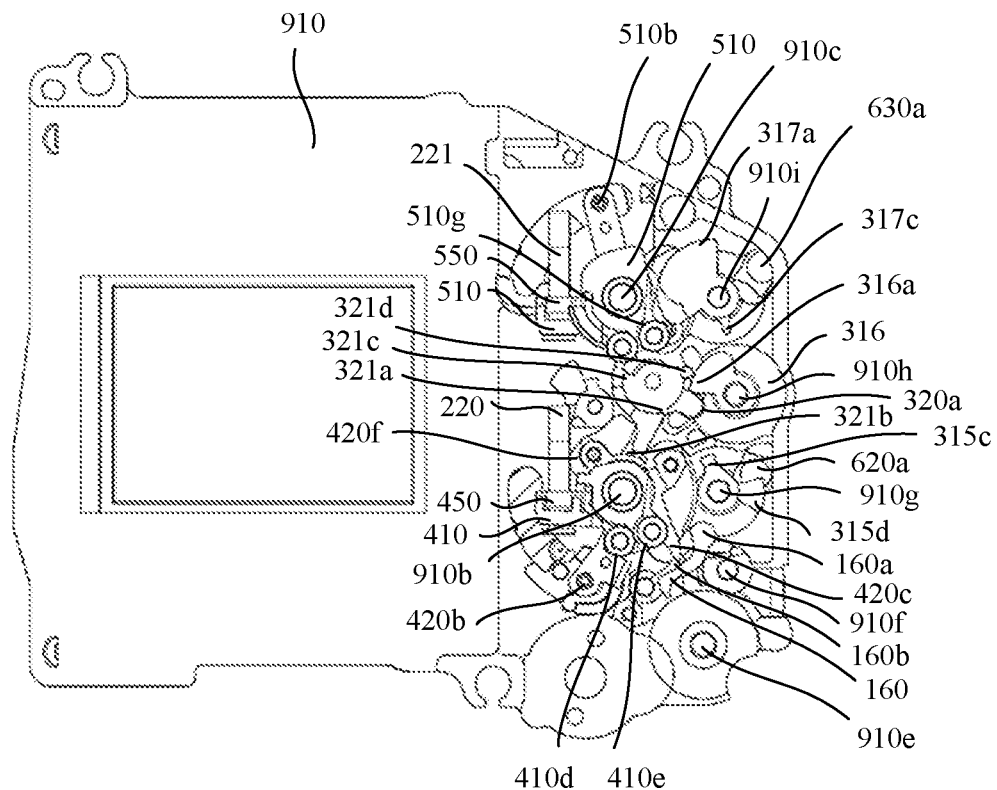

FIGS. 35A and 35B are a planar view and a sectional view each of which illustrates a state in which the roller 420f of the front blade lever 420 is separated from the pressing portion 321b of the inverse charging lever 321 after the intermediate cam gear 316 rotates clockwise from the state of FIGS. 34A and 34B. At this time, as illustrated in FIG. 35A, since the locked portion 420c of the front blade lever 420 is locked at the locking portion 160b of the first locking lever 160, the shutter front curtain 700 remains to be the folded state. As illustrated in FIG. 35B, the biasing force in the counterclockwise direction of the biasing spring 322 causes the one-way lever 320 and the inverse charging lever 321 to integrally rotate counterclockwise and to return to positions illustrated in FIGS. 14A and 14B. In the state where the roller 420f of the front blade lever 420 is at the cam top of the inverse charging lever 321 (inverse charging complete state), the following biasing relation is obtained. That is, the cam surface of the pressing portion 321b of the inverse charging lever 321 receives a lateral pressure in a direction of center of the intermediate cam gear shaft 910h from the front anti-backlash spring 770 that biases the front blade lever 420 in the clockwise direction. Further, the lateral pressure may be increased by an increase in a frictional force caused by a damage on the cam surface of the pressing portion 321b due to use over time, and may be increased by a component variation. In such cases, the inverse charging lever 321 may not be able to return to the position illustrated in FIGS. 14A and 14B only by the biasing force in the counterclockwise direction of the biasing spring 322. As a countermeasure to the above, the intermediate cam gear 316 includes a compulsive recovering cam (cam surface) 316d that compulsively recovers the inverse charging lever 321 in the process of the transition from the state of FIGS. 34A and 34B to the state of FIGS. 14A and 14B. The compulsive recovering cam 316d causes the inverse charging lever 321 to move in a direction separate from the front blade lever 420. In a case where the intermediate cam gear 316 is to cause the inverse charging lever 321 to move in a direction separate from the front blade lever 420, the motor 340 is rotated in the same direction as a rotational direction when the front curtain charge cam gear 315 causes the front driving lever 410 to move.

Figure 36A:
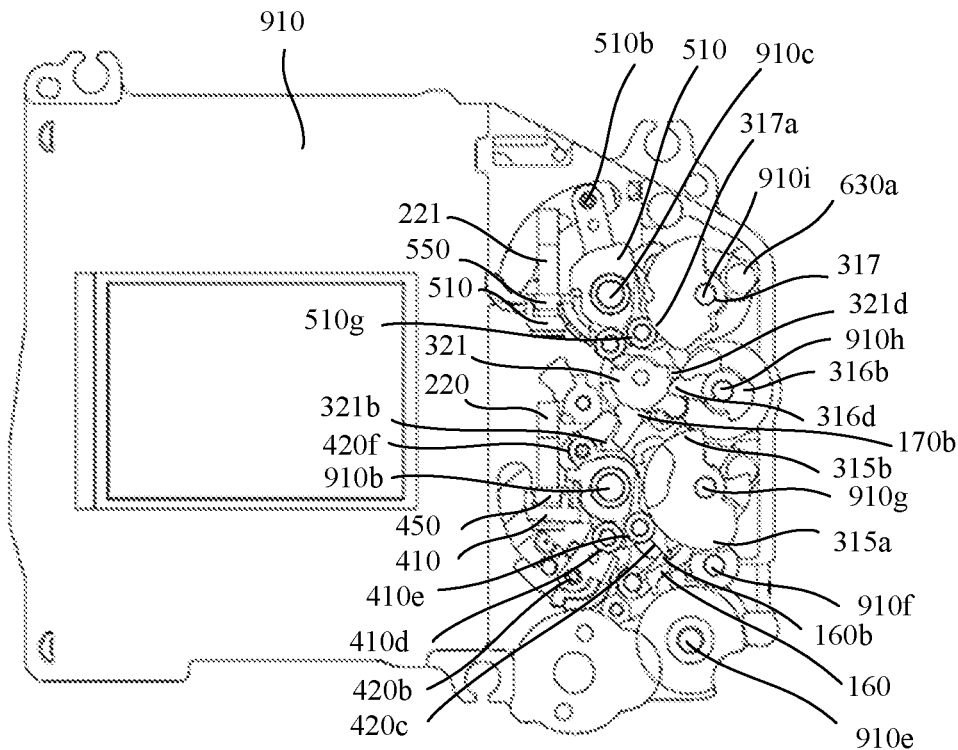
FIGS. 36A and 36B are a planar view and a sectional view each of which illustrates a state in which a compulsive recovering cam of the intermediate cam gear is in contact with the inverse charging lever according to the embodiment.
Figure 36B:
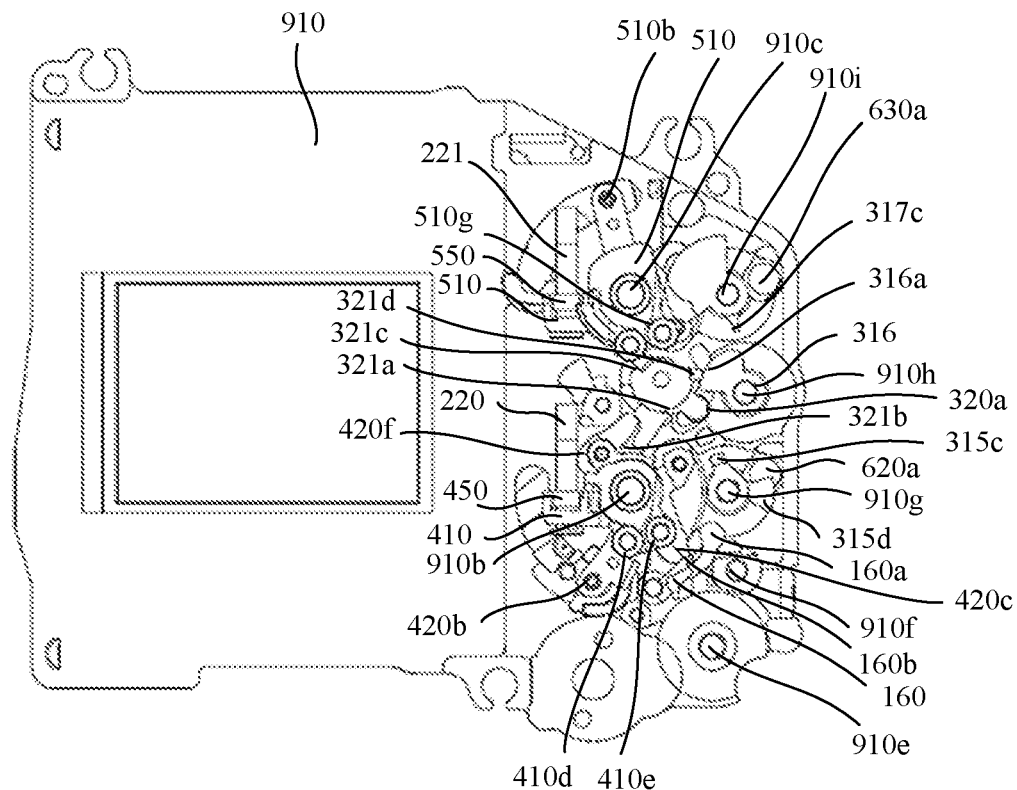

FIGS. 36A and 36B are a planar view and a sectional view each of which illustrates a state in which the compulsive recovering cam 316d of the intermediate cam gear 316 is in contact with the inverse charging lever 321, and each of FIGS. 36A and 36B omits an illustration of the second locking lever 170 for convenience. When the intermediate cam gear 316 further rotates clockwise, the compulsive recovering cam 316d rotates the inverse charging lever 321 counterclockwise, and the inverse charging lever 321 returns to the position illustrated in FIGS. 14A and 14B. This makes it possible to compulsively recover the inverse charging lever 321. Therefore, even if the lateral pressure is increased by the increase in the frictional force caused by the damage on the cam surface of the pressing portion 321b due to the use over time, the inverse charging lever 321 can be reliably recovered by the movement represented by a broken line in FIG. 30. At this time, as illustrated in FIG. 36B, since the pressing portion 320b of the one-way lever 320 is in contact with the pressed portion 321a of the inverse charging lever 321, the one-way lever 320 operates integrally with the inverse charging lever 321.

When the energization to the motor 340 in the forward rotation direction is continued from the state of FIG. 36, the state eventually becomes the state of FIGS. 14A and 14B, and the energization to the motor 340 and the coil 230 on the front curtain side and the coil 231 on the rear curtain side are stopped. At this time, as illustrated in FIG. 14A, the front curtain charge cam gear 315 locks the roller 410e of the front driving lever 410 so as to hinder the front driving lever 410 from being rotated counterclockwise by the biasing force of the driving spring 411. The same similarly applies to the rear driving lever 510. On the other hand, as illustrated in FIG. 14B, the locked portion 420c of the front blade lever 420 is locked at the locking portion 160b of the first locking lever 160. Therefore, the shutter front curtain 700 is in the folded state, and the light beam from the lens apparatus 2 is guided to the image sensor 6. A normally open state is realized by the series of operations described above.

As described above, in this embodiment, in a case where the one-way lever 320 and the inverse charging lever 321 causes the front blade lever 420 to move, the motor 340 rotates in the direction opposite to a rotation direction in a case where the front curtain charge cam gear 315 causes the front driving lever 410 to move. Therefore, according to this embodiment, it is possible to provide a low-cost shutter unit and a low-cost image pickup apparatus each of which can change a method to the normally open method and to the normally closed method without using a dedicated actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-117550, filed on Jul. 16, 2021, which is hereby incorporated by reference herein in its entirety.

What is claimed is:

1. A shutter unit comprising:
a base plate on which an opening is formed;
a first blade member configured to be movable between a closed state in which the first blade member closes the opening and a retracted state in which the first blade member retracts from the opening;
a first driving member configured to be biased in a first direction by a first biasing member;
a second driving member configured to be biased by a second biasing member in a second direction opposite to the first direction;
a first charging member configured to cause the first driving member to move in the second direction against a biasing force on the first driving member of the first biasing member;
a second charging member configured to cause the second driving member to move in the first direction against a biasing force on the second driving member of the second biasing member; and
a motor configured to supply a driving force to the first charging member and the second charging member,
wherein in a case where the first charging member causes the first driving member to move, the motor rotates in a direction opposite to a rotation direction in a case where the second charging member causes the second driving member to move.

2. The shutter unit according to claim 1, wherein the first driving member is movable integrally with the first blade member, and is biased so that the first blade member moves from the retracted state to the closed state.

3. The shutter unit according to claim 1, wherein the second driving member is movable integrally with the first driving member and is movable separately from the first driving member.

4. The shutter unit according to claim 1, wherein the first charging member includes a first lever and a second lever,
wherein in a case where the first driving member is caused to move, the first lever and the second lever integrally move, and
wherein in a case where the second charging member causes the second driving member to move, the second lever moves and the first lever does not move.

5. The shutter unit according to claim 4, further comprising a fourth biasing member configured to:
act between the first lever and the base plate in a case where the first lever causes the first driving member to move in the second direction; and
act between the first lever and the second lever in cases other than the case where the first lever causes the first driving member to move in the second direction.

6. The shutter unit according to claim 1, further comprising;
a second blade member configured to be movable between a closed state in which the second blade member closes the opening and a retracted state in which the second blade member retracts from the opening, and to transition from the retracted state to the closed state during an exposure operation;
a third driving member configured to be movable integrally with the second blade member and to be biased by a third biasing member in a direction such that the second blade member moves from the retracted state to the closed state;
a third charging member configured to cause the third driving member to move against a biasing force on the third driving member of the third biasing member; and
a fourth charging member configured to be connected to the second charging member and the third charging member and to cause the first charging member to operate,
wherein a number of teeth of the fourth charging member is an integral multiple of a number of teeth of each of the second charging member and the third charging member.

7. The shutter unit according to claim 6, further comprising:
a first optical detector configured to detect a phase of the fourth charging member; and
a second optical detector configured to detect a phase of the third charging member.

8. The shutter unit according to claim 6, wherein the first charging member includes a first lever and a second lever,
wherein in a case where the first driving member is caused to move, the first lever and the second lever integrally move,
wherein in a case where the second charging member causes the second driving member to move, the second lever moves and the first lever does not move, and
wherein the fourth charging member includes a cam surface that causes the first lever to move in a direction separate from the first driving member.

9. The shutter unit according to claim 6, wherein the first charging member includes a first lever and a second lever,
wherein in a case where the first driving member is caused to move, the first lever and the second lever integrally move,
wherein in a case where the second charging member causes the second driving member to move, the second lever moves and the first lever does not move, and
wherein in a case where the fourth charging member causes the first lever to move in a direction separate from the first driving member, the motor rotates in a same direction as a rotation direction in a case where the second charging member causes the second driving member to move.

10. The shutter unit according to claim 1, further comprising:
a locking member configured to lock the first driving member at a position such that the first blade member is in the closed state;
a first unlocking member configured to cause a transition from a state in which the locking member locks the first driving member to a retracted state in which traveling can be performed; and
a second unlocking member configured to cause the transition from the state in which the locking member locks the first driving member to the retracted state in which the traveling can be performed.

11. The shutter unit according to claim 10, wherein when the motor rotates in a first rotation direction, the first unlocking member is used for the transition from the state in which the first driving member is locked to the retracted state in which the traveling can be performed, and
wherein when the motor rotates in a second rotation direction, the second unlocking member is used for the transition from the state in which the first driving member is locked to the retracted state in which the traveling can be performed.

12. An image pickup apparatus comprising:
a shutter unit; and
an image sensor configured to photoelectrically convert an optical image formed via an image pickup optical system, wherein the shutter unit includes:
a base plate on which an opening is formed;
a first blade member configured to be movable between a closed state in which the first blade member closes the opening and a retracted state in which the first blade member retracts from the opening;
a first driving member configured to be biased in a first direction by a first biasing member;
a second driving member configured to be biased by a second biasing member in a second direction opposite to the first direction;
a first charging member configured to cause the first driving member to move in the second direction against a biasing force on the first driving member of the first biasing member;
a second charging member configured to cause the second driving member to move in the first direction against a biasing force on the second driving member of the second biasing member; and
a motor configured to supply a driving force to the first charging member and the second charging member,
wherein in a case where the first charging member causes the first driving member to move, the motor rotates in a direction opposite to a rotation direction in a case where the second charging member causes the second driving member to move.

* * * * *